US011550557B2

(12) United States Patent
Sharpe et al.

(10) Patent No.: US 11,550,557 B2
(45) Date of Patent: Jan. 10, 2023

(54) VIRTUALIZED FILE SERVER

(71) Applicant: Nutanix, Inc., San Jose, CA (US)

(72) Inventors: Richard James Sharpe, Mountain View, CA (US); Kalpesh Ashok Bafna, Milpitas, CA (US); Durga Mahesh Arikatla, San Jose, CA (US); Shyamsunder Prayagchand Rathi, Sunnyvale, CA (US); Satyajit Sanjeev Deshmukh, Milpitas, CA (US); Vishal Sinha, Union City, CA (US); Anil Kumar Gopalapura Venkatesh, Santa Clara, CA (US); Rashmi Gupta, Milpitas, CA (US); Rishabh Sharma, Santa Clara, CA (US); Yifeng Huang, Mountain View, CA (US)

(73) Assignee: Nutanix, Inc., San Jose, CA (US)

( * ) Notice: Subject to any disclaimer, the term of this patent is extended or adjusted under 35 U.S.C. 154(b) by 291 days.

(21) Appl. No.: 15/422,220

(22) Filed: Feb. 1, 2017

(65) Prior Publication Data
US 2017/0235760 A1  Aug. 17, 2017

Related U.S. Application Data

(60) Provisional application No. 62/294,984, filed on Feb. 12, 2016.

(51) Int. Cl.
*G06F 8/65*  (2018.01)
*G06F 16/182*  (2019.01)
(Continued)

(52) U.S. Cl.
CPC ............... *G06F 8/65* (2013.01); *G06F 3/065* (2013.01); *G06F 3/0619* (2013.01);
(Continued)

(58) Field of Classification Search
None
See application file for complete search history.

(56) References Cited

U.S. PATENT DOCUMENTS

| 5,276,867 A | 1/1994 | Kenley et al. |
| 5,664,144 A | 9/1997 | Yanai et al. |
| (Continued) | | |

FOREIGN PATENT DOCUMENTS

| CN | 105100210 A | 11/2015 |
| CN | 110519112 A | 11/2019 |
| (Continued) | | |

OTHER PUBLICATIONS

US 11,048,595 B2, 06/2021, Venkatesh et al. (withdrawn)
(Continued)

*Primary Examiner* — Thu N Nguyen
(74) *Attorney, Agent, or Firm* — Stoel Rives LLP

(57) ABSTRACT

In one embodiment, a system for managing communication connections in a virtualization environment includes a plurality of host machines implementing a virtualization environment, wherein each of the host machines includes a hypervisor, at least one user virtual machine (user VM), and a distributed file server that includes file server virtual machines (FSVMs) and associated local storage devices. Each FSVM and associated local storage device are local to a corresponding one of the host machines, and the FSVMs conduct I/O transactions with their associated local storage devices based on I/O requests received from the user VMs. Each of the user VMs on each host machine sends each of its respective I/O requests to an FSVM that is selected by one or more of the FSVMs for each I/O request based on a lookup table that maps a storage item referenced by the I/O request to the selected one of the FSVMs.

23 Claims, 34 Drawing Sheets

(51) Int. Cl.

| | | |
|---|---|---|
| *G06F 16/176* | (2019.01) | |
| *G06F 16/17* | (2019.01) | |
| *G06F 16/23* | (2019.01) | |
| *G06F 3/06* | (2006.01) | |
| *G06F 9/4401* | (2018.01) | |
| *G06F 9/455* | (2018.01) | |
| *G06F 11/07* | (2006.01) | |
| *G06F 11/14* | (2006.01) | |
| *G06F 11/20* | (2006.01) | |
| *G06F 21/53* | (2013.01) | |
| *G06F 21/56* | (2013.01) | |
| *G06F 21/62* | (2013.01) | |
| *G06F 21/78* | (2013.01) | |
| *H04L 41/06* | (2022.01) | |
| *H04L 41/082* | (2022.01) | |
| *H04L 67/1095* | (2022.01) | |
| *H04L 67/1097* | (2022.01) | |
| *H04L 67/00* | (2022.01) | |
| *H04L 41/0859* | (2022.01) | |
| *H04L 41/5009* | (2022.01) | |
| *H04L 67/10* | (2022.01) | |

(52) U.S. Cl.
CPC .......... *G06F 3/0647* (2013.01); *G06F 3/0664* (2013.01); *G06F 3/0665* (2013.01); *G06F 3/0683* (2013.01); *G06F 3/0689* (2013.01); *G06F 9/4406* (2013.01); *G06F 9/45558* (2013.01); *G06F 11/0712* (2013.01); *G06F 11/0751* (2013.01); *G06F 11/0793* (2013.01); *G06F 11/1451* (2013.01); *G06F 11/1464* (2013.01); *G06F 11/1484* (2013.01); *G06F 11/2025* (2013.01); *G06F 11/2033* (2013.01); *G06F 11/2035* (2013.01); *G06F 11/2046* (2013.01); *G06F 11/2058* (2013.01); *G06F 11/2069* (2013.01); *G06F 16/176* (2019.01); *G06F 16/1727* (2019.01); *G06F 16/1774* (2019.01); *G06F 16/183* (2019.01); *G06F 16/1844* (2019.01); *G06F 16/2365* (2019.01); *G06F 21/53* (2013.01); *G06F 21/56* (2013.01); *G06F 21/6218* (2013.01); *G06F 21/78* (2013.01); *H04L 41/06* (2013.01); *H04L 41/082* (2013.01); *H04L 67/1095* (2013.01); *H04L 67/1097* (2013.01); *G06F 2009/45579* (2013.01); *G06F 2009/45583* (2013.01); *G06F 2009/45587* (2013.01); *G06F 2009/45595* (2013.01); *G06F 2201/80* (2013.01); *G06F 2201/815* (2013.01); *G06F 2201/825* (2013.01); *G06F 2201/84* (2013.01); *G06F 2201/87* (2013.01); *G06F 2221/034* (2013.01); *G06F 2221/2101* (2013.01); *G06F 2221/2141* (2013.01); *G06F 2221/2145* (2013.01); *H04L 41/0859* (2013.01); *H04L 41/5009* (2013.01); *H04L 67/10* (2013.01); *H04L 67/34* (2013.01)

(56) References Cited

U.S. PATENT DOCUMENTS

| | | |
|---|---|---|
| 5,870,555 A | 2/1999 | Pruett et al. |
| 5,873,085 A | 2/1999 | Enoki et al. |
| 5,924,096 A | 7/1999 | Draper et al. |
| 6,055,543 A | 4/2000 | Christensen et al. |
| 6,085,234 A | 7/2000 | Pitts et al. |
| 6,101,508 A | 8/2000 | Wolff |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,442,602 B1* | 8/2002 | Choudhry ............... H04L 29/06 370/252 |
| 6,539,381 B1 | 3/2003 | Prasad et al. |
| 6,963,914 B1 | 11/2005 | Breitbart et al. |
| 6,968,345 B1 | 11/2005 | Muhiestein |
| 7,120,631 B1 | 10/2006 | Vahalia et al. |
| 7,159,056 B2 | 1/2007 | Goldick |
| 7,162,467 B2 | 1/2007 | Eshleman et al. |
| 7,356,679 B1 | 4/2008 | Le et al. |
| 7,366,738 B2 | 4/2008 | Yorke et al. |
| 7,409,511 B2 | 8/2008 | Edwards et al. |
| 7,606,868 B1 | 10/2009 | Le et al. |
| 7,702,843 B1 | 4/2010 | Chen et al. |
| 7,707,618 B1 | 4/2010 | Cox et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,890,529 B1 | 2/2011 | Srinivasan et al. |
| 7,937,453 B1* | 5/2011 | Hayden ................ G06F 16/183 707/625 |
| 8,095,810 B2 | 1/2012 | Matsuzawa et al. |
| 8,095,931 B1 | 1/2012 | Chen et al. |
| 8,352,482 B2 | 1/2013 | Hansen |
| 8,352,608 B1 | 1/2013 | Keagy et al. |
| 8,359,594 B1 | 1/2013 | Davidson et al. |
| 8,365,167 B2 | 1/2013 | Beaty et al. |
| 8,407,448 B1 | 3/2013 | Hayden et al. |
| 8,447,728 B2 | 5/2013 | Prahlad et al. |
| 8,473,462 B1 | 6/2013 | Banerjee |
| 8,484,163 B1 | 7/2013 | Yucel et al. |
| 8,484,356 B1 | 7/2013 | Douglis et al. |
| 8,539,076 B2* | 9/2013 | Nakatani ........... G06F 17/30067 709/223 |
| 8,543,790 B2 | 9/2013 | Chen et al. |
| 8,549,518 B1 | 10/2013 | Aron et al. |
| 8,601,473 B1 | 12/2013 | Aron et al. |
| 8,635,351 B2 | 1/2014 | Astete et al. |
| 8,688,660 B1 | 4/2014 | Sivasubramanian et al. |
| 8,725,679 B2 | 5/2014 | Nair et al. |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,838,923 B2 | 9/2014 | Prahlad et al. |
| 8,850,130 B1 | 9/2014 | Aron et al. |
| 8,863,124 B1 | 10/2014 | Aron |
| 8,914,423 B2 | 12/2014 | Pitts |
| 8,914,429 B2 | 12/2014 | Pitts |
| 8,935,563 B1 | 1/2015 | Rajaa et al. |
| 8,949,557 B2 | 2/2015 | Kamei et al. |
| 8,966,188 B1* | 2/2015 | Bardale ............... G06F 12/1036 711/147 |
| 8,983,952 B1 | 3/2015 | Zhang et al. |
| 8,996,783 B2 | 3/2015 | Huang et al. |
| 9,009,106 B1 | 4/2015 | Aron et al. |
| 9,043,567 B1 | 5/2015 | Modukuri et al. |
| 9,069,708 B2 | 6/2015 | Gill et al. |
| 9,152,628 B1 | 10/2015 | Stacey et al. |
| 9,154,535 B1 | 10/2015 | Harris |
| 9,165,003 B1 | 10/2015 | Tummala et al. |
| 9,201,698 B2 | 12/2015 | Ashok et al. |
| 9,201,704 B2 | 12/2015 | Chang et al. |
| 9,201,887 B1 | 12/2015 | Earl et al. |
| 9,213,513 B2 | 12/2015 | Hartz et al. |
| 9,244,674 B2 | 1/2016 | Waterman et al. |
| 9,244,969 B1* | 1/2016 | Love ...................... G06F 16/24 |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,274,817 B1 | 3/2016 | Fan et al. |
| 9,286,298 B1 | 3/2016 | Gillett, Jr. |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,405,482 B2 | 8/2016 | Varadharajan et al. |
| 9,405,566 B2 | 8/2016 | Chawla et al. |

(56) References Cited

U.S. PATENT DOCUMENTS

| | | |
|---|---|---|
| 9,411,628 B2 | 8/2016 | Bezbaruah et al. |
| 9,448,887 B1 | 9/2016 | Ben Dayan et al. |
| 9,497,257 B1 | 11/2016 | Love et al. |
| 9,513,946 B2 | 12/2016 | Sevigny et al. |
| 9,535,907 B1 | 1/2017 | Stringham |
| 9,563,555 B2 | 2/2017 | Flynn et al. |
| 9,571,561 B2 | 2/2017 | Jang |
| 9,619,257 B1 | 4/2017 | Aron et al. |
| 9,639,428 B1 | 5/2017 | Boda et al. |
| 9,652,265 B1 | 5/2017 | Narayanasamy et al. |
| 9,658,899 B2 | 5/2017 | Jenkins |
| 9,690,670 B1 | 6/2017 | Paulzagade et al. |
| 9,733,958 B2 | 8/2017 | Cui et al. |
| 9,740,436 B2 | 8/2017 | Fiebrich-Kandler et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| 9,772,866 B1 | 9/2017 | Aron et al. |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,940,154 B2 | 4/2018 | Ramani et al. |
| 9,946,573 B2 | 4/2018 | Medermnott |
| 10,009,215 B1 | 6/2018 | Shorey |
| 10,050,862 B2 | 8/2018 | Nambiar et al. |
| 10,083,022 B2 | 9/2018 | Fukui et al. |
| 10,084,873 B2 | 9/2018 | Dornemann |
| 10,095,506 B2 | 10/2018 | Gopalapura Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,248,657 B2 | 4/2019 | Prahlad et al. |
| 10,311,153 B2 | 6/2019 | Mason, Jr. et al. |
| 10,394,547 B2 | 8/2019 | Fukui et al. |
| 10,409,653 B2 | 9/2019 | Von Muhlen et al. |
| 10,419,426 B2 | 9/2019 | Bakshan et al. |
| 10,452,456 B2 | 10/2019 | Von Muhlen et al. |
| 10,496,321 B2 | 12/2019 | Varadharajan et al. |
| 10,523,592 B2 | 12/2019 | Byers et al. |
| 10,530,742 B2 | 1/2020 | Shah et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,572,317 B2 | 2/2020 | Von Muhlen et al. |
| 10,579,443 B2 | 3/2020 | Von Muhlen et al. |
| 10,705,889 B2 | 7/2020 | Von Muhlen et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,809,998 B2 | 10/2020 | Gopalapura Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,949,192 B2 | 3/2021 | Gopalapura Venkatesh et al. |
| 11,025,626 B1 | 6/2021 | Todd et al. |
| 11,086,826 B2 | 8/2021 | Thummala et al. |
| 11,106,447 B2 | 8/2021 | Gupta et al. |
| 11,204,710 B2 | 12/2021 | Varadharajan et al. |
| 2001/0047400 A1 | 11/2001 | Coates et al. |
| 2002/0069196 A1 | 6/2002 | Betros et al. |
| 2002/0120763 A1 | 8/2002 | Miloushev et al. |
| 2003/0115218 A1 | 6/2003 | Bobbitt et al. |
| 2003/0163597 A1 | 8/2003 | Hellman et al. |
| 2003/0195942 A1 | 10/2003 | Muhlestein et al. |
| 2004/0054777 A1 | 3/2004 | Ackaouy et al. |
| 2004/0199734 A1 | 10/2004 | Rajamani et al. |
| 2004/0210591 A1 | 10/2004 | Hirschfeld et al. |
| 2004/0225742 A1 | 11/2004 | Loaiza et al. |
| 2004/0267832 A1 | 12/2004 | Wong et al. |
| 2005/0120160 A1 | 6/2005 | Plouffe et al. |
| 2005/0120180 A1 | 6/2005 | Schombach et al. |
| 2005/0125503 A1 | 6/2005 | Iyengar et al. |
| 2005/0193221 A1 | 9/2005 | Yoneyama |
| 2005/0193245 A1* | 9/2005 | Hayden ............... G06F 11/2069 714/13 |
| 2005/0226059 A1* | 10/2005 | Kavuri ................. G06F 3/0605 365/189.05 |
| 2005/0228798 A1 | 10/2005 | Shepard et al. |
| 2006/0010227 A1 | 1/2006 | Atluri |
| 2006/0047685 A1 | 3/2006 | Dearing et al. |
| 2006/0080445 A1 | 4/2006 | Chang et al. |
| 2006/0167921 A1 | 7/2006 | Grebus et al. |
| 2006/0206901 A1 | 9/2006 | Chan |
| 2006/0224918 A1 | 10/2006 | Koike |
| 2006/0225065 A1 | 10/2006 | Chandhok et al. |
| 2006/0271510 A1 | 11/2006 | Harward et al. |
| 2006/0271931 A1 | 11/2006 | Harris et al. |
| 2007/0022129 A1 | 1/2007 | Bahar et al. |
| 2007/0038913 A1 | 2/2007 | Allen et al. |
| 2007/0100905 A1 | 5/2007 | Masters et al. |
| 2007/0171921 A1 | 7/2007 | Wookey et al. |
| 2007/0300220 A1 | 12/2007 | Seliger et al. |
| 2008/0040483 A1 | 2/2008 | Nakatani et al. |
| 2008/0071997 A1 | 3/2008 | Loaiza et al. |
| 2008/0098194 A1 | 4/2008 | Hashimoto et al. |
| 2008/0104349 A1 | 5/2008 | Maruyama et al. |
| 2008/0104589 A1 | 5/2008 | Mccrory et al. |
| 2008/0133486 A1 | 6/2008 | Fitzgerald et al. |
| 2008/0134178 A1 | 6/2008 | Fitzgerald et al. |
| 2008/0189468 A1 | 8/2008 | Schmidt. et al. |
| 2008/0201414 A1 | 8/2008 | Amir et al. |
| 2008/0201457 A1 | 8/2008 | London |
| 2008/0263113 A1 | 10/2008 | Krishnalyer et al. |
| 2008/0270677 A1 | 10/2008 | Kolakowski |
| 2008/0320499 A1 | 12/2008 | Suit |
| 2008/0320583 A1 | 12/2008 | Sharma et al. |
| 2009/0006801 A1 | 1/2009 | Shultz et al. |
| 2009/0100248 A1 | 4/2009 | Kami |
| 2009/0150885 A1 | 6/2009 | Safari et al. |
| 2009/0158082 A1 | 6/2009 | Jain et al. |
| 2009/0171971 A1 | 7/2009 | Goddard et al. |
| 2009/0193272 A1 | 7/2009 | Matsuzawa et al. |
| 2009/0216975 A1 | 8/2009 | Halperin et al. |
| 2009/0248870 A1 | 10/2009 | Kamei et al. |
| 2009/0249470 A1 | 10/2009 | Litvin et al. |
| 2009/0271412 A1 | 10/2009 | Lacapra et al. |
| 2009/0287887 A1 | 11/2009 | Matsuki et al. |
| 2009/0288084 A1 | 11/2009 | Astete et al. |
| 2010/0023521 A1 | 1/2010 | Arcese et al. |
| 2010/0070725 A1 | 3/2010 | Prahlad et al. |
| 2010/0082716 A1 | 4/2010 | Agetsuma et al. |
| 2010/0082774 A1 | 4/2010 | Pitts |
| 2010/0095289 A1 | 4/2010 | Nguyen et al. |
| 2010/0138921 A1 | 6/2010 | Na et al. |
| 2010/0174745 A1 | 7/2010 | Ryan et al. |
| 2010/0214908 A1 | 8/2010 | Ralev |
| 2010/0241785 A1 | 9/2010 | Chen et al. |
| 2010/0250824 A1 | 9/2010 | Belay |
| 2010/0275205 A1 | 10/2010 | Nakajima |
| 2010/0306256 A1 | 12/2010 | Blackman |
| 2011/0022694 A1 | 1/2011 | Dalai et al. |
| 2011/0022695 A1 | 1/2011 | Dalal et al. |
| 2011/0022812 A1 | 1/2011 | Van Der et al. |
| 2011/0022883 A1 | 1/2011 | Hansen |
| 2011/0047340 A1 | 2/2011 | Olson et al. |
| 2011/0078318 A1 | 3/2011 | Desai et al. |
| 2011/0119668 A1 | 5/2011 | Calder et al. |
| 2011/0119763 A1 | 5/2011 | Wade et al. |
| 2011/0125835 A1 | 5/2011 | Soltis |
| 2011/0137879 A1 | 6/2011 | Dubey et al. |
| 2011/0161299 A1 | 6/2011 | Prahlad et al. |
| 2011/0179414 A1 | 7/2011 | Goggin et al. |
| 2011/0184993 A1 | 7/2011 | Chawla et al. |
| 2011/0185292 A1 | 7/2011 | Chawla et al. |
| 2011/0225574 A1 | 9/2011 | Khalidi et al. |
| 2011/0239213 A1 | 9/2011 | Aswan et al. |
| 2011/0251992 A1 | 10/2011 | Bethlehem et al. |
| 2011/0252208 A1 | 10/2011 | Ali et al. |
| 2011/0255538 A1 | 10/2011 | Srinivasan et al. |
| 2011/0265076 A1 | 10/2011 | Thorat et al. |

(56) References Cited

U.S. PATENT DOCUMENTS

| | | |
|---|---|---|
| 2011/0271279 A1 | 11/2011 | Pate |
| 2011/0276578 A1 | 11/2011 | Allalouf et al. |
| 2011/0276963 A1 | 11/2011 | Wu et al. |
| 2011/0283277 A1 | 11/2011 | Castillo et al. |
| 2011/0289561 A1 | 11/2011 | Ivanov et al. |
| 2011/0307729 A1 | 12/2011 | Matsuzawa et al. |
| 2011/0320690 A1 | 12/2011 | Petersen et al. |
| 2012/0017114 A1 | 1/2012 | Timashev et al. |
| 2012/0023495 A1 | 1/2012 | Machida |
| 2012/0030456 A1 | 2/2012 | Wu et al. |
| 2012/0054736 A1 | 3/2012 | Arcese et al. |
| 2012/0081395 A1 | 4/2012 | Adi et al. |
| 2012/0084381 A1 | 4/2012 | Alladi et al. |
| 2012/0166866 A1 | 6/2012 | Rao et al. |
| 2012/0209983 A1 | 8/2012 | Bronner et al. |
| 2012/0233463 A1 | 9/2012 | Holt et al. |
| 2012/0254445 A1 | 10/2012 | Kawamoto et al. |
| 2012/0254567 A1 | 10/2012 | Umbehocker |
| 2012/0266162 A1* | 10/2012 | Baron ................. G06F 9/45558 718/1 |
| 2012/0272237 A1 | 10/2012 | Baron |
| 2012/0290630 A1 | 11/2012 | Aizman et al. |
| 2012/0310881 A1 | 12/2012 | Shadmon |
| 2012/0310892 A1* | 12/2012 | Dam .................... G06F 11/2094 707/659 |
| 2012/0324183 A1 | 12/2012 | Chiruvolu et al. |
| 2013/0046740 A1 | 2/2013 | Li et al. |
| 2013/0047160 A1 | 2/2013 | Conover |
| 2013/0055018 A1 | 2/2013 | Joshi et al. |
| 2013/0061110 A1 | 3/2013 | Zvibel |
| 2013/0061167 A1 | 3/2013 | Rhodes et al. |
| 2013/0066930 A1 | 3/2013 | Kamei et al. |
| 2013/0117744 A1 | 5/2013 | Klein et al. |
| 2013/0132674 A1 | 5/2013 | Sundrani |
| 2013/0151888 A1 | 6/2013 | Bhattiprolu et al. |
| 2013/0152085 A1 | 6/2013 | D, Amore et al. |
| 2013/0185716 A1 | 7/2013 | Yin et al. |
| 2013/0198738 A1 | 8/2013 | Reddin et al. |
| 2013/0212345 A1* | 8/2013 | Nakajima ............. G06F 3/0605 711/161 |
| 2013/0227379 A1 | 8/2013 | Gupta et al. |
| 2013/0227552 A1 | 8/2013 | Reddin et al. |
| 2013/0227566 A1 | 8/2013 | Higuchi et al. |
| 2013/0232491 A1 | 9/2013 | Radhakrishnan et al. |
| 2013/0246705 A1 | 9/2013 | Diare |
| 2013/0247036 A1 | 9/2013 | Fujiwara |
| 2013/0262396 A1 | 10/2013 | Kripalani et al. |
| 2013/0283267 A1 | 10/2013 | Cooper et al. |
| 2013/0297869 A1 | 11/2013 | Mills et al. |
| 2014/0006708 A1 | 1/2014 | Huynh et al. |
| 2014/0025796 A1 | 1/2014 | Vibhor et al. |
| 2014/0059392 A1 | 2/2014 | Ren et al. |
| 2014/0075029 A1 | 3/2014 | Lipchuk et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0108587 A1 | 4/2014 | Goldberg et al. |
| 2014/0115182 A1 | 4/2014 | Sabaa et al. |
| 2014/0123138 A1* | 5/2014 | Lee .................... G06F 9/45533 718/1 |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0173199 A1 | 6/2014 | Gupta et al. |
| 2014/0181048 A1 | 6/2014 | Varadharajan et al. |
| 2014/0181116 A1 | 6/2014 | Wang |
| 2014/0181438 A1 | 6/2014 | Varadharajan et al. |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0298185 A1 | 10/2014 | Chen et al. |
| 2014/0310710 A1 | 10/2014 | Lubsey et al. |
| 2014/0359612 A1 | 12/2014 | D'Amato et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0081644 A1 | 3/2015 | Pitts |
| 2015/0095788 A1 | 4/2015 | Thiele et al. |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0143164 A1* | 5/2015 | Veerla ................. G06F 11/2023 714/6.3 |
| 2015/0172412 A1 | 6/2015 | Escriva et al. |
| 2015/0178019 A1 | 6/2015 | Hegdal et al. |
| 2015/0205639 A1 | 7/2015 | Matsumoto et al. |
| 2015/0213032 A1 | 7/2015 | Powell et al. |
| 2015/0220324 A1 | 8/2015 | Arcese et al. |
| 2015/0242291 A1 | 8/2015 | Chang et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0355862 A1 | 12/2015 | Hayes et al. |
| 2015/0378761 A1 | 12/2015 | Sevigny et al. |
| 2015/0378853 A1 | 12/2015 | Sevigny et al. |
| 2016/0011898 A1 | 1/2016 | Lee et al. |
| 2016/0070492 A1 | 3/2016 | Cherubini et al. |
| 2016/0077988 A1* | 3/2016 | Tipton .................... G06F 3/068 710/308 |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy et al. |
| 2016/0301766 A1 | 10/2016 | Ionescu et al. |
| 2016/0306558 A1 | 10/2016 | Varadharajan et al. |
| 2016/0316003 A1 | 10/2016 | Snider et al. |
| 2016/0328226 A1 | 11/2016 | Arya et al. |
| 2016/0335134 A1 | 11/2016 | Gupta et al. |
| 2016/0359697 A1 | 12/2016 | Scheib et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1* | 3/2017 | Shankar ................. G06F 3/0617 |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0109184 A1 | 4/2017 | Raman et al. |
| 2017/0160983 A1 | 6/2017 | Fiske et al. |

(56) References Cited

U.S. PATENT DOCUMENTS

| | | |
|---|---|---|
| 2017/0177638 A1 | 6/2017 | Bhosale et al. |
| 2017/0193021 A1 | 7/2017 | Deng et al. |
| 2017/0206074 A1 | 7/2017 | Arcese et al. |
| 2017/0206207 A1 | 7/2017 | Bondurant et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235761 A1 | 8/2017 | Bafna et al. |
| 2017/0235762 A1 | 8/2017 | Sharpe et al. |
| 2017/0235763 A1 | 8/2017 | Gopalapura Venkatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0277556 A1* | 9/2017 | Ishii .................. G06F 16/1844 |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0062993 A1 | 3/2018 | Wu et al. |
| 2018/0129426 A1 | 5/2018 | Aron et al. |
| 2018/0143845 A1 | 5/2018 | Chawla et al. |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0181266 A1 | 6/2018 | Von Muhlen et al. |
| 2018/0181448 A1 | 6/2018 | Von Muhlen et al. |
| 2018/0181449 A1 | 6/2018 | Von Muhlen et al. |
| 2018/0181587 A1 | 6/2018 | Von Muhlen et al. |
| 2018/0181723 A1 | 6/2018 | Von Muhlen et al. |
| 2018/0196719 A1 | 7/2018 | Glass |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Gopalapura Venkatesh et al. |
| 2019/0034240 A1 | 1/2019 | Nabi et al. |
| 2019/0079747 A1 | 3/2019 | Sinha et al. |
| 2019/0129808 A1 | 5/2019 | Acharya et al. |
| 2019/0196718 A1 | 6/2019 | Pai et al. |
| 2019/0207925 A1 | 7/2019 | Anantha Padmanaban et al. |
| 2019/0286330 A1 | 9/2019 | Varadharajan et al. |
| 2019/0332683 A1 | 10/2019 | Thummala et al. |
| 2019/0339883 A1 | 11/2019 | Aron et al. |
| 2020/0007530 A1 | 1/2020 | Mohamad Abdul et al. |
| 2020/0034069 A1 | 1/2020 | Batra et al. |
| 2020/0036647 A1 | 1/2020 | Gupta et al. |
| 2020/0081704 A1 | 3/2020 | Bafna et al. |
| 2020/0081733 A1 | 3/2020 | Buck et al. |
| 2020/0125426 A1 | 4/2020 | Von Muhlen et al. |
| 2020/0125580 A1 | 4/2020 | Shao |
| 2020/0137157 A1 | 4/2020 | Joseph et al. |
| 2020/0274869 A1 | 8/2020 | Tahenakos et al. |
| 2021/0141630 A1 | 5/2021 | Sharpe |
| 2021/0165759 A1 | 6/2021 | Bar-Nissan et al. |
| 2021/0200641 A1 | 7/2021 | Bafna et al. |
| 2021/0224233 A1 | 7/2021 | Bafna et al. |
| 2021/0247973 A1 | 8/2021 | Gupta et al. |
| 2022/0155964 A1 | 5/2022 | Varadharajan et al. |

FOREIGN PATENT DOCUMENTS

| | | |
|---|---|---|
| CN | 119516905 A | 11/2019 |
| CN | 110569269 A | 12/2019 |
| EP | 1062581 B1 | 10/2003 |
| EP | 1214663 B1 | 6/2006 |
| EP | 1979814 A2 | 10/2008 |
| WO | 2010050944 A1 | 5/2010 |
| WO | 2012126177 A2 | 9/2012 |
| WO | 2016018446 A1 | 2/2016 |
| WO | 2018014650 A1 | 1/2018 |

OTHER PUBLICATIONS

U.S. Appl. No. 16/140,250 titled "Virtualized File Server Data Sharing" filed Sep. 24, 2018, pp. all.

U.S. Appl. No. 16/160,618 titled "Virtualized File Server Backup To Cloud" filed Oct. 15, 2018, pp. all.

U.S. Appl. No. 15/966,943 titled "Virtualized Server Systems and Methods Including Domain Joining Techniques" filed Apr. 30, 2018, pp. all.

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

NetApp; "Clustered Data Ontap 8.2 File Access Management Guide for CIFS"; Feb. 2014 (year 2014); pp. all.

Cano, Ignacio et al. "Curator: Self-Managing Storage for Enterprise Clusters"; University of Washington; published Mar. 2017; pp. all.

Dell EMC; Dell EMC Isilon OneFS Operating System; Scale-out NAS to maximize the data capital and business value of your unstructured data; 2020; pp. all.

Dell EMC; White Paper; Dell EMC Isilon OneFS Operating System; Powering the Isilon Scale-Out Storage Platform; Dec. 2019, pp. all.

(56) References Cited

OTHER PUBLICATIONS

EMC Isilon OneFS Operating System; Powering scale-out storage for the new world of Big Data in the enterprise; www.EMC.com captured Feb. 2020, pp. all.
Isilon OneFS, Version 8.0.1; Web Administration Guide; Published Oct. 2016, pp. all.
U.S. Appl. No. 16/687,327, titled "Virtualized File Server Rolling Upgrade", filed Nov. 19, 2019, pp. all.
"Enabling or disabling SMB automatic node referrals", NetApp https://docs.netapp.com/ontap- 9/index.isp?topic=%2Fcom.netapp. doc.cdot-famg-cifs%2FGUiD-AC7E8515-3A4C-4BB5-A8C8-38B565C952E0.html Captured Sep. 19, 2019, pp. all.
"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html Captured Sep. 19, 2019, pp. all.
"How to troubleshoot the 'Autolocation' feature in Clustered Data ONTAP", NetApp https://kb.netapp.com/app/answers/answer_view/a_id/1030857/loc/en_US#__highlight Captured Sep. 19, 2019, pp. all.
"How to Troubleshoot the 'Autolocation' feature in Clustered Data ONTAP—Results", NetApp https://kb.netapp.com/app/results/kw/autolocation/ Captured Sep. 19, 2019, pp. all.
"Hybrid Cloud Storage with Cloudian HyperStore and Amazon S3", Cloudian Inc.; www.cloudian.com 2014, pp. all.
"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html Captured Sep. 19, 2019, pp. all.
"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html captured Sep. 19, 2019, pp. all.
"Protect Your Data With Netapp Element Software", Solution Brief; NetApp, 2018, pp. all.
Kemp, Erik "NetApp SolidFire SnapMirror Architecture and Configuration", Technical Report, NetApp, Dec. 2017, pp. all.
Kleyman, Bill "How Cloud Computing Changes Storage Tiering", https://www.datacenterknowledge.com. captured Jun. 4, 2019, Nov. 12, 2015, pp. all.
U.S. Appl. No. 17/169,137 titled "Virtualized File Server Data Sharing" filed Feb. 5, 2021, pp. all.
U.S. Appl. No. 17/180,257 titled "Virtualized File Server User Views" filed Feb. 19, 2021, pp. all.
Administering VMware vSAN—VMware vSphere 7.0, 2015-2020, pp. 1-114.
"Virtual Disk Manager User's Guide: Virtual Disk Development Kit", vmware.com, 2008, pp. 1-12.
U.S. Appl. No. 17/091,758 titled "Virtualized File Server Distribution Across Clusters", filed Nov. 6, 2020; pp. all.
"Nutanix Files Guide"; Nutanix; Sep. 14, 2018; pp. all.
"Setting up and Using Acropolis File Services (AFS) On Nutanix AOS 5.0"; Virtual Dennis—Sharing Technical Tips Learned the Hard Way; Posted Dec. 30, 2016; pp. all.
Bas van Kaam "New in AOS 5.0: Nutanix Acropolis File Services"; basvankaam.com; Jan. 5, 2017; pp. all.
Dell: "High Availability and Data Protection With Dell EMC Isilon Scale-Out NAS"; Jul. 2019, Dell Inc., pp. all.
Jay Bounds "High-Availability (HA) Pair Controller Configuration Overview and Best Practices"; NetApp; Feb. 2016; pp. all.
Jorge Costa "High Availability Setup Using Veritas Cluster Server and NetApp Synchronous SnapMirror—One button Failover/Failback with SnapMirror Sync and Veritas Cluster Server"; NetApp Community; Nov. 18, 2010; pp all.
NetApp "Preparing Storage Systems for Snapmirror Replication"; Apr. 2005, NetApp, Inc., pp. all.
U.S. Appl. No. 17/129,425, titled "Parallel Change File Tracking in a Distributed File Server Virtual Machine (FSVM) Architecture", filed Dec. 21, 2020; pp. all.

Young-Woo Jung et al. "Standard-Based Vitrual Infrastructure Resource Management for Distributed and Heterogeneous Servers"; Feb. 15, 2009; ICACT; pp. all.
"Nutanix AFS—Introduction & Steps For Setting Up", Retrieved from https://virtual building blocks. com/2018/01/03/nutanix-afs-introduction-steps-for-setting-up/ (Year: 2018), Jan. 3, 2018; pp. 1-23.
U.S. Appl. No. 15/829,602 entitled "Handling Permissions for Virtualized File Servers", filed Dec. 1, 2017, pp. all.
U.S. Appl. No. 15/833,255, entitled "Cloning Virtualized File Servers", filed Dec. 6, 2017, pp. all.
U.S. Appl. No. 15/833,391, entitled "Virtualized Server Systems and Methods Including Scaling of File System Virtual Machines", filed Dec. 6, 2017, pp. all.
U.S. Appl. No. 15/829,340, entitled "Configuring Network Segmentation for a Virtualization Environment", filed Dec. 1, 2017, pp. all.
U.S. Appl. No. 15/829,731, entitled "Transparent Referrals for Distributed File Servers", filed Dec. 1, 2017, pp. all.
U.S. Appl. No. 15/829,781, entitled "Virtualized Server Systems and Methods Including Load Balancing for Virtualized File Servers", filed Dec. 1, 2017, pp. all.
U.S. Appl. No. 15/832,310 entitled "Disaster Recovery for Distributed File Servers, Including Metadata Fixers", filed Dec. 5, 2017, pp. all.
U.S. Appl. No. 16/942,929 titled "Method Using Access Information in a Distributed File Server Virtual Machine (FSVM) Architecture, Including Web Access"; filed Jul. 30, 2020, pp. all.
U.S. Appl. No. 16/944,323 titled "Actions Based On File Tagging in a Distributed File Server Virtual Machine (FSVM) Environment", filed Jul. 31, 2020, pp. all.
Ruth, Paul "Autonomic Live Adaption of Virtual Computational Environments in a Multi-Domain Infrastructure"; 2006 IEEE International Conference on Autonomic Computing, 2006, pp. 5-14.
U.S. Appl. No. 17/302,343 titled "Disaster Recovery for Distributed File Servers, Including Metadata Fixers" filed Apr. 30, 2021, pp. all.
U.S. Appl. No. 17/238,001 titled "Cloning Virtualized File Servers" filed Apr. 22, 2021, pp. all.
"Designing and Sizing Virtual SAN Fault Domains", Administering VMware Virtual SAN; VMware vSphere 6.5; vSAN 6.6; https://docs.vmware.com/en/VMware-VSphere/6.5/virtual-san-66-administration-guide.pdf, 2017, pp. 34.
"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, pp. 238.
"Understanding Multipathing and Failover", vSphere Storage; VMware vSphere 7.0; VMware ESXi 7.0; vCenter Server 7.0 https://docs.vmware.com/en/VMware-vSphere/7.0/vsphere-esxi-vcenter-server-702-storage-guide.pdf, Jun. 25, 2021, pp. 234-268.
"VMware vCenter Server: Centrally Mananged Virtual Infrastructure Delivered with Confidence", VMWare Datasheet; https://www.vmware.com/content/dam/digitalmarketing/vmware/en/pdf/products/Center/vmware-vcenter-server-datasheet.pdf, 2015, pp. 1-2.
"VMware VSAN 7.0 Release Notes", VMware; https://docs.vmware.com/en/VMware-vSphere/7.0/rn/vmware-vsan-70-release-notes.htmi, Mar. 8, 2021, pp. 1-12.
"VSAN 7.0 U2 Proof of Concept Guide", VMwareStorage; https://images.core.vmware.com/sites/default/files/resource/vsan__70__u2__proof_of_concept_guide_noindex.pdf, printed May 18, 2021, Apr. 2021, pp. 1-267.
"VSAN Health Service—File Service—File Server Health (77165)", VMware, Knowledge Base https://kb.vmware.com/s/article/77165, May 15, 2021, pp. 1-5.
"VSan Planning and Deployment", Update 2 VMWare vSphere 6.7; VMware vSAN 6.7; https://docs.vmware.com/en/VMware-VSphere/6.7/vsan-673-planning-deployment-guide.pdf. Aug. 20, 2019, pp. 1-85.
"VSan Stretched Cluster Guide", VMwareStorage; https://images.core.vmware.com/sites/default/files/resource/vsan__stretched_cluster_guide_noindex.pdf, printed Jun. 24, 2021, Jun. 2020, pp. 1-62.
Bhardwaj, Rishi, "The Wonderful World of Distributed Systems and the Art of Metadata Management", Nutanix, Inc., https://www.

(56) References Cited

OTHER PUBLICATIONS nutanix.com/blog/the-wonderful-world-of-distributed-systems-and-metadata-management; captured Aug. 19, 2021, Sep. 24, 2015, pp. 1-8.
Rajendran, Cedric, "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.
U.S. Appl. No. 17/448,315 titled "Virtualized File Server" filed Sep. 21, 2021, pp. all.
VMware vSphere VMFS "Technical Overview and Best Practices", a VMware Technical White Paper updated for VMware vSphere 5.1, Version 3.0; Nov. 27, 2012, pp. all.
"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.
"Characteristics of a vSAN Cluster", May 31, 2019, pp. 1-2.
"VSAN File Services Tech Note | VMware", captured Feb. 11, 2021; pp. 1-7.
"VSAN Monitoring and Troubleshooting—VMware vSphere 7.0", https://docs.vmware.com/, Apr. 2, 2020, pp. 1-61.
"VSAN Performance Graphs in the vSphere Web Client (2144493)", Nov. 9, 2020, pp. 1-42.
"VSphere Availability—VMware vSphere 6.7", https://docs.vmware.com/, Jan. 11, 2019, pp. 1-105.
"VSphere Availability—VMware vSphere 6.7", https://docs.vmware.com/, Jan. 4, 2021, pp. 1-382.
Birk, Ryan "How it Works: Understanding vSAN Architecture Components", altaro.com, Feb. 28, 2018, pp. 1-10.
Cormac, "Native File Services for vSAN 7" CormacHogan.com, Mar. 11, 2020, pp. 1-23.
Feroce, Danilo "Leveraging VMware vSAM for Highly Available Management Clusters", VMware, Inc., Version 2.9, VMware, Inc., Jan. 2018, pp. 1-22.
Fojta, Tomas "Quotas and Quota Policies in VMware Cloud Director—Tom Fojta's Blog", Nov. 6, 2020, pp. 1-4.
Fojta, Tomas, "vSAN File Services with vCloud Director—Tom Fojta's Blog", (wordpress.com) ("Fojta Blog"), pp. 1-8.
Seget, Vladan "VMware vSAN 7 now with native file services and quotas", May 1, 2020, pp. all.
Seget, Vladan "VMware vSphere 7.0 and vSAN storage improvements", Apr. 1, 2020, pp. 1-12.
Siurniolo, Andy, "VMware vSAN File Services and Veeam", Veeam Blog, https://www.veeam.com/blog/veeam-backup-vsan-file-services.html, Jul. 22, 2020, pp. 1-9.

U.S. Appl. No. 17/364,453 titled "Virtualized Server Systems and Methods Including Domain Joining Techniques" filed Jun. 30, 2021, pp. all.
"Tech TopX: AHV One Click Upgrade", Screen captures from YouTube video clip entitled "Tech TopX: AHV One Click Upgrade," 13 pages, uploaded on Dec. 8, 2015 by user "Nutanix University". Retrieved from Internet: httPs://www.youtube.com/watch?v=3dALdzw6qZM Dec. 8, 2015, pp. all.
Bhardwaj, Rishi "The Wonderful World of Distributed Systems and the Art of Metadata Management", Nutanix, Inc. https://www.nutanix.com/blog/the-wonderful-world-of-distributed-systems-and-metadata-management pp. 1-8.
Hogan, Cormac "New updates from Nutanix—NOS 3.0 and NX-3000", https://cormachogan.com/2012/12/20/new-from-nutanix-nos-3-0-nx-3000/ Dec. 20, 2012, pp. 1-7.
Leibovici, Andre "Nutanix One-Click Upgrade now takes care of Firmware and Hypervisor too!", myvirtualcioud.net https://myvirtualcloud.net/nutanix-one-click-upgrade-now-takes-care-of-firmware-and-hypervisor-too/ Jul. 31, 2014, pp. 1-4.
U.S. Appl. No. 17/443,009, titled "Scope-Based Distributed Lock Infrastructure for virtualized File Server" filed Jul. 19, 2021, pp. all.
U.S. Appl. No. 17/580,555 titled "Virtualized File Server" filed Jan. 20, 2022, pp. all pages of the application as filed.
U.S. Appl. No. 17/581,418 titled "File Server Managers and Systems for Managing Virtualized File Servers" filed Jan. 21, 2022, pp. all pages of the application as filed.
U.S. Appl. No. 17/648,796 titled "Virtualized Server Systems and Methods Including Scaling of File System Virtual Machines" filed Jan. 24, 2022, pp. all pages of the application as filed.
U.S. Appl. No. 17/585,403 titled "Virtualized File Server Smart Data Ingestion" filed Jan. 27, 2022, pp. all pages of the application as filed.
Jeffrey, Hemmes, et al., "Cacheable Decentralized Groups for Grid Resource Access Control", 2006 7th IEEE/ACM International Conference on Grid Computing Department of Computer Science and Engineering, University of Notre Dame, Sep. 2006, pp. 192-199.
U.S. Appl. No. 17/865,907 titled "Virtualized Filed Server Deployment" filed Jul. 15, 2022.
U.S. Appl. No. 17/866,225 titled "Virtualized Filed Server Disaster Recovery" filed Jul. 15, 2022.
"Citrix XenDesktop 7.1 on Microsoft Hyper-V Sensor 2012 R2 on Nutanix Virtual Computing Platform", Citrix APAC Soultion, Jun. 25, 2014, pp. 1-94.
Lye, Ben, "Implementing Windows Server 2008 File System Quotas", Nov. 19, 2009, pp. 1-17.

\* cited by examiner

VIRTUALIZED FILE SERVER

PRIORITY

This application claims the benefit, under 35 U.S.C. § 119(e), of U.S. Provisional Patent Application No. 62/294,984, filed 12 Feb. 2016, which is incorporated herein by reference.

TECHNICAL FIELD

This disclosure generally relates to file servers in virtualized environments.

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments, to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY OF PARTICULAR EMBODIMENTS

Particular embodiments provide an architecture for implementing virtualized file servers in a virtualization environment. In particular embodiments, a virtualized file server may include a set of File Server Virtual Machines (FSVMs) that execute on host machines and process storage access operations requested by user VMs executing on the host machines. The file server VMs may communicate with storage controllers provided by Controller/Service VMs executing on the host machines to store and retrieve storage items, such as files and folders, on storage devices associated with the host machines. The storage items may be distributed amongst multiple host machines. The file server VMs may maintain a storage map, such as a sharding map, that maps names or identifiers of storage items, such as folders, files, or portions thereof, to their locations. When a user application executing in a user VM on one of the host machines initiates a storage access operation, such as reading or writing data from or to a storage item or modifying metadata associated with the storage item, the user VM may send the storage access operation in a request to one of the file server VMs on one of the host machines. In particular embodiments, a file server VM executing on a host machine that receives a storage access request may use the storage map to determine whether the requested storage item is located on the host machine (or otherwise associated with the file server VM or Controller/Service VM on the host machine). If so, the file server VM executes the requested operation. Otherwise, the file server VM responds to the request with an indication that the requested storage item is not on the host machine, and may redirect the requesting user VM to the host machine on which the storage map indicates the storage item is located. The client may cache the address of the host machine on which the storage item is located, so that the client may send subsequent requests for the storage item directly to that host machine.

In particular embodiments, the virtualized file server determines the location, e.g., host machine, at which to store a storage item such as a file or folder when the storage item is created. A file server VM may attempt to create a file or folder using a Controller/Service VM on the same host machine as the user VM that requested creation of the file, so that the Controller/Service VM that controls access operations to the storage item is co-located with the requesting user VM. In this way, file access operations between the user VM that is known to be associated with the storage item and is thus likely to access the storage item again (e.g., in the near future and/or on behalf of the same user) may use local communication or short-distance communication to improve performance, e.g., by reducing access times or increasing access throughput. Further, the virtualized file server may also attempt to store the storage item on a storage device that is local to the Controller/Service VM being used to create the storage item, so that storage access operations between the Controller/Service VM and the storage device may use local or short-distance communication.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
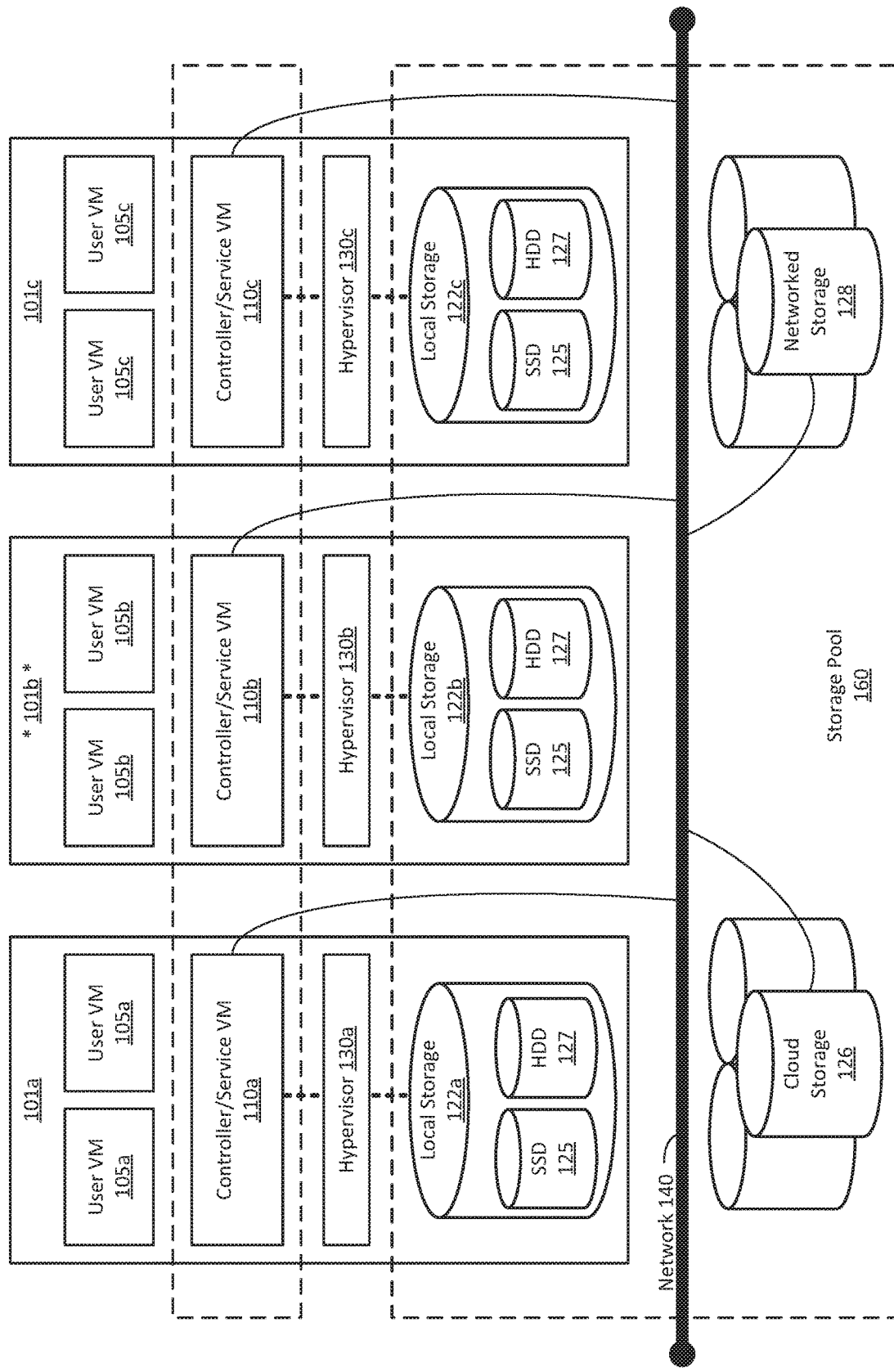
FIG. 1A illustrates a clustered virtualization environment according to particular embodiments.

FIG. 1A illustrates a clustered virtualization environment 100 according to particular embodiments. The architecture of FIG. 1A can be implemented for a distributed platform that contains multiple host machines 101a-c that manage multiple tiers of storage. The multiple tiers of storage may include storage that is accessible through network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122a-c that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network filesystem") and is mounted as a virtual disk on the user VM. In particular embodiments, vDisks may be organized into one or more volume groups (VGs).

Each host machine 101a-c may run virtualization software, such as VMWARE ESX(I), MICROSOFT HYPER-V, or REDHAT KVM. The virtualization software includes hypervisor 130a-c to create, manage, and destroy user VMs 105, as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to network 140. In particular embodiments, a host machine 101 may be a physical hardware computing device; in particular embodiments, a host machine 101 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
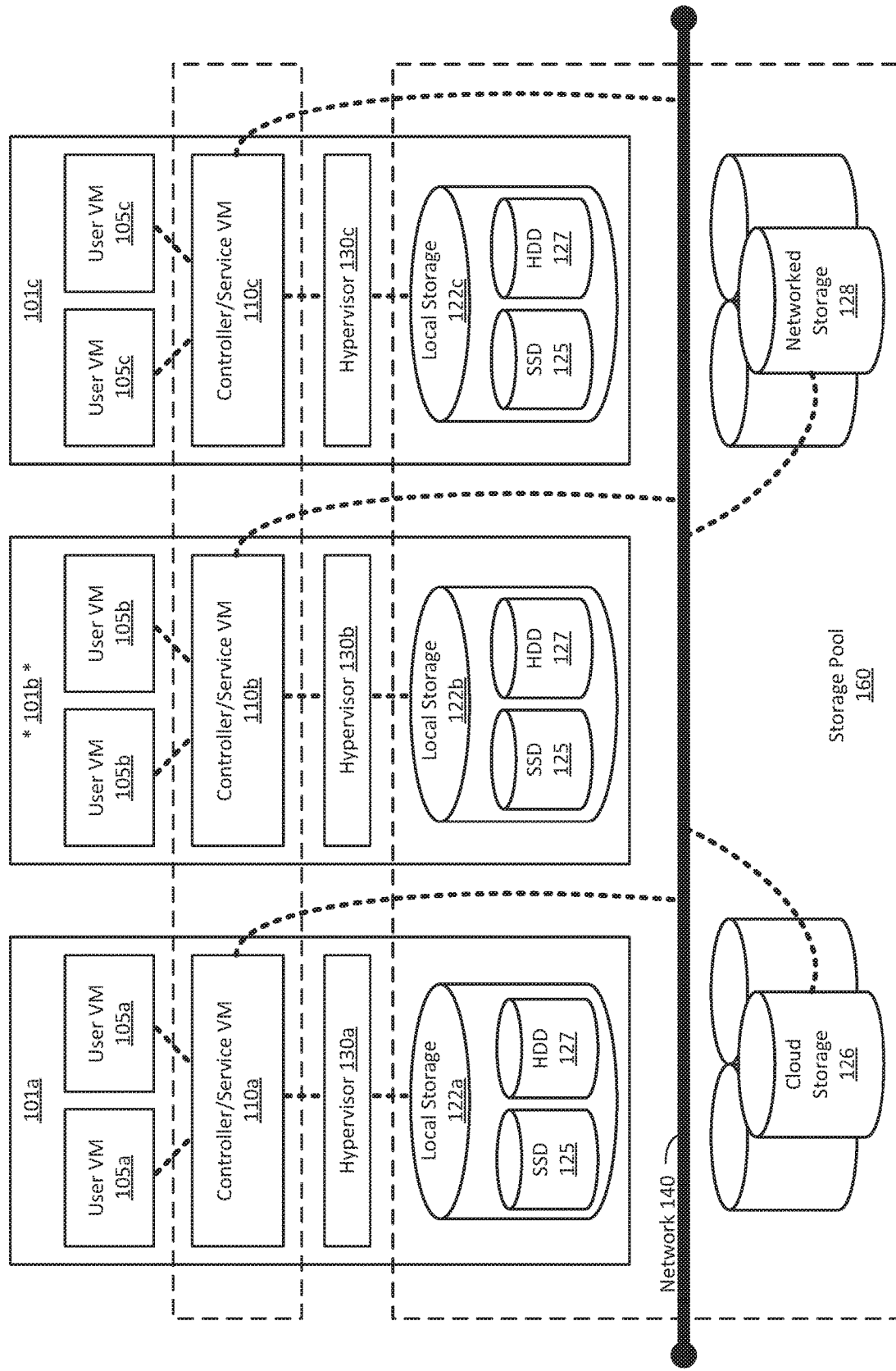
FIG. 1B illustrates data flow within a clustered virtualization environment according to particular embodiments.

FIG. 1B illustrates data flow within an example clustered virtualization environment 100 according to particular embodiments. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 101a, by connecting via network 140 to cloud storage 126 or NAS 128, or by connecting via network 140 to local storage 122b-c within another host machine 101b-c (e.g., via connecting to another CVM 110b or 110c). In particular embodiments, any suitable computing system 700 may be used to implement a host machine 101.

Figure 2A:
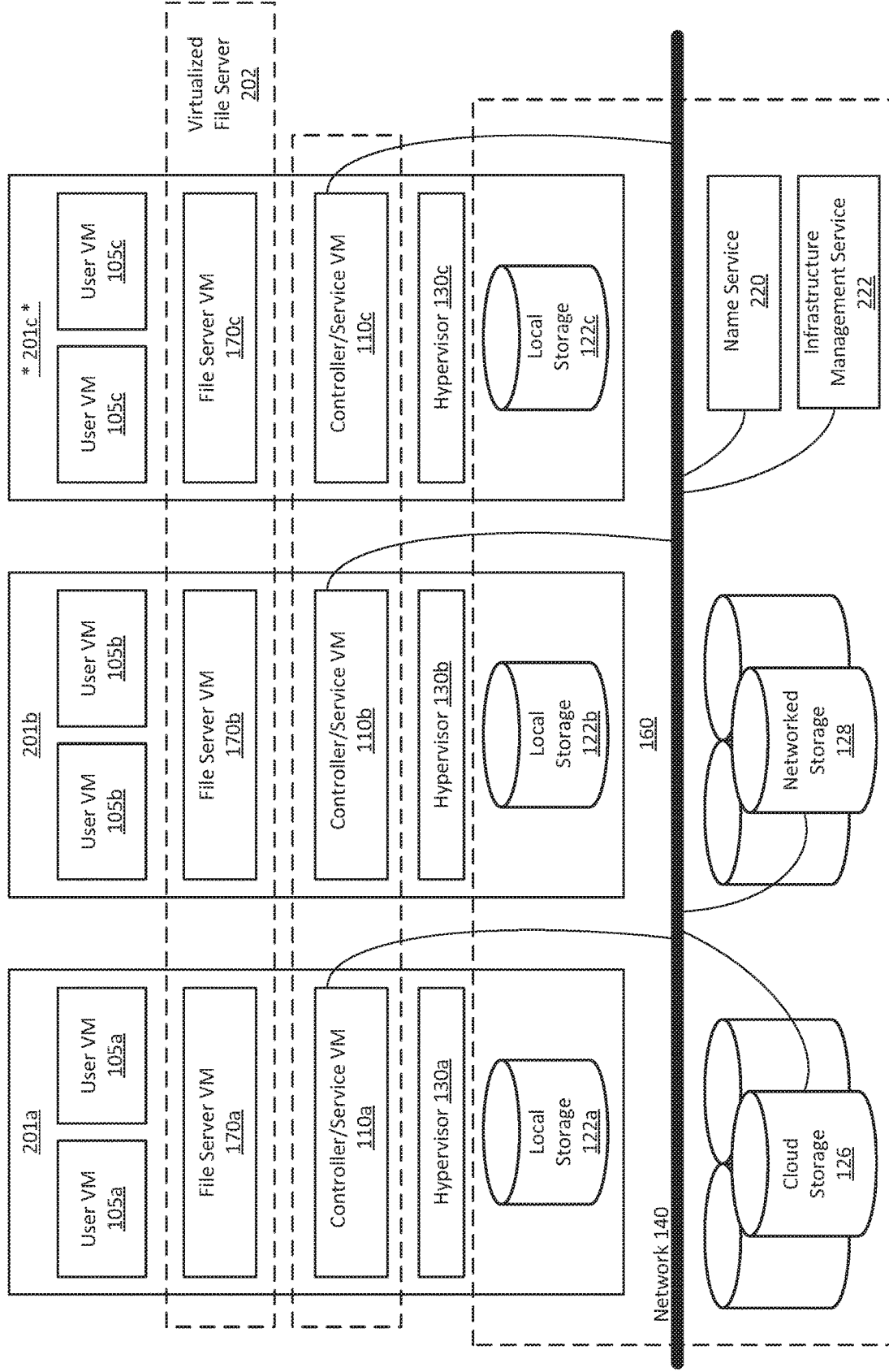
FIG. 2A illustrates a clustered virtualization environment implementing a virtualized file server according to particular embodiments.

FIG. 2A illustrates a clustered virtualization environment 200 implementing a virtualized file server (VFS) 202 according to particular embodiments. In particular embodiments, the VFS 202 provides file services to user VMs 105. The file services may include storing and retrieving data persistently, reliably, and efficiently. The user virtual machines 105 may execute user processes, such as office applications or the like, on host machines 201a-c. The stored data may be represented as a set of storage items, such as files organized in a hierarchical structure of folders (also known as directories), which can contain files and other folders, and shares, which can also contain files and folders.

In particular embodiments, the VFS 202 may include a set of File Server Virtual Machines (FSVMs) 170a-c that execute on host machines 201a-c and process storage item access operations requested by user VMs 201a-c executing on the host machines 201a-c. The FSVMs 170a-c may communicate with storage controllers provided by CVMs 110a-c executing on the host machines 201a-c to store and retrieve files, folders, SMB shares, or other storage items on local storage 122a-c associated with, e.g., local to, the host machines 201a-c. The FSVMs 170a-c may store and retrieve block-level data on the host machines 201a-c, e.g., on the local storage 122a-c of the host machines 201a-c. The block-level data may include block-level representations of the storage items. The network protocol used for communication between user VMs 105, FSVMs 170a-c, and CVMs 110a-c via the network 140 may be Internet Small Computer Systems Interface (iSCSI), Server Message Block (SMB), Network Filesystem (NFS), pNFS (Parallel NFS), or another appropriate protocol.

For the purposes of VFS 202, host machine 201c may be designated as a leader node within a cluster of host machines. In this case, FSVM 170c on host machine 101c may be designated to perform such operations. A leader may be responsible for monitoring or handling requests from FSVMs on other host machines throughout the virtualized environment. If FSVM 170c fails, a new leader may be designated for VFS 202.

In particular embodiments, the user VMs 105 may send data to the VFS 202 using write requests, and may receive data from it using read requests. The read and write requests, and their associated parameters, data, and results, may be sent between a user VM 105a and one or more file server VMs (FSVMs) 170a-c located on the same host machine as the user VM 105a or on different host machines from the user VM 105a. The read and write requests may be sent between host machines 201a-c via network 140, e.g., using a network communication protocol such as iSCSI, CIFS, SMB, TCP, IP, or the like. When a read or write request is sent between two VMs located on the same one of the host machines 201a-c (e.g., between the user VM 105a and the FSVM 170a located on the host machine 201a), the request may be sent using local communication within the host machine 201a instead of via the network 140. As described above, such local communication may be substantially faster than communication via the network 140. The local communication may be performed by, e.g., writing to and reading from shared memory accessible by the user VM 105a and the FSVM 170a, sending and receiving data via a local "loopback" network interface, local stream communication, or the like.

In particular embodiments, the storage items stored by the VFS 202, such as files and folders, may be distributed amongst multiple FSVMs 170a-c. In particular embodiments, when storage access requests are received from the user VMs 105, the VFS 202 identifies FSVMs 170a-c at which requested storage items, e.g., folders, files, or portions thereof, are stored, and directs the user VMs 105 to the locations of the storage items. The FSVMs 170 may maintain a storage map, such as a sharding map 360 (shown in FIG. 3C), that maps names or identifiers of storage items to their corresponding locations. The storage map may be a distributed data structure of which copies are maintained at each FSVM 170a-c and accessed using distributed locks or other storage item access operations. Alternatively, the storage map may be maintained by a leader node such as the FSVM 170c, and the other FSVMs 170a and 170b may send requests to query and update the storage map to the leader FSVM 170c. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs 170a-c, e.g., "FSVM-1", as network addresses of host machines 201a-c on which FSVMs 170a-c are located (e.g., "ip-addr1" or 128.1.1.10), or as other types of location identifiers.

When a user application executing in a user VM 105a on one of the host machines 201a initiates a storage access operation, such as reading or writing data, the user VM 105a may send the storage access operation in a request to one of the FSVMs 170a-c on one of the host machines 201a-c. A FSVM 170b executing on a host machine 201b that receives a storage access request may use the storage map to determine whether the requested file or folder is located on the FSVM 170b. If the requested file or folder is located on the FSVM 170b, the FSVM 170b executes the requested storage access operation. Otherwise, the FSVM 170b responds to the request with an indication that the data is not on the FSVM 170b, and may redirect the requesting user VM 105a to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 170a by sending a file service operation that creates the file or folder to a CVM 110a associated with (e.g., located on the same host machine 201a as) the FSVM 170a. The CVM 110a subsequently processes file service commands for that file for the FSVM 170a and sends corresponding storage access operations to storage devices associated with the file. The CVM 110a may associate local storage 122a with the file if there is sufficient free space on local storage 122a. Alternatively, the CVM 110a may associate a storage device located on another host machine 201b, e.g., in local storage 122b, with the file under certain conditions, e.g., if there is insufficient free space on the local storage 122a, or if storage access operations between the CVM 110a and the file are expected to be infrequent. Files and folders, or portions thereof, may also be stored on other storage devices, such as the network-attached storage (NAS) 128 or the cloud storage 126 of the storage pool 160.

In particular embodiments, a name service 220, such as that specified by the Domain Name System (DNS) Internet protocol, may communicate with the host machines 201a-c via the network 140 and may store a database of domain name (e.g., host name) to IP address mappings. The domain names may correspond to FSVMs 170a-c, e.g., fsvm1.domain.com or ip-addr1.domain.com for an FSVM named FSVM-1. The name service 220 may be queried by the user VMs 105 to determine the IP address of a particular host machine 201a-c given a name of the host machine, e.g., to determine the IP address of the host name ip-addr1 for the host machine 201a. The name service 220 may be located on a separate server computer system or on one or more of the host machines 201. The names and IP addresses of the host machines of the VFS instance 202, e.g., the host machines 201, may be stored in the name service 220 so that the user VMs 105 may determine the IP address of each of the host machines 201 or FSVMs 170. The name of each VFS instance 202, e.g., FS1, FS2, or the like, may be stored in the name service 220 in association with a set of one or more names that contains the name(s) of the host machines 201 or FSVMs 170 of the VFS instance 202. The FSVMs 170a-c may be associated with the host names ip-addr1, ip-addr2, and ip-addr3, respectively. For example, the file server instance name FS1.domain.com may be associated with the host names ip-addr1, ip-addr2, and ip-addr3 in the name service 220, so that a query of the name service 220 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 220 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs 105 may be balanced across the host machines 201, since the user VMs 105 submit requests to the name service 220 for the address of the VFS instance 202 for storage items for which the user VMs 105 do not have a record or cache entry, as described below.

In particular embodiments, each FSVM 170 may have two IP addresses: an external IP address and an internal IP address. The external IP addresses may be used by SMB/CIFS clients, such as user VMs 105, to connect to the FSVMs 170. The external IP addresses may be stored in the name service 220. The IP addresses ip-addr1, ip-addr2, and ip-addr3 described above are examples of external IP addresses. The internal IP addresses may be used for iSCSI communication to CVMs 110, e.g., between the FSVMs 170 and the CVMs 110. Other internal communications may be sent via the internal IP addresses as well, e.g., file server configuration information may be sent from the CVMs 110 to the FSVMs 170 using the internal IP addresses, and the CVMs 110 may get file server statistics from the FSVMs 170 via internal communication as needed.

Since the VFS 202 is provided by a distributed set of FSVMs 170a-c, the user VMs 105 that access particular requested storage items, such as files or folders, do not necessarily know the locations of the requested storage items when the request is received. A distributed file system protocol, e.g., MICROSOFT DFS or the like, is therefore used, in which a user VM 105a may request the addresses of FSVMs 170a-c from a name service 220 (e.g., DNS). The name service may send one or more network addresses of FSVMs 170a-c to the user VM 105a, in an order that changes for each subsequent request. These network addresses are not necessarily the addresses of the FSVM 170b on which the storage item requested by the user VM 105a is located, since the name service 220 does not necessarily have information about the mapping between storage items and FSVMs 170a-c. Next, the user VM 170a may send an access request to one of the network addresses provided by the name service, e.g., the address of FSVM 170b. The FSVM 170b may receive the access request and determine whether the storage item identified by the request is located on the FSVM 170b. If so, the FSVM 170b may process the request and send the results to the requesting user VM 105a. However, if the identified storage item is located on a different FSVM 170c, then the FSVM 170b may redirect the user VM 105a to the FSVM 170c on which the requested storage item is located by sending a "re-direct" response referencing FSVM 170c to the user VM 105a. The user VM 105a may then send the access request to FSVM 170c, which may perform the requested operation for the identified storage item.

A particular VFS 202, including the items it stores, e.g., files and folders, may be referred to herein as a VFS "instance" 202 and may have an associated name, e.g., FS1, as described above. Although a VFS instance 202 may have multiple FSVMs 170 distributed across different host machines 201, with different files being stored on FSVMs 170, the VFS instance 202 may present a single name space to its clients such as the user VMs 105. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs 105 may access the data stored on a distributed VFS instance 202 via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients such as user VMs 105 by name, e.g., "\Folder-1 \File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance 202 by specifying the file names or path names, e.g., the path name "\Folder-1 \File-1", in storage access operations. If the storage items are stored on a share (e.g., a shared drive), then the share name may be used to access the storage items, e.g., via the path name "\\Share-1 \Folder-1 \File-1" to access File-1 in folder Folder-1 on a share named Share-1.

In particular embodiments, although the VFS instance 202 may store different folders, files, or portions thereof at different locations, e.g., on different FSVMs 170, the use of different FSVMs 170 or other elements of storage pool 160 to store the folders and files may be hidden from the accessing clients. The share name is not necessarily a name of a location such as an FSVM 170 or host machine 201. For example, the name Share-1 does not identify a particular FSVM 170 on which storage items of the share are located. The share Share-1 may have portions of storage items stored on three host machines 201a-c, but a user may simply access Share-1, e.g., by mapping Share-1 to a client computer, to gain access to the storage items on Share-1 as if they were located on the client computer. Names of storage items, such as file names and folder names, are similarly location-independent. Thus, although storage items, such as files and their containing folders and shares, may be stored at different locations, such as different host machines 201a-c, the files may be accessed in a location-transparent manner by clients (such as the user VMs 105). Thus, users at client systems need not specify or know the locations of each storage item being accessed. The VFS 202 may automatically map the file names, folder names, or full path names to the locations at which the storage items are stored. As an example and not by way of limitation, a storage item's location may be specified by the name, address, or identity of the FSVM 170a-c that provides access to the storage item on the host machine 201a-c on which the storage item is located. A storage item such as a file may be divided into multiple parts that may be located on different FSVMs 170, in which case access requests for a particular portion of the file may be automatically mapped to the location of the portion of the file based on the portion of the file being accessed (e.g., the offset from the beginning of the file and the number of bytes being accessed).

In particular embodiments, VFS 202 determines the location, e.g., FSVM 170, at which to store a storage item when the storage item is created. For example, a FSVM 170a may attempt to create a file or folder using a Controller/Service VM 110*a* on the same host machine 201*a* as the user VM 105*a* that requested creation of the file, so that the Controller/Service VM 110*a* that controls access operations to the file folder is co-located with the user VM 105*a*. In this way, since the user VM 105*a* is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM 110*a* on the same host machine as the FSVM 170*a*, the FSVM 170*a* may identify it and use it by default. If there is no local CVM 110*a* on the same host machine as the FSVM 170*a*, a delay may be incurred for communication between the FSVM 170*a* and a CVM 110*b* on a different host machine 201*b*. Further, the VFS 202 may also attempt to store the file on a storage device that is local to the CVM 110*a* being used to create the file, such as local storage 122*a*, so that storage access operations between the CVM 110*a* and local storage 122*a* may use local or short-distance communication.

In particular embodiments, if a CVM 110*a* is unable to store the storage item in local storage 122*a* of a host machine 201*a* on which an FSVM 170*a*, e.g., because local storage 122*a* does not have sufficient available free space, then the file may be stored in local storage 122*b* of a different host machine 201*b*. In this case, the stored file is not physically local to the host machine 201*a*, but storage access operations for the file are performed by the locally-associated CVM 110*a* and FSVM 170*a*, and the CVM 110*a* may communicate with local storage 122*b* on the remote host machine 201*b* using a network file sharing protocol, e.g., iSCSI, SAMBA, or the like.

In particular embodiments, if a virtual machine, such as a user VM 105*a*, CVM 110*a*, or FSVM 170*a*, moves from a host machine 201*a* to a destination host machine 201*b*, e.g., because of resource availability changes, and data items such as files or folders associated with the VM are not locally accessible on the destination host machine 201*b*, then data migration may be performed for the data items associated with the moved VM to migrate them to the new host machine 201*b*, so that they are local to the moved VM on the new host machine 201*b*. FSVMs 170 may detect removal and addition of CVMs 110 (as may occur, for example, when a CVM 110 fails or is shut down) via the iSCSI protocol or other technique, such as heartbeat messages. As another example, a FSVM 170 may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 202 may change the location of the file by, for example, copying the file from its existing location(s), such as local storage 122*a* of a host machine 201*a*, to its new location(s), such as local storage 122*b* of host machine 201*b* (and to or from other host machines, such as local storage 122*c* of host machine 201*c* if appropriate), and deleting the file from its existing location(s). Write operations on the file may be blocked or queued while the file is being copied, so that the copy is consistent. The VFS 202 may also redirect storage access requests for the file from an FSVM 170*a* at the file's existing location to a FSVM 170*b* at the file's new location.

In particular embodiments, VFS 202 includes at least three File Server Virtual Machines (FSVMs) 170*a-c* located on three respective host machines 201*a-c*. To provide high-availability, there may be a maximum of one FSVM 170*a* for a particular VFS instance 202 per host machine 201 in a cluster. If two FSVMs 170 are detected on a single host machine 201, then one of the FSVMs 170 may be moved to another host machine automatically, or the user (e.g., system administrator) may be notified to move the FSVM 170 to another host machine. The user may move a FSVM 170 to another host machine using an administrative interface that provides commands for starting, stopping, and moving FSVMs 170 between host machines 201.

In particular embodiments, two FSVMs 170 of different VFS instances 202 may reside on the same host machine 201*a*. If the host machine 201*a* fails, the FSVMs 170 on the host machine 201*a* become unavailable, at least until the host machine 201*a* recovers. Thus, if there is at most one FSVM 170 for each VFS instance 202 on each host machine 201*a*, then at most one of the FSVMs 170 may be lost per VFS 202 per failed host machine 201. As an example, if more than one FSVM 170 for a particular VFS instance 202 were to reside on a host machine 201*a*, and the VFS instance 202 includes three host machines 201*a-c* and three FSVMs 170, then loss of one host machine would result in loss of two-thirds of the FSVMs 170 for the VFS instance 202, which would be more disruptive and more difficult to recover from than loss of one-third of the FSVMs 170 for the VFS instance 202.

In particular embodiments, users, such as system administrators or other users of the user VMs 105, may expand the cluster of FSVMs 170 by adding additional FSVMs 170. Each FSVM 170*a* may be associated with at least one network address, such as an IP (Internet Protocol) address of the host machine 201*a* on which the FSVM 170*a* resides. There may be multiple clusters, and all FSVMs of a particular VFS instance are ordinarily in the same cluster. The VFS instance 202 may be a member of a MICROSOFT ACTIVE DIRECTORY domain, which may provide authentication and other services such as name service 220.

Figure 2B:
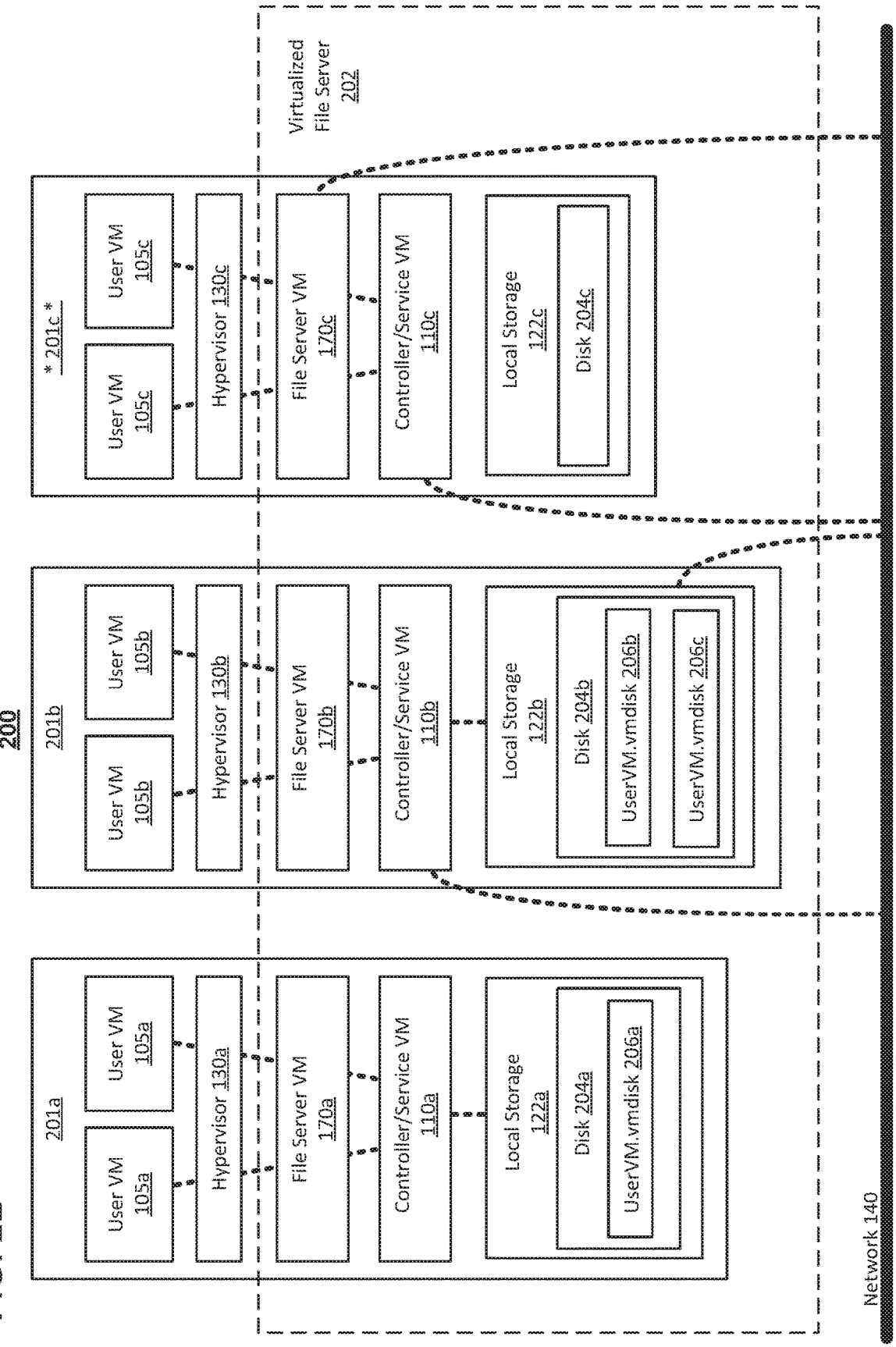
FIG. 2B illustrates a clustered virtualization environment implementing a virtualized file server in which files used by user VMs are stored locally on the same host machines as the user VMs according to particular embodiments.

FIG. 2B illustrates data flow within a clustered virtualization environment 200 implementing a VFS instance 202 in which stored items such as files and folders used by user VMs 105 are stored locally on the same host machines 201 as the user VMs 105 according to particular embodiments. As described above, one or more user VMs 105 and a Controller/Service VM 110 may run on each host machine 201 along with a hypervisor 130. As a user VM 105 processes I/O commands (e.g., a read or write operation), the I/O commands may be sent to the hypervisor 130 on the same server or host machine 201 as the user VM 105. For example, the hypervisor 130 may present to the user VMs 105 a VFS instance 202, receive an I/O command, and facilitate the performance of the I/O command by passing the command to a FSVM 170 that performs the operation specified by the command. The VFS 202 may facilitate I/O operations between a user VM 105 and a virtualized filesystem. The virtualized filesystem may appear to the user VM 105 as a namespace of mappable shared drives or mountable network filesystems of files and directories. The namespace of the virtualized filesystem may be implemented using storage devices in the local storage 122, such as disks 204, onto which the shared drives or network filesystems, files, and folders, or portions thereof, may be distributed as determined by the FSVMs 170. The VFS 202 may thus provide features disclosed herein, such as efficient use of the disks 204, high availability, scalability, and others. The implementation of these features may be transparent to the user VMs 105. The FSVMs 170 may present the storage capacity of the disks 204 of the host machines 201 as an efficient, highly-available, and scalable namespace in which the user VMs 105 may create and access shares, files, folders, and the like.

As an example, a network share may be presented to a user VM 105 as one or more discrete virtual disks, but each virtual disk may correspond to any part of one or more virtual or physical disks 204 within storage pool 160. Additionally or alternatively, the FSVMs 170 may present a VFS 202 either to the hypervisor 130 or to user VMs 105 of a host machine 201 to facilitate I/O operations. The FSVMs 170 may access the local storage 122 via Controller/Service VMs 110. As described above with reference to FIG. 1B, a Controller/Service VM 110a may have the ability to perform I/O operations using local storage 122a within the same host machine 201a by connecting via the network 140 to cloud storage 126 or NAS 128, or by connecting via the network 140 to local storage 122b-c within another host machine 201b-c (e.g., by connecting to another Controller/Service VM 110b-c).

In particular embodiments, each user VM 105 may access one or more virtual disk images 206 stored on one or more disks 204 of the local storage 122, the cloud storage 126, and/or the NAS 128. The virtual disk images 206 may contain data used by the user VMs 105, such as operating system images, application software, and user data, e.g., user home folders and user profile folders. For example, FIG. 2B illustrates three virtual machine images 206a-c. The virtual machine image 206a may be a file named UserVM105a.vmdisk (or the like) stored on disk 204a of local storage 122a of host machine 201a. The virtual machine image 206a may store the contents of the user VM 105a's hard drive. The disk 204a on which the virtual machine image 206a is "local to" the user VM 105a on host machine 201a because the disk 204a is in local storage 122a of the host machine 201a on which the user VM 105a is located. Thus, the user VM 105a may use local (intra-host machine) communication to access the virtual machine image 206a more efficiently, e.g., with less latency and higher throughput, than would be the case if the virtual machine image 206a were stored on disk 204b of local storage 122b of a different host machine 201b, because inter-host machine communication across the network 140 would be used in the latter case. Local communication within a host machine 201a is described in further detail with reference to FIG. 4C. Similarly, a virtual machine image 206b, which may be a file named UserVM105b.vmdisk (or the like), is stored on disk 204b of local storage 122b of host machine 201b, and the image 206b is local to the user VM 105b located on host machine 201b. Thus, the user VM 105a may access the virtual machine image 206b more efficiently than the virtual machine 206a on host machine 201a, for example. In another example, the CVM 110c may be located on the same host machine 201c as the user VM 105c that accesses a virtual machine image 206c (UserVM105c.vmdisk) of the user VM 105c, with the virtual machine image file 206c being stored on a different host machine 201b than the user VM 105c and the CVM 110c. In this example, communication between the user VM 105c and the CVM 110c may still be local, e.g., more efficient than communication between the user VM 105c and a CVM 110b on a different host machine 201b, but communication between the CVM 110c and the disk 204b on which the virtual machine image 206c is stored is via the network 140, as shown by the dashed lines between CVM 110c and the network 140 and between the network 140 and local storage 122b. The communication between CVM 110c and the disk 204b is not local, and thus may be less efficient than local communication such as may occur between the CVM 110c and a disk 204c in local storage 122c of host machine 201c. Further, a user VM 105c on host machine 201c may access data such as the virtual disk image 206c stored on a remote (e.g., non-local) disk 204b via network communication with a CVM 110b located on the remote host machine 201b. This case may occur if CVM 110c is not present on host machine 201c, e.g., because CVM 110c has failed, or if the FSVM 170c has been configured to communicate with local storage 122b on host machine 201b via the CVM 110b on host machine 201b, e.g., to reduce computational load on host machine 201c.

In particular embodiments, since local communication is expected to be more efficient than remote communication, the FSVMs 170 may store storage items, such as files or folders, e.g., the virtual disk images 206, as block-level data on local storage 122 of the host machine 201 on which the user VM 105 that is expected to access the files is located. A user VM 105 may be expected to access particular storage items if, for example, the storage items are associated with the user VM 105, such as by configuration information. For example, the virtual disk image 206a may be associated with the user VM 105a by configuration information of the user VM 105a. Storage items may also be associated with a user VM 105 via the identity of a user of the user VM 105. For example, files and folders owned by the same user ID as the user who is logged into the user VM 105a may be associated with the user VM 105a. If the storage items expected to be accessed by a user VM 105a are not stored on the same host machine 201a as the user VM 105a, e.g., because of insufficient available storage capacity in local storage 122a of the host machine 201a, or because the storage items are expected to be accessed to a greater degree (e.g., more frequently or by more users) by a user VM 105b on a different host machine 201b, then the user VM 105a may still communicate with a local CVM 110a to access the storage items located on the remote host machine 201b, and the local CVM 110a may communicate with local storage 122b on the remote host machine 201b to access the storage items located on the remote host machine 201b. If the user VM 105a on a host machine 201a does not or cannot use a local CVM 110a to access the storage items located on the remote host machine 201b, e.g., because the local CVM 110a has crashed or the user VM 105a has been configured to use a remote CVM 110b, then communication between the user VM 105a and local storage 122b on which the storage items are stored may be via a remote CVM 110b using the network 140, and the remote CVM 110b may access local storage 122b using local communication on host machine 201b. As another example, a user VM 105a on a host machine 201a may access storage items located on a disk 204c of local storage 122c on another host machine 201c via a CVM 110b on an intermediary host machine 201b using network communication between the host machines 201a and 201b and between the host machines 201b and 201c.

Figure 3A:
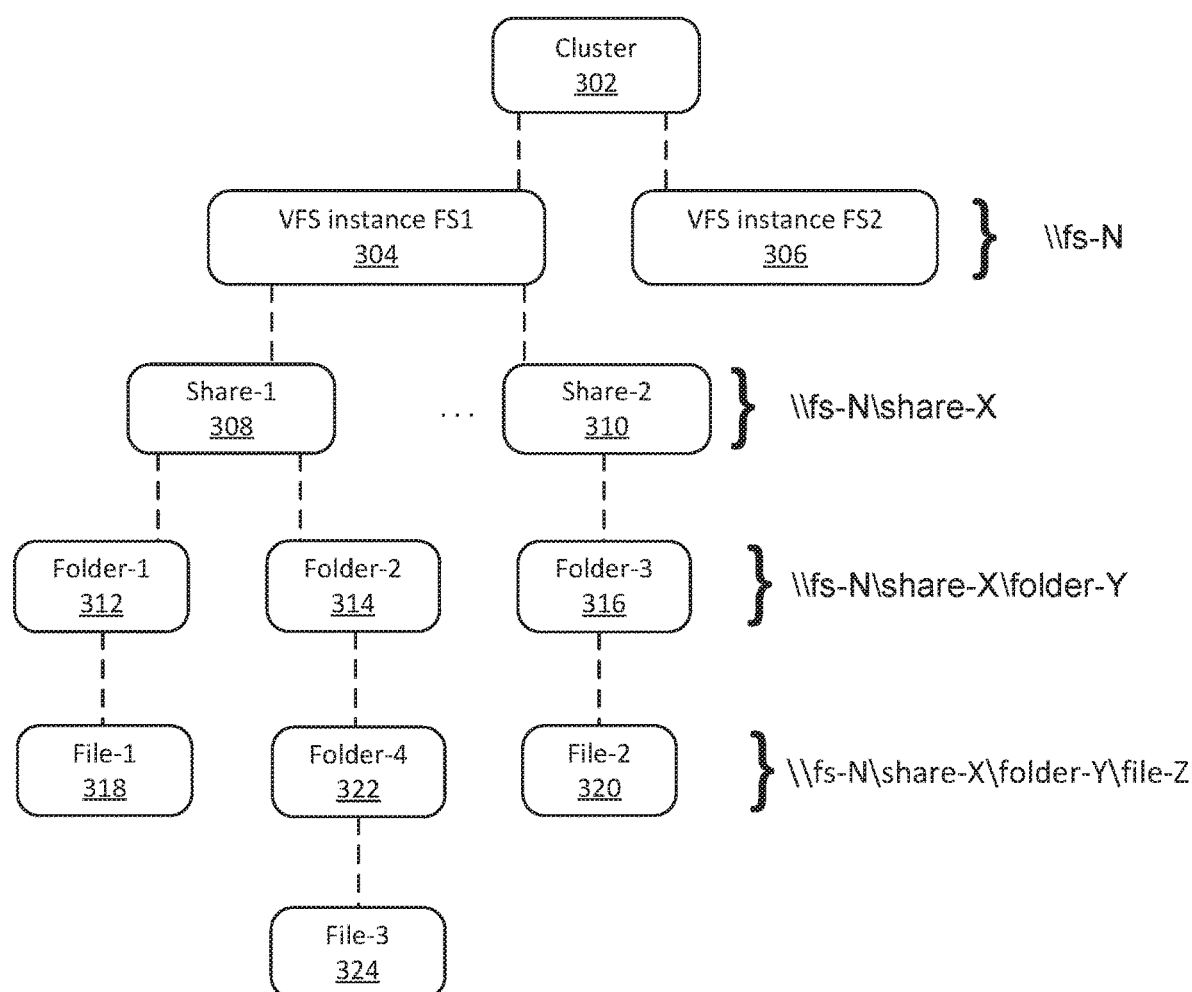
FIG. 3A illustrates an example hierarchical structure of a file server instance in a cluster according to particular embodiments.

FIG. 3A illustrates an example hierarchical structure 300 of a VFS instance in a cluster according to particular embodiments. A Cluster 302 contains two FSVMs, FSVM1 304 and FSVM2 306. Each FSVM may be identified by a name such as "\\instance", e.g., "\\FS1" for WINDOWS filesystems, or a name such as "instance", e.g., "FS1" for UNIX-type filesystems. FSVM1 304 contains shares, including Share-1 308 and Share-2 310. Shares may have names such as "Users" for a share that stores user home directories, or the like. Each share may have a path name such as \\Share-1 or \\Users. As an example and not by way of limitation, a share may correspond to a disk partition or a pool of filesystem blocks on WINDOWS and UNIX-type filesystems. As another example and not by way of limitation, a share may correspond to a folder or directory on a FSVM. Shares may appear in the filesystem instance 202 as folders or directories to users of user VMs 105. Share-1 308 includes two folders, Folder-1 312, and Folder-2 314, and may also include one or more files (e.g., files not in folders). Each folder 312, 314 may include one or more files 318. Share-2 310 includes a folder Folder-3 316, which includes a file File-2 320. Each folder has a folder name such as "Folder-1", "Users", or "Sam" and a path name such as "\\Share-1 \Folder-1" (WINDOWS) or "share-1:/Users/Sam" (UNIX). Similarly, each file has a file name such as "File-1" or "Forecast.xls" and a path name such as "\\Share-1\Folder-1 \File-1" or "share-1:/Users/Sam/Forecast.xls".

Figure 3B:
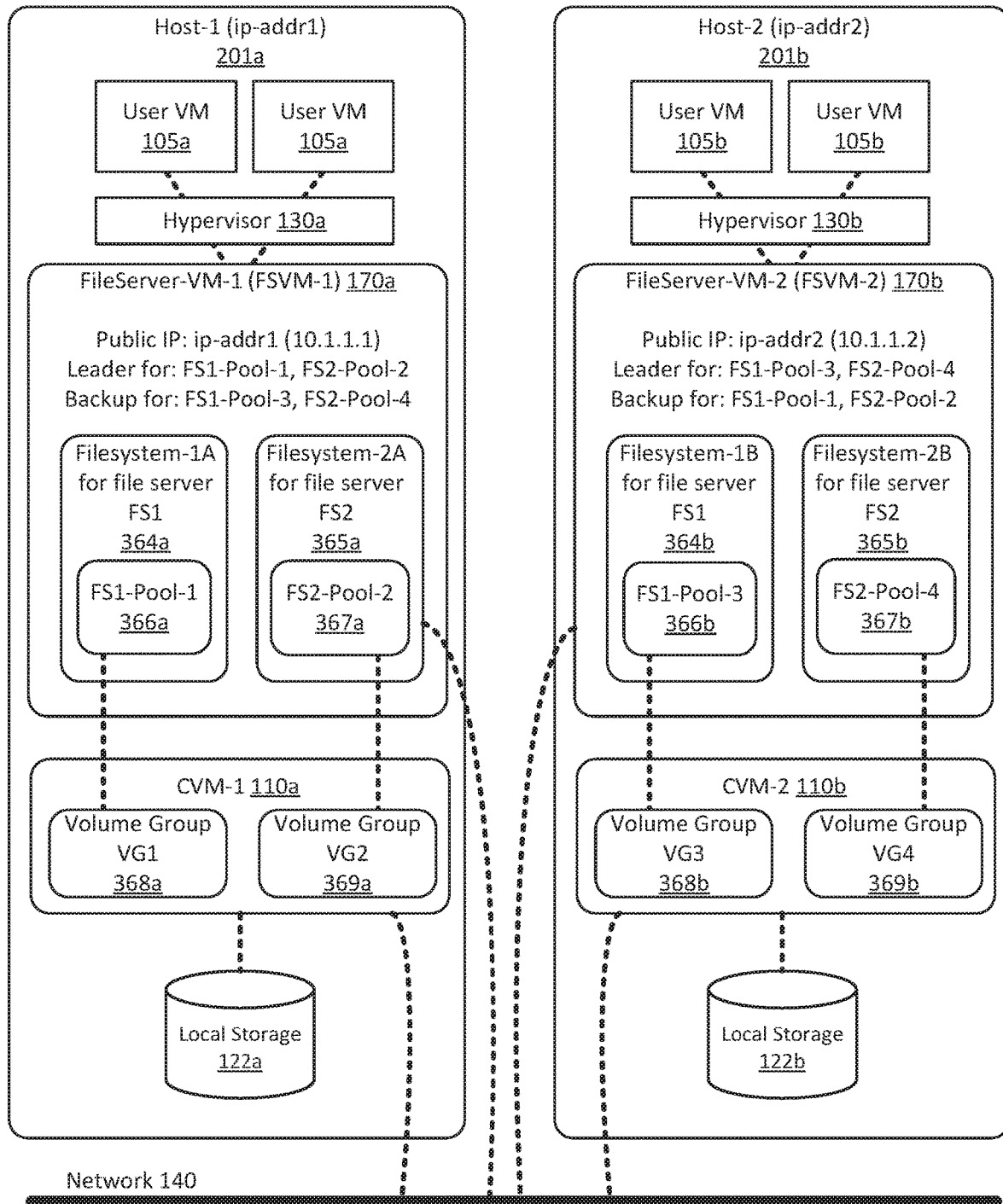
FIG. 3B illustrates two example virtualized file server host machines, each providing file storage services for portions of two file server instances according to particular embodiments.

FIG. 3B illustrates two example host machines 201a and 201b, each providing file storage services for portions of two VFS instances FS1 and FS2 according to particular embodiments. The first host machine, Host-1 201a, includes two user VMs 105a, a Hypervisor 130a, a FSVM named FileServer-VM-1 (abbreviated FSVM-1) 170a, a Controller/Service VM named CVM-1 110a, and local storage 122a. Host-1's FileServer-VM-1 170a has an IP (Internet Protocol) network address of 10.1.1.1, which is an address of a network interface on Host-1 201a. Host-1 has a hostname ip-addr1, which may correspond to Host-1's IP address 10.1.1.1. The second host machine, Host-2 201b, includes two user VMs 105b, a Hypervisor 130b, a File Server VM named FileServer-VM-2 (abbreviated FSVM-2) 170b, a Controller/Service VM named CVM-2 110b, and local storage 122b. Host-2's FileServer-VM-1 170b has an IP network address of 10.1.1.2, which is an address of a network interface on Host-2 201b.

In particular embodiments, filesystems FileSystem-1A 364a and FileSystem-2A 365a implement the structure of files and folders for portions of the FS1 and FS2 file server instances, respectively, that are located on (e.g., served by) FileServer-VM-1 170a on Host-1 201a. Other filesystems on other host machines may implement other portions of the FS1 and FS2 file server instances. The filesystems 364a and 365a may implement the structure of at least a portion of a file server instance by translating filesystem operations, such as opening a file, writing data to or reading data from the file, deleting a file, and so on, to disk I/O operations such as seeking to a portion of the disk, reading or writing an index of file information, writing data to or reading data from blocks of the disk, allocating or de-allocating the blocks, and so on. The filesystems 364a, 365a may thus store their filesystem data, including the structure of the folder and file hierarchy, the names of the storage items (e.g., folders and files), and the contents of the storage items on one or more storage devices, such as local storage 122a. The particular storage device or devices on which the filesystem data for each filesystem are stored may be specified by an associated filesystem pool (e.g., 366a-c and 367a-c). For example, the storage device(s) on which data for FileSystem-1A 364a and FileSystem-2A, 365a are stored may be specified by respective filesystem pools FS1-Pool-1 366a and FS2-Pool-2 367a. The storage devices for the pool 366a may be selected from volume groups provided by CVM-1 110a, such as volume group VG1 368a and volume group VG2 369a. Each volume group 368a, 369a may include a group of one or more available storage devices that are present in local storage 122a associated with (e.g., by iSCSI communication) the CVM-1 110a. The CVM-1 110a may be associated with a local storage 122a on the same host machine 201a as the CVM-1 110a, or with a local storage 122b on a different host machine 201b. The CVM-1 110a may also be associated with other types of storage, such as cloud storage 126, NAS 128 or the like. Although the examples described herein include particular host machines, virtual machines, file servers, file server instances, file server pools, CVMs, volume groups, and associations therebetween, any number of host machines, virtual machines, file servers, file server instances, file server pools, CVMs, volume groups, and any associations therebetween are possible and contemplated.

In particular embodiments, the filesystem pool 366a may associate any storage device in one of the volume groups 368a, 369a of storage devices that are available in local storage 122a with the filesystem FileSystem-1A 364a. For example, the filesystem pool FS1-Pool-1 366a may specify that a disk device named hd1 in the volume group VG1 368a of local storage 122a is a storage device for FileSystem-1A 364a for file server FS1 on FSVM-1 170a. A filesystem pool FS2-Pool-2 367a may specify a storage device FileSystem-2A 365a for file server FS2 on FSVM-1 170a. The storage device for FileSystem-2A 365a may be, e.g., the disk device hd1, or a different device in one of the volume groups 368a, 369a, such as a disk device named hd2 in volume group VG2 369a. Each of the filesystems FileSystem-1A 364a, FileSystem-2A 365a may be, e.g., an instance of the NTFS filesystem used by the WINDOWS operating system, of the UFS Unix filesystem, or the like. The term "filesystem" may also be used herein to refer to an instance of a type of filesystem, e.g., a particular structure of folders and files with particular names and content.

In one example, referring to FIG. 3A, an FS1 hierarchy rooted at File Server FS1 304 may be located on FileServer-VM-1 170a and stored in filesystem instance FileSystem-1A 364a. That is, the filesystem instance FileSystem-1A 364a may store the names of the shares and storage items (such as folders and files), as well as the contents of the storage items, shown in the hierarchy at and below File Server FS1 304. A portion of the FS1 hierarchy shown in FIG. 3A, such the portion rooted at Folder-2 314, may be located on FileServer-VM-2-170b on Host-2 201b instead of FileServer-VM-1-170a, in which case the filesystem instance FileSystem-1B 364b may store the portion of the FS1 hierarchy rooted at Folder-2 314, including Folder-3 314, Folder-4 322 and File-3 324. Similarly, an FS2 hierarchy rooted at File Server FS2 306 in FIG. 3A may be located on FileServer-VM-1 170a and stored in filesystem instance FileSystem-2A 365a. The FS2 hierarchy may be split into multiple portions (not shown), such that one portion is located on FileServer-VM-1 170a on Host-1 201a, and another portion is located on FileServer-VM-2 170b on Host-2 201b and stored in filesystem instance FileSystem-2B 365b.

In particular embodiments, FileServer-VM-1 (abbreviated FSVM-1) 170a on Host-1 201a is a leader for a portion of file server instance FS1 and a portion of FS2, and is a backup for another portion of FS1 and another portion of FS2. The portion of FS1 for which FileServer-VM-1 170a is a leader corresponds to a storage pool labeled FS1-Pool-1 366a. FileServer-VM-1 is also a leader for FS2-Pool-2 367a, and is a backup (e.g., is prepared to become a leader upon request, such as in response to a failure of another FSVM) for FS1-Pool-3 366b and FS2-Pool-4 367b on Host-2. In particular embodiments, FileServer-VM-2 (abbreviated FSVM-2) 170b is a leader for a portion of file server instance FS1 and a portion of FS2, and is a backup for another portion of FS1 and another portion of FS2. The portion of FS1 for which FSVM-2 170*b* is a leader corresponds to a storage pool labeled FS1-Pool-3 366*b*. FSVM-2 170*b* is also a leader for FS2-Pool-4 367*b*, and is a backup for FS1-Pool-1 366*a* and FS2-Pool-2 367*a* on Host-1.

In particular embodiments, the file server instances FS1, FS2 provided by the FSVMs 170*a* and 170*b* may be accessed by user VMs 105 via a network filesystem protocol such as SMB, CIFS, NFS, or the like. Each FSVM 170*a* and 170*b* may provide what appears to client applications on user VMs 105 to be a single filesystem instance, e.g., a single namespace of shares, files and folders, for each file server instance 202. However, the shares, files, and folders in a file server instance such as FS1 may actually be distributed across multiple FSVMs 170*a* and 170*b*. For example, different folders in the same file server instance may be associated with different corresponding FSVMs 170*a* and 170*b* and CVMs 110*a* and 110*b* on different host machines 201*a* and 201*b*.

The example file server instance FS1 304 shown in FIG. 3A has two shares, Share-1 308 and Share-2 310. Share-1 308 may be located on FSVM-1 170*a*, CVM-1 110*a*, and local storage 122*a*. Network filesystem protocol requests from user VMs 105 to read or write data on file server instance FS1 304 and any share, folder, or file in the instance may be sent to FSVM-1 170*a*. FSVM-1 170*a* may determine whether the requested data, e.g., the share, folder, file, or a portion thereof, referenced in the request, is located on FSVM-1, and FSVM-1 is a leader for the requested data. If not, FSVM-1 may respond to the requesting User-VM with an indication that the requested data is not covered by (e.g., is not located on or served by) FSVM-1. Otherwise, the requested data is covered by (e.g., is located on or served by) FSVM-1, so FSVM-1 may send iSCSI protocol requests to a CVM that is associated with the requested data. Note that the CVM associated with the requested data may be the CVM-1 110*a* on the same host machine 201*a* as the FSVM-1, or a different CVM on a different host machine 201*b*, depending on the configuration of the VFS 202. In this example, the requested Share-1 is located on FSVM-1, so FSVM-1 processes the request. To provide for path availability, multipath I/O (MPIO) may be used for communication with the FSVM, e.g., for communication between FSVM-1 and CVM-1. The active path may be set to the CVM that is local to the FSVM (e.g., on the same host machine) by default. The active path may be set to a remote CVM instead of the local CVM, e.g., when a failover occurs.

Continuing with the data request example, the associated CVM is CVM 110*a*, which may in turn access the storage device associated with the requested data as specified in the request, e.g., to write specified data to the storage device or read requested data from a specified location on the storage device. In this example, the associated storage device is in local storage 122*a*, and may be an HDD or SSD. CVM-1 110*a* may access the HDD or SSD via an appropriate protocol, e.g., iSCSI, SCSI, SATA, or the like. CVM 110*a* may send the results of accessing local storage 122*a*, e.g., data that has been read, or the status of a data write operation, to CVM 110*a* via, e.g., SATA, which may in turn send the results to FSVM-1 170*a* via, e.g., iSCSI. FSVM-1 170*a* may then send the results to user VM 105*a* via SMB through the Hypervisor 130*a*.

Share-2 310 may be located on FSVM-2 170*b*, on Host-2. Network file service protocol requests from user VMs 105 to read or write data on Share-2 may be directed to FSVM-2 170*b* on Host-2 by other FSVMs 170*a*. Alternatively, user VMs 105 may send such requests directly to FSVM-2 170*b* on Host-2, which may process the requests using CVM-2 110*b* and local storage 122*b* on Host-2 as described above for FSVM-1 170*a* on Host-1.

A file server instance 202 such as FS1 304 in FIG. 3A may appear as a single filesystem instance (e.g., a single namespace of folders and files that are accessible by their names or pathnames without regard for their physical locations), even though portions of the filesystem are stored on different host machines 201*a-c*. Since each FSVM 170 may provide a portion of a file server instance 202, each FSVM 170 may have one or more "local" filesystems 364*a*, 365*a* that provide the portion of the file server instance 202 (e.g., the portion of the namespace of files and folders) associated with the FSVM 170.

Figure 3C:
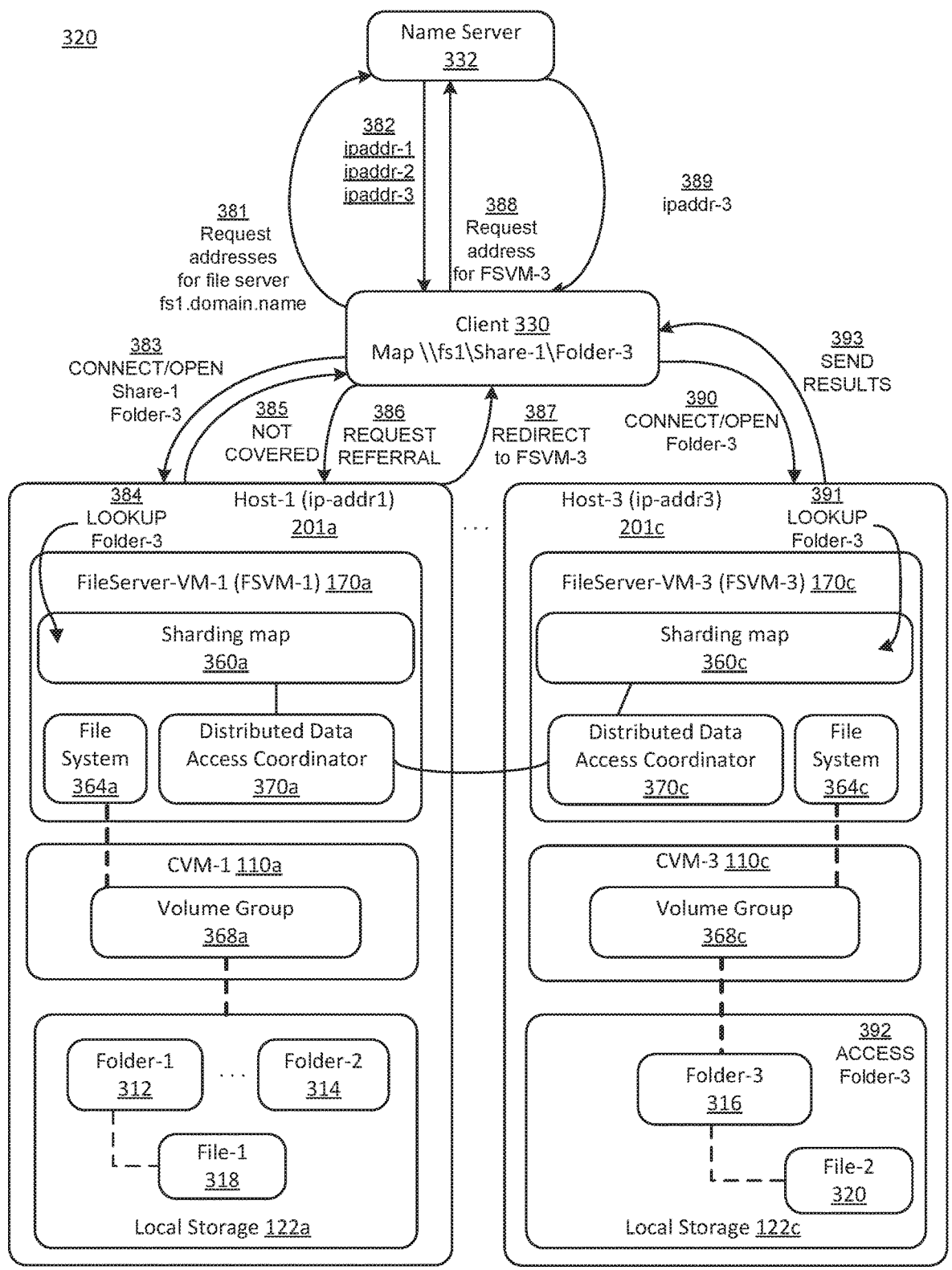
FIG. 3C illustrates example interactions between a client and host machines on which different portions of a virtualized file server instance are stored according to particular embodiments.

FIG. 3C illustrates example interactions between a client 330 and FSVMs 170*a* and 170*c* on which different portions of a VFS instance are stored according to particular embodiments. A client 330, e.g., an application program executing in one of the user VMs 105 on the host machines 201*a-c* of FIGS. 2A-2B (e.g., user VM 105*b* on host machine 201*b*) requests access to a folder \\FS1.domain.name\Share-1 \Folder-3. The request may be in response to an attempt to map \\FS1.domain.name\Share-1 to a network drive in the operating system executing in the user VM 105*c* followed by an attempt to access the contents of Share-1 or to access the contents of Folder-3, such as listing the files in Folder-3.

FIG. 3C shows interactions that occur between the client 330, FSVMs 170*a* and 170*b* on host machines 201*a* and 201*b*, and a name server 332 when a storage item is mapped or otherwise accessed. The name server 332 may be provided by a server computer system, such as one or more of the host machines 201, or a server computer system separate from the host machines 201. In one example, the name server 332 may provide a name service or directory service (e.g., MICROSOFT ACTIVE DIRECTORY) executing on one or more computer systems and accessible via the network 140. The name service may define a namespace for the network in order to assign names to storage items and network resources. By mapping the names to their respective network addresses, particular embodiments may locate, manage, administer, and organize storage items and network resources (e.g., vdisks, volume groups, folders, files, printers, users, groups, devices, and other objects). When using the name service, a user may simply provide a name in order to locate and access the storage item or network resource (without having to specify a physical or virtual address). The interactions are shown as arrows that represent communications, e.g., messages sent via the network 140. Note that the client 330 may be executing in a user VM 105, which may be co-located with one of the FSVMs 170*a* and 170*b*. In such a co-located case, the arrows between the client 330 and the host machine 201 on which the FSVM 170 is located may represent communication within the host machine 201, and such intra-host machine communication may be performed using a mechanism different from communication over the network 140, e.g., shared memory or inter process communication.

In particular embodiments, when the client 330 requests access to Folder-3, a VFS client component executing in the user VM 105*b* may use a distributed filesystem protocol such as MICROSOFT DFS, or the like, to send the storage access request to one or more of the FSVMs 170*a-c* of FIGS. 2A-2B. To access the requested file or folder, the client determines the location of the requested file or folder, e.g., the identity and/or network address of the FSVM 170 on which the file or folder is located. The client may query a domain cache of FSVM 170*a-c* network addresses that the client has previously identified (e.g., looked up). If the domain cache contains the network address of an FSVM 170 associated with the requested folder name \\FS1.domain.name\Share-1 \Folder-3, then the client retrieves the associated network address from the domain cache and sends the access request to the network address, starting at step 393 as described below.

In particular embodiments, at step 381, the client may send a request for a list of addresses of FSVMs 170*a*-170*c* to a name server 332. The name server 332 may be, e.g., a DNS server or other type of server, such as a MICROSOFT domain controller (not shown), that has a database of FSVM addresses. At step 382, the name server 332 may send a reply that contains a list of FSVM 170 network addresses, e.g., ip-addr1, ip-addr2, and ip-addr3, which correspond to the FSVMs 170*a-c* in this example. At step 383, the client 330 may send an access request to one of the network addresses, e.g., the first network address in the list (ip-addr1 in this example), requesting the contents of Folder-3 of Share-1. By selecting the first network address in the list, the particular FSVM 170 to which the access request is sent may be varied, e.g., in a round-robin manner by enabling round-robin DNS (or the like) on the name server 332. The access request may be, e.g., an SMB connect request, an NFS open request, and/or appropriate request(s) to traverse the hierarchy of Share-1 to reach the desired folder or file, e.g., Folder-3 in this example.

At step 384, FileServer-VM-1 170*a* may process the request received at step 383 by searching a mapping or lookup table, such as a sharding map 360*a*, for the desired folder or file. The map 360 maps storage items, such as shares, folders, or files, to their corresponding locations, e.g., the names or addresses of FSVMs 170. The map 360 may have the same contents at each FSVM 170, with the contents on different FSVMs 170 being synchronized using a distributed data store as described below. For example, the map 360*a* may contain entries that map Share-1 and Folder-1 to the File Server FSVM-1 170*a*, and Folder-3 to the File Server FSVM-3 170*c*. An example map 360 is shown in Table 1 below.

TABLE 1

| Storage item | Location |
|---|---|
| Folder-1 | FSVM-1 |
| Folder-2 | FSVM-1 |
| File-1 | FSVM-1 |
| Folder-3 | FSVM-3 |
| File-2 | FSVM-3 |

In particular embodiments, the map 360 may be accessible on each of the host machines 201. As described with reference to FIGS. 2A-2B, the maps 360*a* and 360*c* may be copies of a distributed data structure that are maintained and accessed at each FSVM 170*a-c* using a distributed data access coordinator 370*a* and 370*c*. The distributed data access coordinator 370*a* and 370*c* may be implemented based on distributed locks or other storage item access operations. Alternatively, the distributed data access coordinator 370*a* and 370*c* may be implemented by maintaining a master copy of the maps 360*a* and 360*c* at a leader node such as the host machine 201*c*, and using distributed locks to access the master copy from each FSVM 170*a* and 170*b*. The distributed data access coordinator 370*a* and 370*c* may be implemented using distributed locking, leader election, or related features provided by a centralized coordination service for maintaining configuration information, naming, providing distributed synchronization, and/or providing group services (e.g., APACHE ZOOKEEPER or other distributed coordination software). Since the map 360*a* indicates that Folder-3 is located at FSVM-3 170*c*, the lookup operation at step 384 determines that Folder-3 is not located at FSVM-1. Thus, at step 385 the FSVM-1 170*a* sends a response, e.g., a "Not Covered" DFS response, to the client 330 indicating that the requested folder is not located at FSVM-1. At step 386, the client 330 sends a request to FSVM-1 for a referral to the FSVM on which Folder-3 is located. FSVM-1 uses the map 360*a* to determine that Folder-3 is located at FSVM-3, and at step 387 returns a response, e.g., a "Redirect" DFS response, redirecting the client 330 to FSVM-3. The client 330 may then determine the network address for FSVM-3. In one example, the network address may be a host name constructed from the FSVM name, e.g., the host name "fsvm-3.domain.name" for FSVM-3. In another example the host name may be associated with the FSVM. The host name for FSVM-3 may be ip-addr3 (e.g., a host name "fsvm-3.domain.name" or an IP address, 10.1.1.3). The client 330 may determine the network address for FSVM-3 by searching a cache stored in memory of the client 330, which may contain a mapping from FSVM-3 to ip-addr3 cached in a previous operation. If the cache does not contain a network address for FSVM-3, then at step 388 the client 330 may send a request to the name server 332 to resolve the name FSVM-3. The name server may respond with the resolved address, ip-addr3, at step 389. The client 330 may then store the association between FSVM-3 and ip-addr3 in the client's cache.

In particular embodiments, failure of FSVMs 170 may be detected using the centralized coordination service. For example, using the centralized coordination service, each FSVM 170*a* may create a lock on the host machine 201*a* on which the FSVM 170*a* is located using ephemeral nodes of the centralized coordination service (which are different from host machines 201 but may correspond to host machines 201). Other FSVMs 170*b* and 170*c* may volunteer for leadership of resources of remote FSVMs 170 on other host machines 201, e.g., by requesting a lock on the other host machines 201. The locks requested by the other nodes are not granted unless communication to the leader host machine 201*c* is lost, in which case the centralized coordination service deletes the ephemeral node and grants the lock to one of the volunteer host machines 201*a* and 201*b*, which becomes the new leader. For example, the volunteer host machines 201*a* and 201*b* may be ordered by the time at which the centralized coordination service received their requests, and the lock may be granted to the first host machine 201 on the ordered list. The first host machine 201 (e.g., host machine 201*b*) on the list may thus be selected as the new leader. The FSVM 170*b* on the new leader has ownership of the resources that were associated with the failed leader FSVM 170*a* until the failed leader FSVM 170*c* is restored, at which point the restored FSVM 170*a* may reclaim the local resources of the host machine 201*c* on which it is located.

At step 390, the client 330 may send an access request to FSVM-3 170*c* at ip-addr3 requesting the contents of Folder-3 of Share-1. At step 391, FSVM-3 170*c* queries FSVM-3's copy of the map 360 using FSVM-3's instance of the distributed data access coordinator 370*c*. The map 360 indicates that Folder-3 is located on FSVM-3, so at step 392 FSVM-3 accesses the filesystem 364*c* to retrieve information about Folder-3 316 and its contents (e.g., a list of files in the folder, which includes File-2 320) that are stored on the local storage 122*c*. FSVM-3 may access local storage 122*c* via CVM-3 110*c*, which provides access to local storage 122*c* via a volume group 368*c* that contains one or more volumes stored on one or more storage devices in local storage 122*c*. At step 393, FSVM-3 may then send the information about Folder-3 and its contents to the client 330. Optionally, FSVM-3 may retrieve the contents of File-2 and send them to the client 330, or the client 330 may send a subsequent request to retrieve File-2 as needed.

Figure 3D:
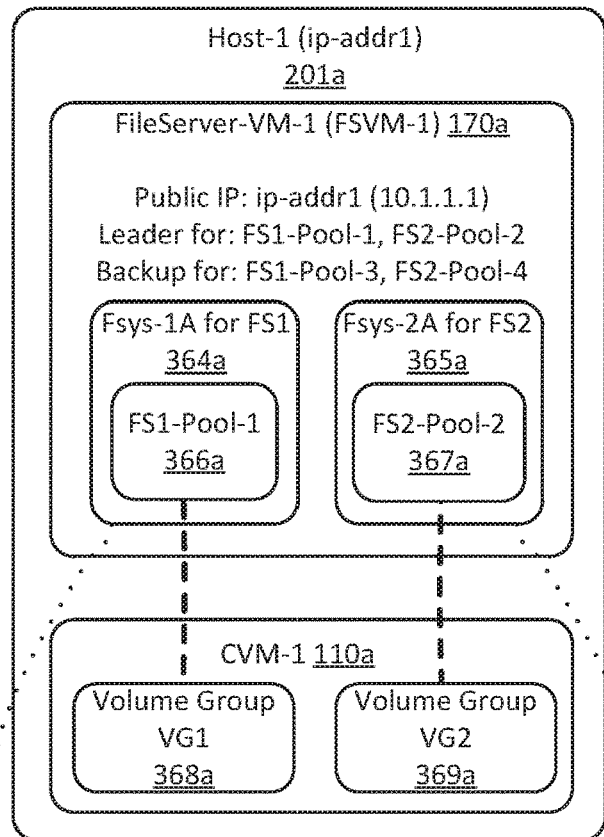
FIG. 3D illustrates an example virtualized file server providing failover capability according to particular embodiments.
Figure 3D:
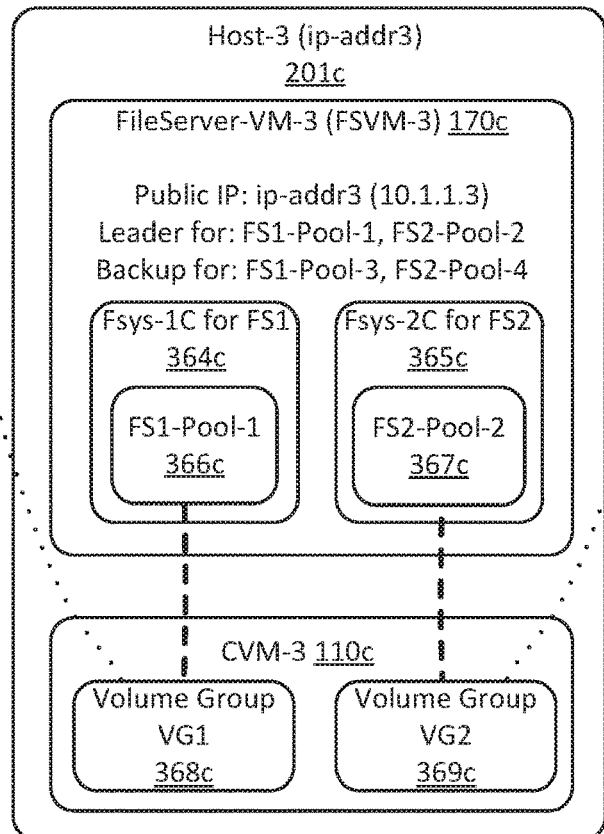

FIG. 3D illustrates an example virtualized file server having a failover capability according to particular embodiments. To provide high availability, e.g., so that the file server continues to operate after failure of components such as a CVM, FSVM, or both, as may occur if a host machine fails, components on other host machines may take over the functions of failed components. When a CVM fails, a CVM on another host machine may take over input/output operations for the failed CVM. Further, when an FSVM fails, an FSVM on another host machine may take over the network address and CVM or volume group that were being used by the failed FSVM. If both an FSVM and an associated CVM on a host machine fail, as may occur when the host machine fails, then the FSVM and CVM on another host machine may take over for the failed FSVM and CVM. When the failed FSVM and/or CVM are restored and operational, the restored FSVM and/or CVM may take over the operations that were being performed by the other FSVM and/or CVM. In FIG. 3D, FSVM-1 170*a* communicates with CVM-1 110*a* to use the data storage in volume groups VG1 368*a* and VG2 369*a*. For example, FSVM-1 is using disks in VG1 and VG2, which are iSCSI targets. FSVM-1 has iSCSI initiators that communicate with the VG1 and VG2 targets using MPIO (e.g., DM-MPIO on the LINUX operating system). FSVM-1 may access the volume groups VG1 and VG2 via in-guest iSCSI. Thus, any FSVM may connect to any iSCSI target if an FSVM failure occurs.

In particular embodiments, during failure-free operation, there are active iSCSI paths between FSVM-1 and CVM-1, as shown in FIG. 3D by the dashed lines from the FSVM-1 filesystems for FS1 364*a* and FS2 365*a* to CVM-1's volume group VG1 368*a* and VG2 369*a*, respectively. Further, during failure-free operation there are inactive failover (e.g., standby) paths between FSVM-1 and CVM-3 110*c*, which is located on Host-3. The failover paths may be, e.g., paths that are ready to be activated in response to the local CVM CVM-1 becoming unavailable. There may be additional failover paths that are not shown in FIG. 3D. For example, there may be failover paths between FSVM-1 and a CVM on another host machine, such as CVM-2 110*b* on Host-2 201*b*. The local CVM CVM-1 110*a* may become unavailable if, for example, CVM-1 crashes, or the host machine on which the CVM-1 is located crashes, loses power, loses network communication between FSVM-1 170*a* and CVM-1 110*a*. As an example and not by way of limitation, the failover paths do not perform I/O operations during failure-free operation. Optionally, metadata associated with a failed CVM 110*a*, e.g., metadata related to volume groups 368*a*, 369*a* associated with the failed CVM 110*a*, may be transferred to an operational CVM, e.g., CVM 110*c*, so that the specific configuration and/or state of the failed CVM 110*a* may be re-created on the operational CVM 110*c*.

Figure 3E:
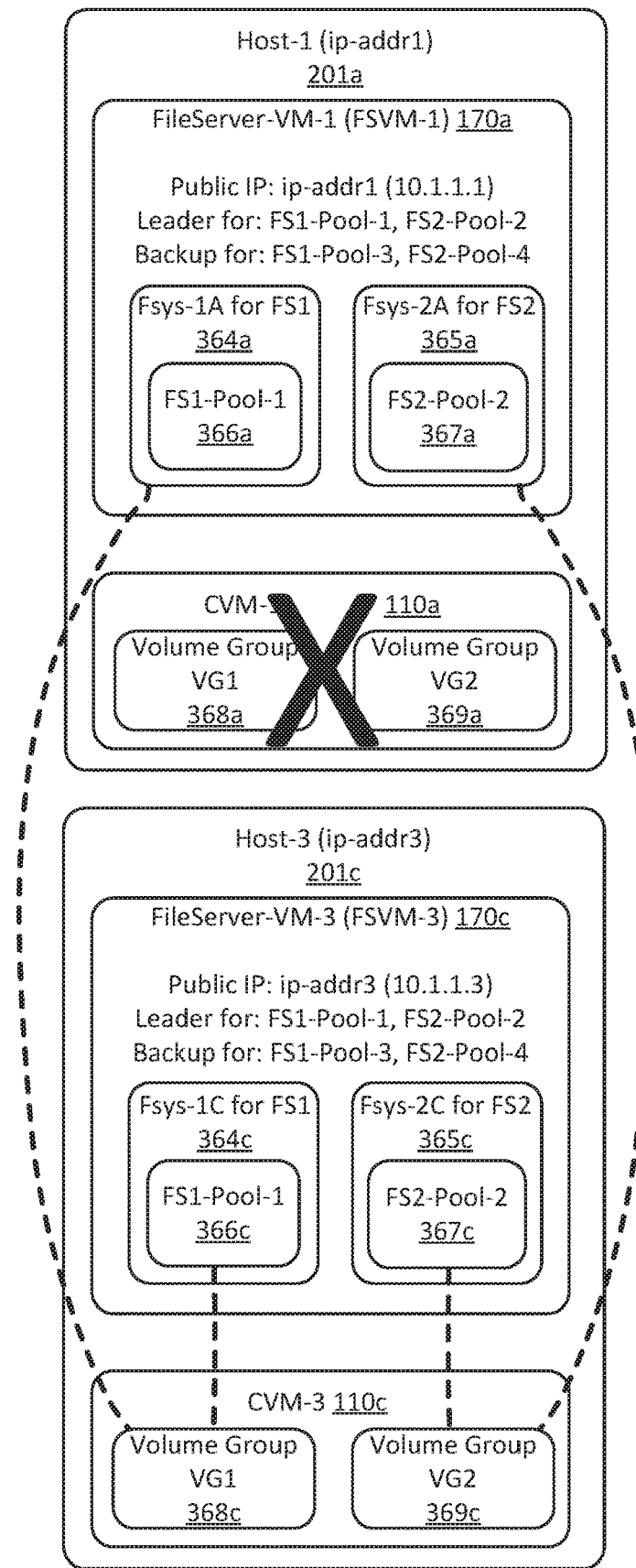
FIG. 3E illustrates an example virtualized file server that has recovered from a Controller/Service VM failure by switching to an alternate Controller/Service VM according to particular embodiments.

FIG. 3E illustrates an example virtualized file server that has recovered from a failure of Controller/Service VM CVM-1 110*a* by switching to an alternate Controller/Service VM CVM-3 110*c* according to particular embodiments. When CVM-1 110*a* fails or otherwise becomes unavailable, then the FSVM associated with CVM-1, FSVM-1 170*a*, may detect a PATH DOWN status on one or both of the iSCSI targets for the volume groups VG1 368*a* and VG2 369*a*, and initiate failover to a remote CVM that can provide access to those volume groups VG1 and VG2. Further, if a CVM's host machine crashes, and volume groups such as VG1 and VG2 are stored on the crashed host machine, one or more CVMs on one or more other host machines may provide access to those volume groups (e.g., VG1 and VG2) using redundant data and metadata that is stored on the CVM cluster. One or more redundant copies of the data and metadata may be stored, and the number of CVM failures that can be tolerated corresponds to the number of redundant copies. For example, when CVM-1 110*a* fails, the iSCSI MPIO may activate failover (e.g., standby) paths to the remote iSCSI target volume group(s) associated with the remote CVM-3 110*c* on Host-3 201*c*. CVM-3 provides access to volume groups VG1 and VG2 as VG1 368*c* and VG2 369*c*, which are on storage device(s) of local storage 122*c*. The activated failover path may take over I/O operations from failed CVM-1 110*a*. Optionally, metadata associated with the failed CVM-1 110*a*, e.g., metadata related to volume groups 368*a*, 369*a*, may be transferred to CVM-3 so that the specific configuration and/or state of CVM-1 may be re-created on CVM-3. When the failed CVM-1 again becomes available, e.g., after it has been re-started and has resumed operation, the path between FSVM-1 and CVM-1 may reactivated or marked as the active path, so that local I/O between CVM-1 and FSVM-1 may resume, and the path between CVM-3 and FSVM-1 may again become a failover (e.g., standby) path.

Figure 3F:
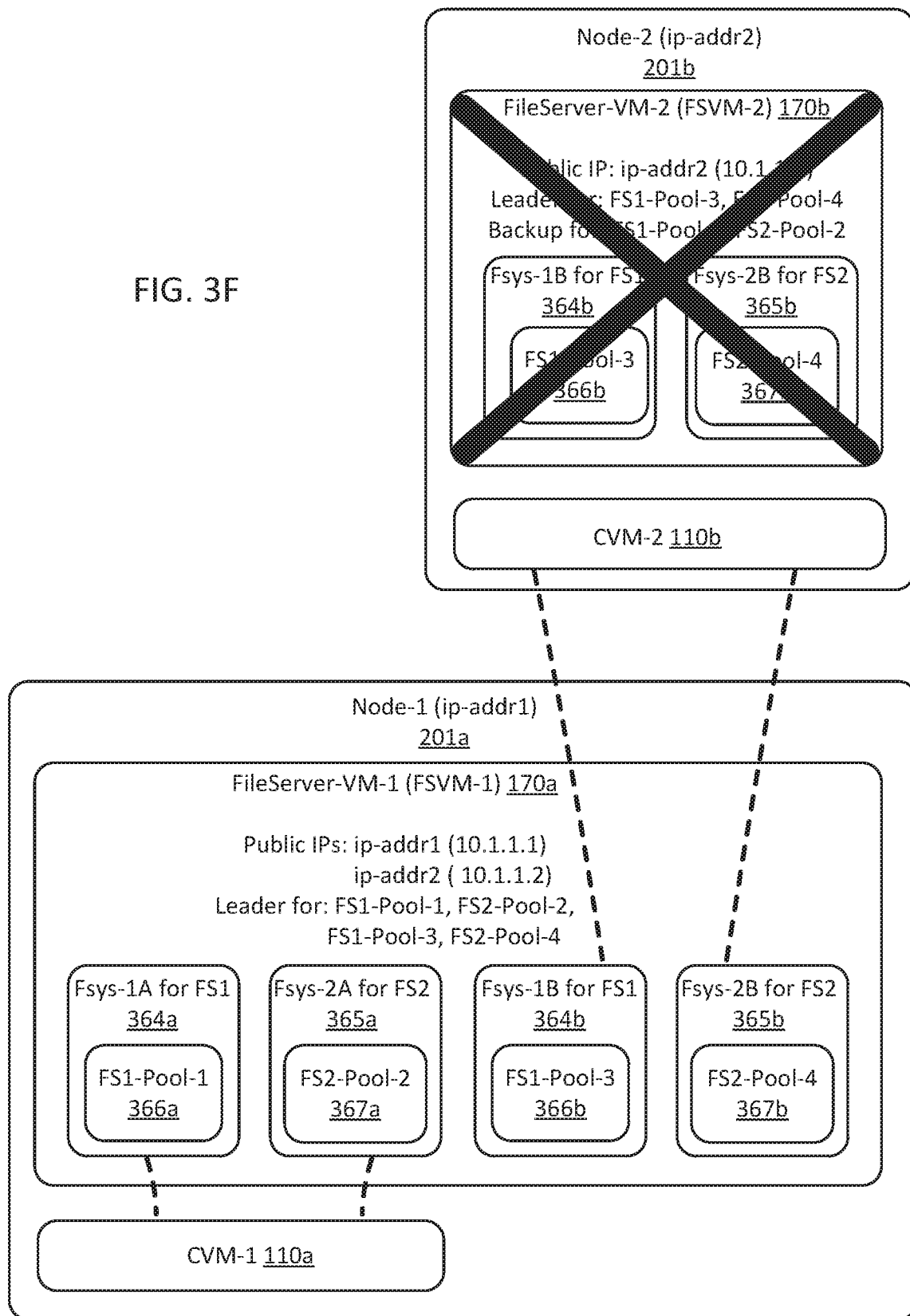
FIG. 3F illustrates an example virtualized file server that has recovered from failure of a file server VM by electing a new leader file server VM according to particular embodiments.

FIG. 3F illustrates an example virtualized file server that has recovered from failure of a FSVM by electing a new leader FSVM according to particular embodiments. When an FSVM-2 170*b* fails, e.g., because it has been brought down for maintenance, has crashed, the host machine on which it was executing has been powered off or crashed, network communication between the FSVM and other FSVMs has become inoperative, or other causes, then the CVM that was being used by the failed FSVM, the CVM's associated volume group(s), and the network address of the host machine on which the failed FSVM was executing may be taken over by another FSVM to provide continued availability of the file services that were being provided by the failed FSVM. In the example shown in FIG. 3F, FSVM-2 170*b* on Host-2 201*b* has failed. One or more other FSVMs, e.g., FSVM-1 170*a* or FSVM-3 170*c*, or other components located on one or more other host machines, may detect the failure of FSVM-2, e.g., by detecting a communication timeout or lack of response to a periodic status check message. When FSVM-2's failure is detected, an election may be held, e.g., using a distributed leader election process such as that provided by the centralized coordination service. The host machine that wins the election may become the new leader for the filesystem pools 366*b*, 367*b* for which the failed FSVM-2 was the leader. In this example, FSVM-1 170*a* wins the election and becomes the new leader for the pools 366*b*, 367*b*. FSVM-1 170*a* thus attaches to CVM-2 110*b* by creating filesystem 364*b*, 365*b* instances for the file server instances FS1 and FS2 using FS1-Pool-3 366*b* and FS2-Pool-4 367*b*, respectively. In this way, FSVM-1 takes over the filesystems and pools for CVM-2's volume groups, e.g., volume groups VG1 366*b* and VG2 367*b* of local storage 122*b*. Further, FSVM-1 takes over the IP address associated with FSVM-2, 10.1.1.2, so that storage access requests sent to FSVM-2 are received and processed by FSVM-1. Host-2 201*b* may continue to operate, in which case CVM-2 110*b* may continue to execute on Host-2. When FSVM-2 again becomes available, e.g., after it has been re-started and has resumed operation, FSVM-2 may assert leadership and take back its IP address (10.1.1.2) and storage (FS1-Pool-3 366*b* and FS2-Pool-4 367*b*) from FSVM-1.

Figure 3G:
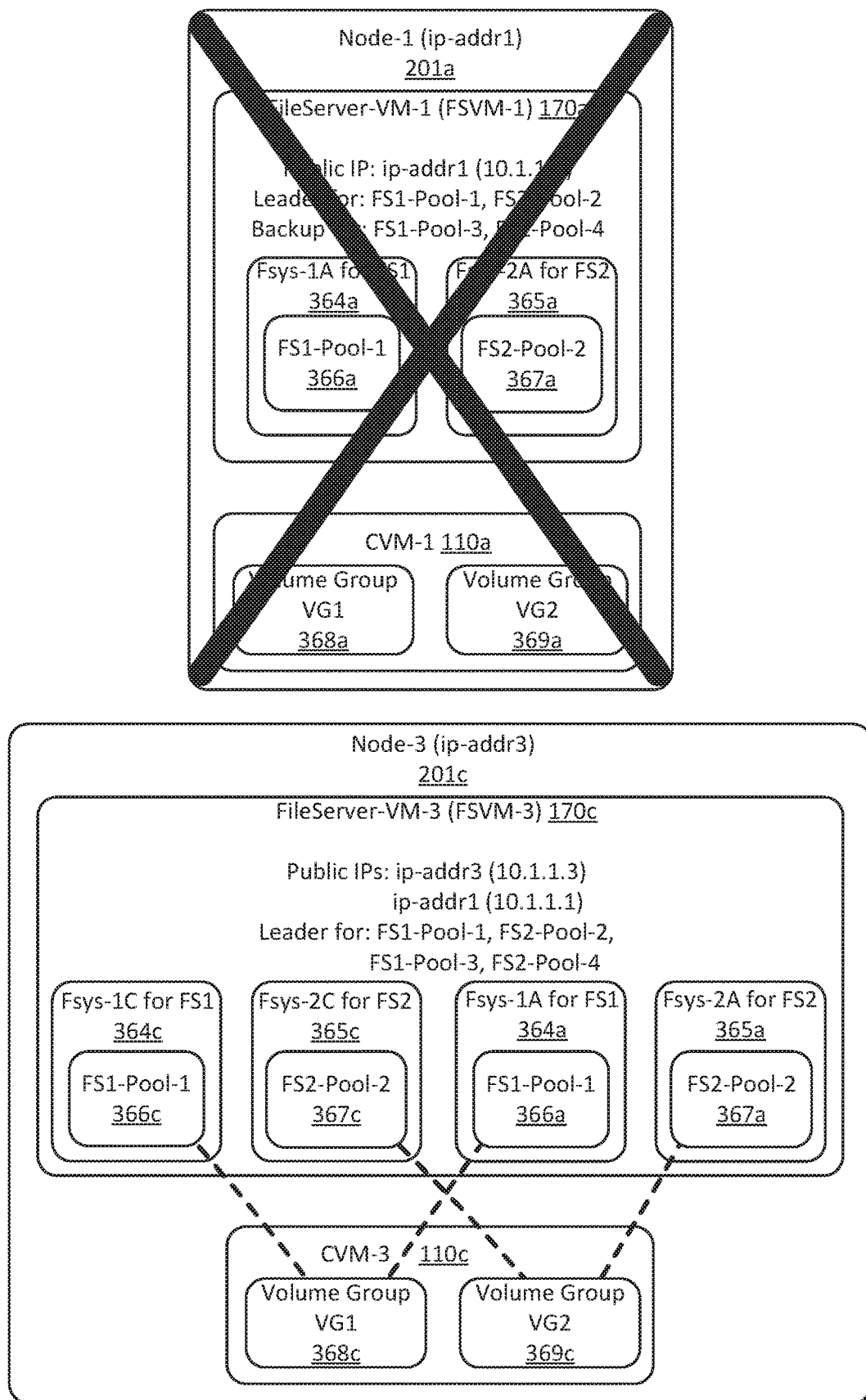
FIG. 3G illustrates an example failure of a host machine that causes failure of both the file server VM and the Controller/Service VM located on the host machine according to particular embodiments.
Figure 3H:
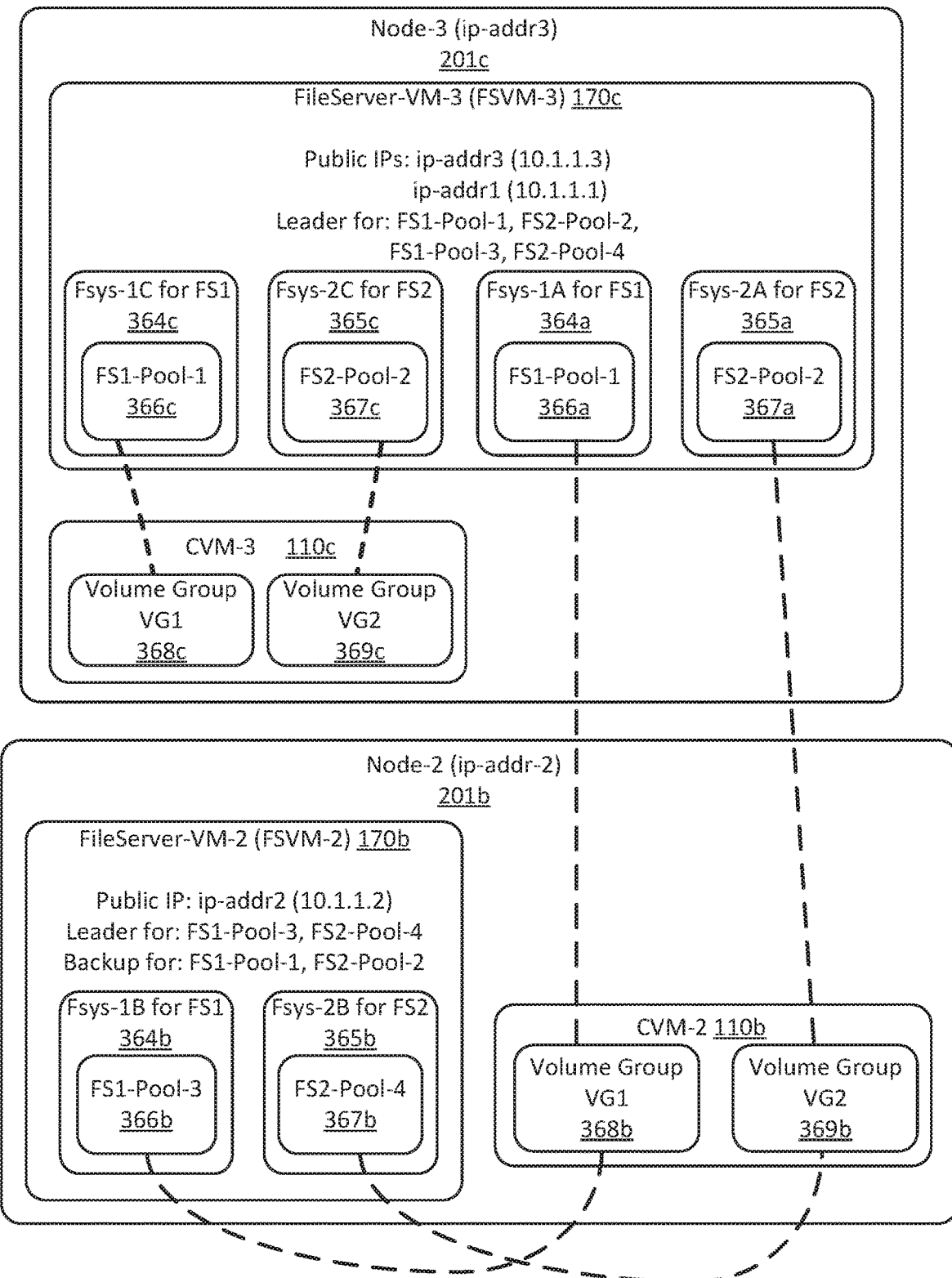
FIG. 3H illustrates an example virtualized file server that has recovered from a host machine failure by switching to a Controller/Service VM and a file server VM located on a backup host machine according to particular embodiments.

FIGS. 3G and 3H illustrate example virtualized file servers that have recovered from failure of a host machine 201*a* by switching to another Controller/Service VM and another FSVM according to particular embodiments. The other Controller/Service VM and FSVM are located on a single host machine 201*c* in FIG. 3G, and on two different host machines 201*b*, 201*c* in FIG. 3H. In both FIGS. 3G and 3H, Host-1 201*a* has failed, e.g., crashed or otherwise become inoperative or unresponsive to network communication. Both FSVM-1 170*a* and CVM-1 110*a* located on the failed Host-1 201*a* have thus failed. Note that the CVM 110*a* and FSVM 170*a* on a particular host machine 201*a* may both fail even if the host machine 201*a* itself does not fail. Recovery from failure of a CVM 110*a* and an FSVM 170*a* located on the same host machine 201*a*, regardless of whether the host machine 201*a* itself failed, may be performed as follows. The failure of FSVM-1 and CVM-1 may be detected by one or more other FSVMs, e.g., FSVM-2 170*b*, FSVM-3 170*c*, or by other components located on one or more other host machines. FSVM-1's failure may be detected when a communication timeout occurs or there is no response to a periodic status check message within a timeout period, for example. CVM-1's failure may be detected when a PATH DOWN condition occurs on one or more of CVM-1's volume groups' targets (e.g., iSCSI targets).

When FSVM-1's failure is detected, an election may be held as described above with reference to FIG. 3F to elect an active FSVM to take over leadership of the portions of the file server instance for which the failed FSVM was the leader. These portions are FileSystem-1A 364*a* for the portion of file server FS1 located on FSVM-1, and FileSystem-2A 365*a* for the portion of file server FS2 located on FSVM-1. FileSystem-1A 364*a* uses the pool FS-Pool-1 366*a* and FileSystem-2A 365*a* uses the pool FS2-Pool-2 367*a*. Thus, the FileSystem-1A 364*a* and FileSystem-2A may be re-mounted on the new leader FSVM-3 170*c* on Host-3 201*c*. Further, FSVM-3 170*c* may take over the IP address associated with failed FSVM-1 170*a*, 10.1.1.1, so that storage access requests sent to FSVM-1 are received and processed by FSVM-3.

One or more failover paths from an FSVM to volume groups on one or more CVMs may be defined for use when a CVM fails. When CVM-1's failure is detected, the MPIO may activate one of the failover (e.g., standby) paths to remote iSCSI target volume group(s) associated with a remote CVM. For example, there may be a first predefined failover path from FSVM-1 to the volume groups VG1 368*c*, 369*c* in CVM-3 (which are on the same host as FSVM-1 when FSVM-1 is restored on Host-3 in examples of FIGS. 3G and 3H), and a second predefined failover path to the volume groups VG1 368*b*, VG2 369*b* in CVM-2. The first failover path, to CVM-3, is shown in FIG. 3G, and the second failover path, to CVM-2 is shown in FIG. 3H. An FSVM or MPIO may choose the first or second failover path according to the predetermined MPIO failover configuration that has been specified by a system administrator or user. The failover configuration may indicate that the path is selected (a) by reverting to the previous primary path, (b) in order of most preferred path, (c) in a round-robin order, (d) to the path with the least number of outstanding requests, (e) to the path with the least weight, or (f) to the path with the least number of pending requests. When failure of CVM-1 110*a* is detected, e.g., by FSVM-1 or MPIO detecting a PATH DOWN condition on one of CVM-1's volume groups VG1 368*a* or VG2 369*a*, the alternate CVM on the selected failover path may take over I/O operations from the failed CVM-1. As shown in FIG. 3G, if the first failover path is chosen, CVM-3 110*c* on Host-3 201*c* is the alternate CVM, and the pools FS1-Pool-1 366*a* and FS2-Pool-2 367*a*, used by the filesystems FileSystem-1A 364*a* and FileSystem-2A 365*a*, respectively, which have been restored on FSVM-3 on Host-3, may use volume groups VG1 368*c* and VG2 369*c* of CVM-3 110*c* on Host-3 when the first failover path is chosen. Alternatively, as shown in FIG. 3H, if the second failover path is chosen, CVM-2 on Host-2 is the alternate CVM, and the pools FS1-Pool-1 366*a* and FS2-Pool-2 367*a* used by the respective filesystems FileSystem-1A 364*a* and FileSystem-2A 365*a*, which have been restored on FSVM-3, may use volume groups VG1 368*b* and VG2 369*b* on Host-2, respectively.

In particular embodiments, metadata associated with the failed CVM-1 110*a*, e.g., metadata related to volume groups 368*a*, 369*a*, may be transferred to the alternate CVM (e.g., CVM-2 or CVM-3) that the specific configuration and/or state of CVM-1 may be re-created on the alternative CVM. When FSVM-1 again becomes available, e.g., after it has been re-started and has resumed operation on Host-1 201*a* or another host machine, FSVM-1 may assert leadership and take back its IP address (10.1.1.1) and storage assignments (FileSystem-1A and FS1-Pool-1 366*a*, and FileSystem-2A and FS2-Pool-2 366*b*) from FSVM-3. When CVM-1 again becomes available, MPIO or FSVM-1 may switch the FSVM to CVM communication paths (iSCSI paths) for FileSystem-1A 364*a* and FileSystem-2A 365*a* back to the pre-failure paths, e.g., the paths to volume groups VG1 368*a* and 369*a* in CVM-1 110*a*, or the selected alternate path may remain in use. For example, the MPIO configuration may specify that fail back to FSVM-1 is to occur when the primary path is restored, since communication between FSVM-1 and CVM-1 is local and may be faster than communication between FSVM-1 and CVM-2 or CVM-3. In this case, the paths between CVM-2 and/or CVM-3 and FSVM-1 may again become failover (e.g., standby) paths.

Figure 4A:
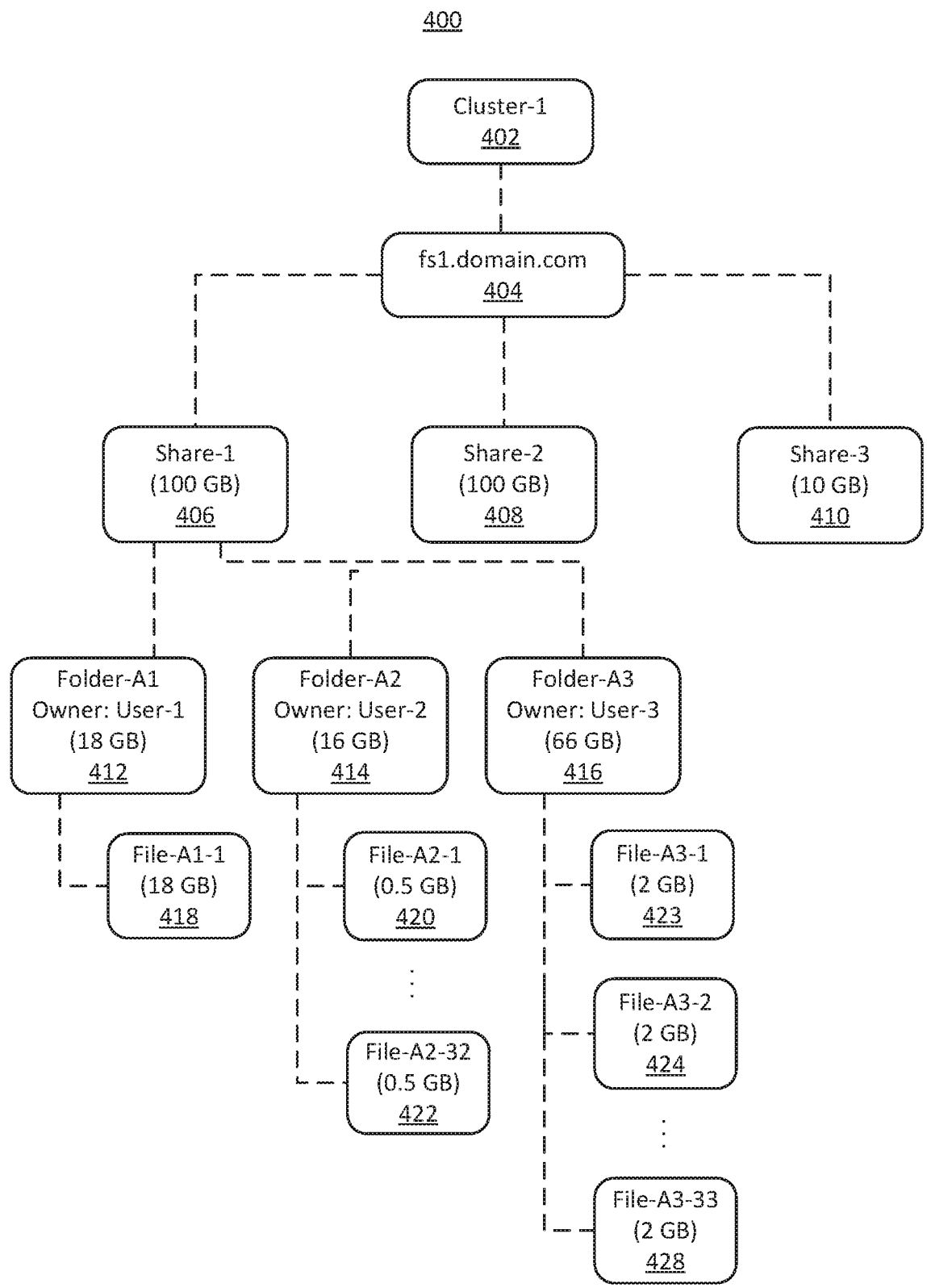
FIGS. 4A and 4B illustrate an example hierarchical namespace of a file server according to particular embodiments.
Figure 4B:
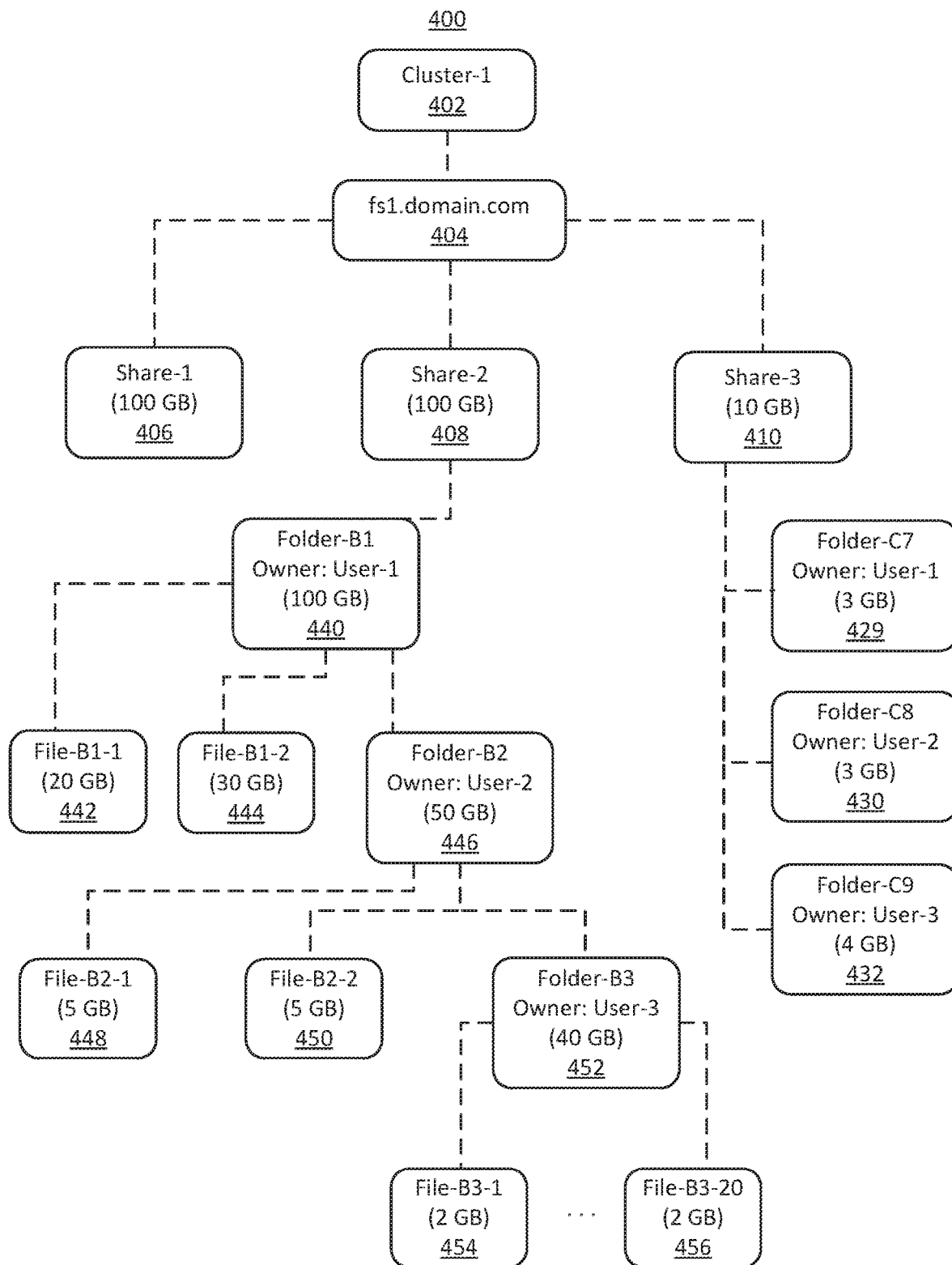

FIGS. 4A and 4B illustrate an example hierarchical namespace 400 of a file server according to particular embodiments. Cluster-1 402 is a cluster, which may contain one or more file server instances, such as an instance named FS1.domain.com 404. Although one cluster is shown in FIGS. 4A and 4B, there may be multiple clusters, and each cluster may include one or more file server instances. The file server FS1.domain.com 404 contains three shares: Share-1 406, Share-2 408, and Share-3 410. Share-1 may be a home directory share on which user directories are stored, and Share-2 and Share-3 may be departmental shares for two different departments of a business organization, for example. Each share has an associated size in gigabytes, e.g., 100 Gb (gigabytes) for Share-1, 100 Gb for Share-2, and 10 Gb for Share-3. The sizes may indicate a total capacity, including used and free space, or may indicate used space or free space. Share-1 includes three folders, Folder-A1 412, Folder-A2 414, and Folder-A3 416. The capacity of Folder-A1 is 18 Gb, Folder-A2 is 16 Gb, and Folder-A3 is 66 Gb. Further, each folder is associated with a user, referred to as an owner. Folder-A1 is owned by User-1, Folder-A2 by User-2, and Folder-A3 by User-3. Folder-A1 contains a file named File-A1-1 418, of size 18 Gb. Folder-A2 contains 32 files, each of size 0.5 Gb, named File-A2-1 420 through File-A2-32 422. Folder-A3 contains 33 files, each of size 2 Gb, named File-A3-1 423 and File-A3-2 424 through File-A3-33 426.

FIG. 4B shows the contents of Share-2 408 and Share-3 410 of FS1.domain.com 404. Share-2 contains a folder named Folder-B1 440, owned by User-1 and having a size of 100 Gb. Folder-B1 contains File-B1-1 442 of size 20 Gb, File-B1-2 444 of size 30 Gb, and Folder-B2 446, owned by User-2 and having size 50 Gb. Folder-B2 contains File-B2-1 448 of size 5 Gb, File-B2-2 450 of size 5 Gb, and Folder-B3 452, owned by User-3 and having size 40 Gb. Folder-B3 452 contains 20 files of size 2 Gb each, named File-B3-1 454 through File-B3-20 456. Share-3 contains three folders: Folder-C7 429 owned by User-1 of size 3 Gb, Folder-C8 430 owned by User-2 of size 3 Gb, and Folder-C9 432 owned by User-3 of size 4 Gb.

Figure 4C:
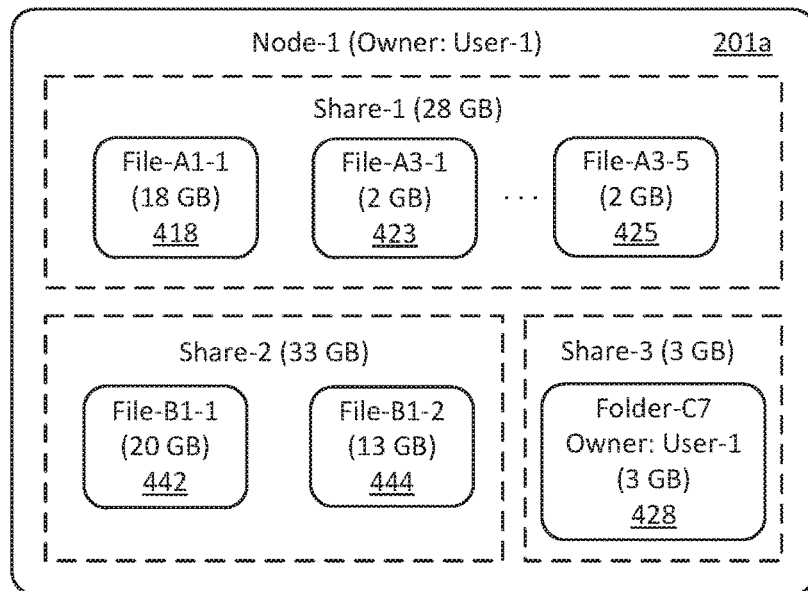
FIG. 4C illustrates distribution of stored data amongst host machines in a virtualized file server according to particular embodiments.

FIG. 4C illustrates distribution of stored data amongst host machines in a virtualized file server according to particular embodiments. In the example of FIG. 4C, the three shares are spread across three host machines 201a-c. Approximately one-third of each share is located on each of the three FSVMs 170a-c. For example, approximately one-third of Share-3's files are located on each of the three FSVMs 170a-c. Note that from a user's point of a view, a share looks like a directory. Although the files in the shares (and in directories) are distributed across the three FSVMs 170a-c, the VFS 202 provides a directory structure having a single namespace in which client executing on user VMs 105 may access the files in a location-transparent way, e.g., without knowing which FSVMs store which files (or which blocks of files).

In the example of FIG. 4C, Host-1 stores (e.g., is assigned to) 28 Gb of Share-1, including 18 Gb for File-A1-1 418 and 2 Gb each for File-A3-1 423 through File-A3-5 425, 33 Gb of Share-2, including 20 Gb for File-B1-1 and 13 Gb for File-B1-2, and 3 Gb of Share-3, including 3 Gb of Folder-C7. Host-2 stores 26 Gb of Share-1, including 0.5 Gb each of File-A2-1 420 through File-A2-32 422 (16 Gb total) and 2 Gb each of File-A3-6 426 through File-A3-10 427 (10 Gb total), 27 Gb of Share-2, including 17 Gb of File-B1-2, 5 Gb of File-B2-1, and 5 Gb of File-B2-2, and 3 Gb of Share-3, including 3 Gb of Folder-C8. Host-3 stores 46 Gb of Share-1, including 2 Gb each of File-A3-11 429 through File-A3-33 428 (66 Gb total), 40 Gb of Share-2, including 2 Gb each of File-B3-1 454 through File-B3-20 456, and Share-3 stores 4 Gb of Share-3, including 4 Gb of Folder-C9 432.

In particular embodiments, a system for managing communication connections in a virtualization environment includes a plurality of host machines implementing a virtualization environment. Each of the host machines includes a hypervisor and at least one user VM 105. The system may also include a connection agent, an I/O controller, and/or a virtual disk comprising a plurality of storage devices. The virtual disk may be accessible by all of the I/O controllers, and the I/O controllers may conduct I/O transactions with the virtual disk based on I/O requests received from the user VMs 105. The I/O requests may be, for example, requests to perform particular storage access operations such as list folders and files in a specified folder, create a new file or folder, open an existing file for reading or writing, read data from or write data to a file, as well as file manipulation operations to rename, delete, copy, or get details, such as metadata, of files or folders. Each I/O request may reference, e.g., identify by name or numeric identifier, a file or folder on which the associated storage access operation is to be performed. The system further includes a virtualized file server, which includes a plurality of FSVMs 170 and associated local storage 122. Each FSVM 170 and associated local storage device 122 is local to a corresponding one of the host machines 201. The FSVMs 170 conduct I/O transactions with their associated local storage 122 based on I/O requests received from the user VMs 105. For each one of the host machines 201, each of the user VMs 105 on the one of the host machines 201 sends each of its respective I/O requests 383 to a selected one of the FSVMs 170, which may be selected based on a lookup table 360, e.g., a sharding map, that maps a file 318, folder 312, or other storage resource referenced by the I/O request to the selected one of the FSVMs 170).

In particular embodiments, the initial FSVM to receive the request from the user VM may be determined by selecting any of the FSVMs 170 on the network 140, e.g., at random, by round robin selection, or by a load-balancing algorithm, and sending an I/O request 383 to the selected FSVM 170 via the network 140 or via local communication within the host machine 201. Local communication may be used if the file 318 or folder 412 referenced by the I/O request is local to the selected FSVM, e.g., the referenced file or folder is located on the same host machine 201 as the selected FSVM 170. In this local case, the I/O request 383 need not be sent via the network 140. Instead, the I/O request 383 may be sent to the selected FSVM 170 using local communication, e.g., a local communication protocol such as UNIX domain sockets, a loopback communication interface, inter-process communication on the host machine 201, or the like. The selected FSVM 170 may perform the I/O transaction specified in the I/O request and return the result of the transaction via local communication. If the referenced file or folder is not local to the selected FSVM, then the selected FSVM may return a result indicating that the I/O request cannot be performed because the file or folder is not local to the FSVM. The user VM may then submit a REFERRAL request or the like to the selected FSVM, which may determine which FSVM the referenced file or folder is local to (e.g., by looking up the FSVM in a distributed mapping table), and return the identity of that FSVM to the user VM in a REDIRECT response or the like. Alternatively, the selected FSVM may determine which FSVM the referenced file or folder is local to, and return the identity of that FSVM to the user VM in the first response without the REFERRAL and REDIRECT messages. Other ways of re-directing the user VM to the FSVM of the referenced file are contemplated. For example, the FSVM that is on the same host as the requesting user VM (e.g., local to the requesting user VM) may determine which FSVM the file or folder is local to, and inform the requesting user VM of the identity of that FSVM without communicating with a different host.

In particular embodiments, the file or folder referenced by the I/O request includes a file server name that identifies a virtualized file server on which the file or folder is stored. The file server name may also include or be associated with a share name that identifies a share, filesystem, partition, or volume on which the file or folder is stored. Each of the user VMs on the host machine may send a host name lookup request, e.g., to a domain name service, that includes the file server name, and may receive one or more network addresses of one or more host machines on which the file or folder is stored.

In particular embodiments, as described above, the FSVM may send the I/O request to a selected one of the FSVMs. The selected one of the FSVMs may be identified by one of the host machine network addresses received above. In one aspect, the file or folder is stored in the local storage of one of the host machines, and the identity of the host machines may be determined as described below.

In particular embodiments, when the file or folder is not located on storage local to the selected FSVM, e.g., when the selected FSVM is not local to the identified host machine, the selected FSVM responds to the I/O request with an indication that the file or folder is not located on the identified host machine. Alternatively, the FSVM may look up the identity of the host machine on which the file or folder is located, and return the identity of the host machine in a response.

In particular embodiments, when the host machine receives a response indicating that the file or folder is not located in the local storage of the selected FSVM, the host machine may send a referral request (referencing the I/O request or the file or folder from the I/O request) to the selected FSVM. When the selected FSVM receives the referral request, the selected FSVM identifies one of the FSVMs 170 that is associated with a file or folder referenced in the referral request based on an association that maps files to FSVMs, such as a sharding table (which may be stored by the centralized coordination service). When the selected FSVM is not local to the host machine, then the selected FSVM sends a redirect response that redirects the user VM on the host machine to the selected FSVM. That is, the redirect response may reference the identified FSVM. In particular embodiments, the user VM on the host machine receives the redirect response and may cache an association between the file or folder referenced in the I/O request and the FSVM 170 referenced in the redirect response.

In particular embodiments, the user VM on the host machine may send a host name lookup request that includes the name of the identified FSVM 170 to a name service, and may receive the network address of the identified FSVM from the name service. The user VM on the host machine may then send the I/O request to the network address received from the name service. The FSVM on the host machine may receive the I/O request and performs the I/O transaction specified therein. That is, when the FSVM is local to the identified host machine, the FSVM performs the I/O transaction based on the I/O request. After performing or requesting the I/O transaction, the FSVM may send a response that includes a result of the I/O transaction back to the requesting host machine. I/O requests from the user VM may be generated by a client library that implements file I/O and is used by client program code (such as an application program).

Figure 5:
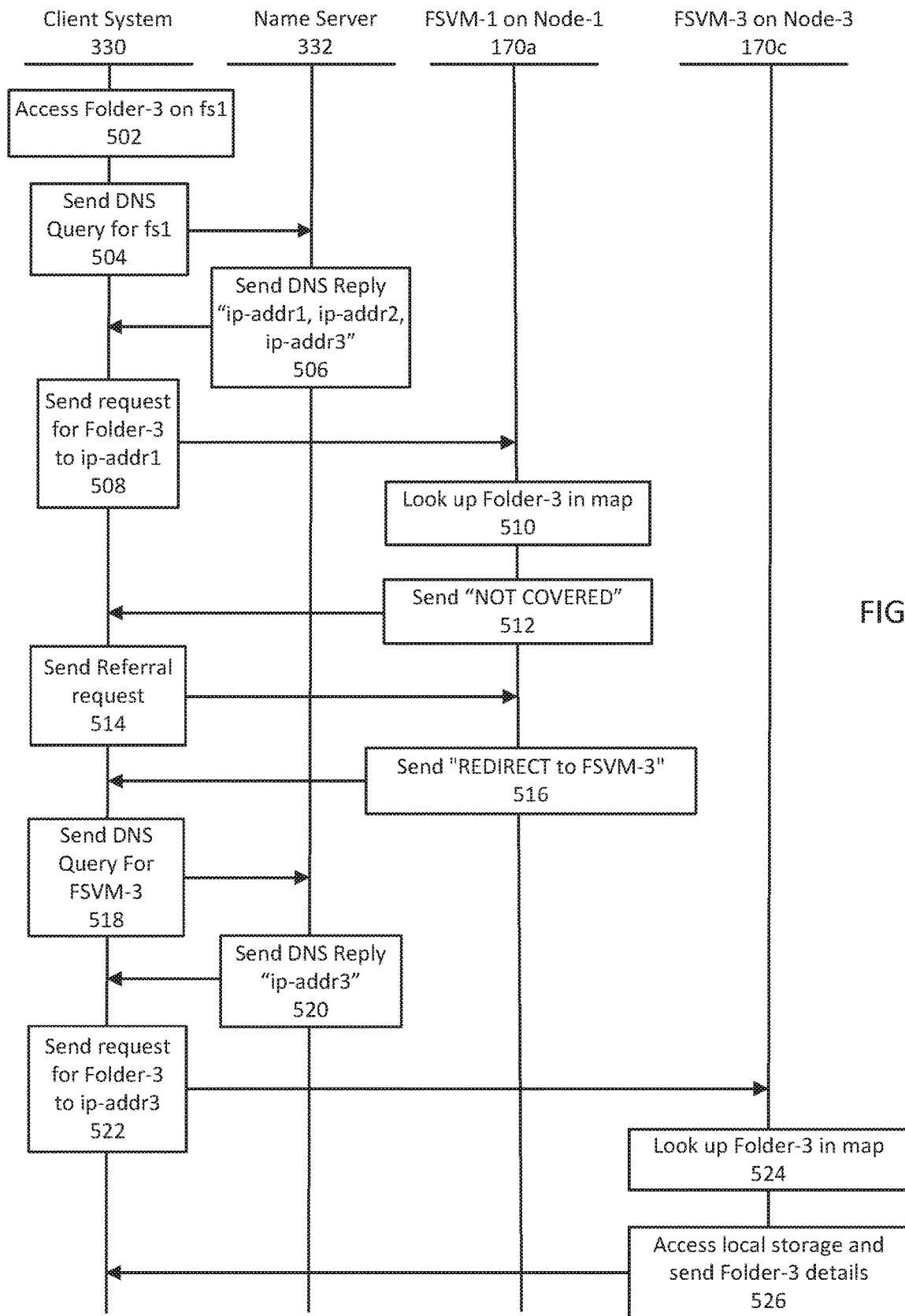
FIG. 5 illustrates an example method for accessing data in a virtualized file server according to particular embodiments.

FIG. 5 illustrates an example method for accessing data in a virtualized file server according to particular embodiments. The client system 330 may access the data, such as a specified folder, as follows. At step 502, the client system 330 receives a storage access request from an application executing in a user VM. Each storage access request references a file path (e.g., \\FS1.domain.com\share-1 \Folder-1), which includes a file or folder name and further includes or can be used to identify a share name (e.g., FS1.domain.com\share-1) or an NFS remote filesystem name (e.g., fs1.domain.com:/share-1. The storage access request may also include an operation type (e.g., read, write, delete, rename, etc.), a position in the file (for read/write requests), data to be written (for write requests), quantity of data to be read (for read requests), a new file path (for rename requests), folder name (for folder creation requests) or other information appropriate for the operation type. At step 504, the client system may send a DNS query request for the file server portion of the share name (e.g., \\fs1.domain.com for the share \\FS1.domain.com\share-1) to a name server 332, which may return the identity of a selected FSVM as a result. The name server 332 may be a DNS server. The selected FSVM is not necessarily the FSVM on which the file or folder itself is located, however, since the share may be distributed amongst multiple FSVMs, one of which actually stores the file or folder. In particular embodiments, a FSVM can determine which FSVM a file is stored on, and, if a FSVM receives a request for a file stored on a different FSVM, the FSVM sends a referral response that includes the identity of the FSVM on which the file is stored.

At step 506, the name server 332 may respond to the client with an IP (network) address of one or more FSVMs where the file or folder may be located. For example, the DNS server entry FS1.domain.com includes entries for FSVM-1, FSVM-2, and FSVM-3, which are, respectively, ip-addr1, ip-addr2, ip-addr3 (or 10.1.1.1, 10.1.1.2, 10.1.1.3). One of these three example IP addresses may be selected by the DNS server and returned in a response. In one example, the DNS server returns the three IP addresses in a different permutation for each request using DNS round robin so that a different server may be selected by the client for each request to balance the request load among the three servers. In this example, ip-addr1 (10.1.1.1) is the first address in the list sent in the reply to the client 330, and so is selected by the client as the address to which the I/O request will, at least initially, be sent. At step 508, the client may send the I/O request to access the folder "Folder-3" to the FSVM located on the host machine having address ip-addr1. The I/O request may be, e.g., a DFS attach or connect request, an NFS open request, or the like.

At step 510, FSVM-1 170a on Host-1 201a receives the I/O request and consults a map or lookup table, such as the sharding map 360a, to determine whether the folder "Folder-3" is stored on FSVM-1 170a, e.g., on a locally-attached storage resource of the host machine on which FSVM 170a is located. If so, FSVM 170a performs executes step 567 to perform the I/O transaction identified by the I/O request. If not, at step 512 FSVM-1 170a responds to the client 330 with an indication that the folder is not located on the FSVM-1 170a. The indication may be, e.g., a PATH_NOT_COVERED DFS response. At step 514, upon receiving the indication that the file is not located on the FSVM 170a to which the request was sent, the client 330 sends a DFS REFERRAL request to FSVM 170a, requesting a referral to the FSVM on which "Folder-3" is stored. At step 545, FSVM 170a receives the REFERRAL request and sends a DFS "REDIRECT to FSVM-3" response back to the client 330. FSVM 170a looks up the FSVM on which the folder "Folder-3" is stored in the map 360a that associates files or shares with FSVMs. The result of the lookup, FSVM-3 170c, may have been determined previously by the lookup at step 510 when the initial request for Folder-3 was received, or may be determined at step 516 when the referral request for Folder-3 is received. For example, the map 360a may be stored in a shared data structure provided by the centralized coordination service, and the lookup may be performed by accessing the shared data structure. In this example, the file or folder is "Folder-3" and map indicates that the folder is associated with FSVM 170c, so at step 516 FSVM 170a may send a REDIRECT response to the client indicating that the requested folder is stored on FSVM 170c. The REDIRECT response may reference the FSVM 170c, the network address of FSVM 170c (e.g., ip-addr3, in which case steps 518 and 520 may not be necessary), or other identifier for the location of the requested folder. The client 330 may receive the REDIRECT response and cache the association between Folder-3 and FSVM 170c for potential future use.

At step 518, the client 330 may send a DNS query request to the DNS server 332 to determine the IP address of the FSVM specified in the received REDIRECT response, which is FSVM 170c having IP address ip-addr3 in this example. At step 520, the DNS server 332 may send a reply to the client 330 indicating the IP address of the requested FSVM. For example, the reply may be ip-addr3 (or 10.1.1.3), which is the IP address of FSVM 170c. At step 522, the client sends the I/O request to access Folder-3 to the IP address received in the DNS reply (e.g., ip-addr3). At step 524, the FSVM 170c on host machine 201c receives the I/O request that references Folder-3 and looks up Folder-3 in the sharding map. At step 526, FSVM 170c performs the requested I/O transaction for Folder-3, e.g., by accessing local storage 122c, and sends the results of the access, e.g., details about Folder-3 in this example, such as a list of files and associated metadata, back to the client 330 in an I/O response. The client 330 receives the I/O response and may pass the results of the I/O transaction to the application or other program code that requested the access. Any subsequent requests for the same data (Folder-3 in this example) by the client 330 may be sent directly to the FSVM 170c on which the data is stored because the client 330 may use the cached identity of the FSVM 170c on which the data is stored. Although data contained in a folder is accessed in the example of FIG. 5, other types of data may be accessed similarly, e.g., data contained in files.

Figure 7:
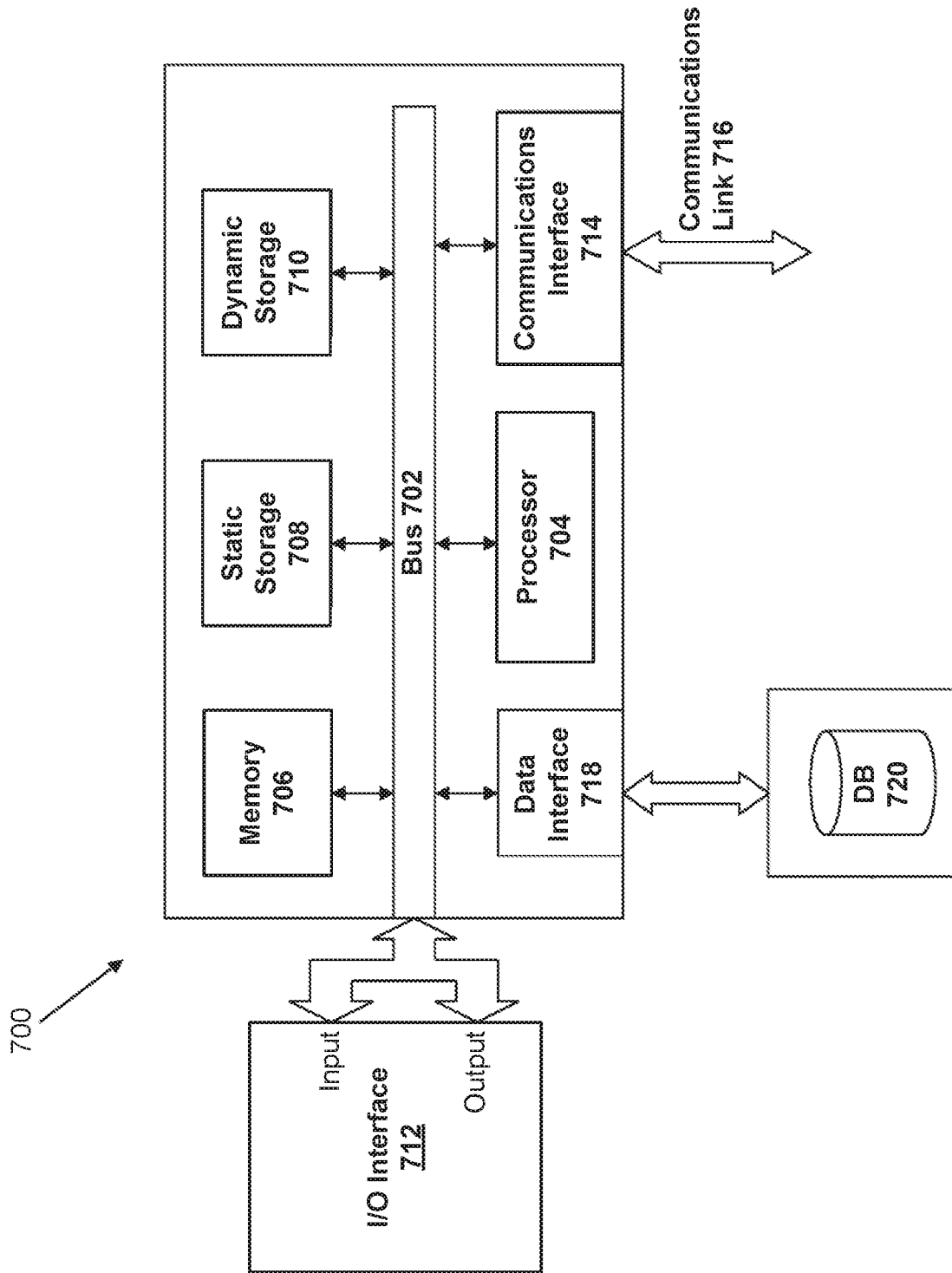
FIG. 7 illustrates a block diagram of a computing system suitable for implementing particular embodiments.

FIG. 7 is a block diagram of an illustrative computing system 700 suitable for implementing particular embodiments. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

Computer system 700 includes a bus 702 (e.g., an address bus and a data bus) or other communication mechanism for communicating information, which interconnects subsystems and devices, such as processor 704, memory 706 (e.g., RAM), static storage 708 (e.g., ROM), dynamic storage 710 (e.g., magnetic or optical), communication interface 714 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 712 (e.g., keyboard, keypad, mouse, microphone). In particular embodiments, computer system 700 may include one or more of any such components.

In particular embodiments, processor 704 includes hardware for executing instructions, such as those making up a computer program. As an example and not by way of limitation, to execute instructions, processor 704 may retrieve (or fetch) the instructions from an internal register, an internal cache, memory 706, static storage 708, or dynamic storage 710; decode and execute them; and then write one or more results to an internal register, an internal cache, memory 706, static storage 708, or dynamic storage 710. In particular embodiments, processor 704 may include one or more internal caches for data, instructions, or addresses. This disclosure contemplates processor 704 including any suitable number of any suitable internal caches, where appropriate. As an example and not by way of limitation, processor 704 may include one or more instruction caches, one or more data caches, and one or more translation lookaside buffers (TLBs). Instructions in the instruction caches may be copies of instructions in memory 706, static storage 708, or dynamic storage 710, and the instruction caches may speed up retrieval of those instructions by processor 704. Data in the data caches may be copies of data in memory 706, static storage 708, or dynamic storage 710 for instructions executing at processor 704 to operate on; the results of previous instructions executed at processor 704 for access by subsequent instructions executing at processor 704 or for writing to memory 706, static storage 708, or dynamic storage 710; or other suitable data. The data caches may speed up read or write operations by processor 704. The TLBs may speed up virtual-address translation for processor 704. In particular embodiments, processor 704 may include one or more internal registers for data, instructions, or addresses. This disclosure contemplates processor 704 including any suitable number of any suitable internal registers, where appropriate. Where appropriate, processor 704 may include one or more arithmetic logic units (ALUs); be a multi-core processor; or include one or more processors 702. Although this disclosure describes and illustrates a particular processor, this disclosure contemplates any suitable processor.

In particular embodiments, I/O interface 712 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 712 for them. Where appropriate, I/O interface 712 may include one or more device or software drivers enabling processor 704 to drive one or more of these I/O devices. I/O interface 712 may include one or more I/O interfaces 712, where appropriate. Although this disclosure describes and illustrates a particular I/O interface, this disclosure contemplates any suitable I/O interface.

In particular embodiments, communication interface 714 includes hardware, software, or both providing one or more interfaces for communication (such as, for example, packet-based communication) between computer system 700 and one or more other computer systems 700 or one or more networks. As an example and not by way of limitation, communication interface 714 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 714 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 714 for any of these networks, where appropriate. Communication interface 714 may include one or more communication interfaces 714, where appropriate. Although this disclosure describes and illustrates a particular communication interface, this disclosure contemplates any suitable communication interface.

One or more memory buses (which may each include an address bus and a data bus) may couple processor 704 to memory 706. Bus 702 may include one or more memory buses, as described below. In particular embodiments, one or more memory management units (MMUs) reside between processor 704 and memory 706 and facilitate accesses to memory 706 requested by processor 704. In particular embodiments, memory 706 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 706 may include one or more memories 706, where appropriate. Although this disclosure describes and illustrates particular memory, this disclosure contemplates any suitable memory.

Where appropriate, the ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 710 may include a hard disk drive (HDD), a floppy disk drive, flash memory, an optical disc, a magneto-optical disc, magnetic tape, or a Universal Serial Bus (USB) drive or a combination of two or more of these. Dynamic storage 710 may include removable or non-removable (or fixed) media, where appropriate. Dynamic storage 710 may be internal or external to computer system 700, where appropriate. This disclosure contemplates mass dynamic storage 710 taking any suitable physical form. Dynamic storage 710 may include one or more storage control units facilitating communication between processor 704 and dynamic storage 710, where appropriate.

In particular embodiments, bus 702 includes hardware, software, or both coupling components of computer system 700 to each other. As an example and not by way of limitation, bus 702 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 702 may include one or more buses 706, where appropriate. Although this disclosure describes and illustrates a particular bus, this disclosure contemplates any suitable bus or interconnect.

According to particular embodiments, computer system 700 performs specific operations by processor 704 executing one or more sequences of one or more instructions contained in memory 706. Such instructions may be read into memory 706 from another computer readable/usable medium, such as static storage 708 or dynamic storage 710. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware that is used to implement all or part of particular embodiments disclosed herein.

The term "computer readable medium" or "computer usable medium" as used herein refers to any medium that participates in providing instructions to processor 704 for execution. Such a medium may take many forms, including but not limited to, nonvolatile media and volatile media. Non-volatile media includes, for example, optical or magnetic disks, such as static storage 708 or dynamic storage 710. Volatile media includes dynamic memory, such as memory 706.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions is performed by a single computer system 700. According to other particular embodiments, two or more computer systems 700 coupled by communication link 716 (e.g., LAN, PTSN, or wireless network) may perform the sequence of instructions in coordination with one another.

Computer system 700 may transmit and receive messages, data, and instructions, including program, i.e., application code, through communication link 716 and communication interface 714. Received program code may be executed by processor 704 as it is received, and/or stored in static storage 708 or dynamic storage 710, or other non-volatile storage for later execution. A database 720 may be used to store data accessible by the system 700 by way of data interface 718.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, a deployment system may deploy, e.g., install and configure components of, a VFS 202 on host machines 202. The deployment system may be implemented by an infrastructure management service 222. The infrastructure management service 222 may also implement at least a portion of an administrative user interface, which may be used by a system administrator or other user to interact with the deployment system. For example, the administrative user interface may be presented on a display of a client system 201 or other computing device that communicates with the infrastructure management service 222 via the network 140. The infrastructure management service 222 may interact with the components of the VFS 202 as appropriate, such as the CVM 110, to perform operations on individual host machines 201.

In particular embodiments, the deployment system includes an administrative user interface that provides a deployment command to be invoked by an administrator to create a VFS 202. When the deployment command is invoked, the deployment system may perform one or more deployment operations to deploy the VFS 202. The deployment operations may have one or more deployment parameters that specify aspects of the deployment. The administrative user interface may request one or more deployment parameters from the system administrator and perform the deployment operations when the deployment parameters have been received. In one example, the requested deployment parameters may include a name for the VFS 202, how many FSVMs 170 to include in the VFS 202 (e.g., the number of host machines 201 to which the VFS 202 is to be deployed), the amount of storage capacity to allocate to the VFS 202, network details, such as addresses of internal and external networks, and name service details, such as an ACTIVE DIRECTORY name, user name, and access credentials such as passwords. In particular embodiments, deployment parameters, such as one or more of the aforementioned parameters or other parameters not described in this example, may be determined automatically without being requested from the user.

A described above with reference to FIG. 2A, a VFS 202 may include multiple compute units, e.g., FSVMs 170 located on host machines 201. These FSVMs 170 may act as a single VFS 202 to the outside world. A VFS 202 may be a cluster of at least three File Server Virtual Machines (FSVMs) 170a-c located on three respective host machines 201a-c. To provide high-availability, there may be a maximum of one FSVM 170a for a particular VFS instance 202 per host machine 201 in a cluster. In one example, the VFS 202 may be deployed on host machines 201 on which one or more of the components shown in FIG. 1A, such as the user VM 105, the CVM 110a, the hypervisor 130, are installed and operational. In another example, the VFS 202 may be deployed on host machines 201 that have not been configured, such as host machines 201 that are being newly-added or on which no software, e.g., none of the components shown in FIG. 1A, is installed.

In particular embodiments, a deployment image that contains program code instructions and data is provided to each host machine 201 of the VFS 202. The deployment image may be, e.g., a disk image containing computer program code, such as operating system code that implements an operating system (e.g., LINUX, MICROSOFT WINDOWS, or the like), code that implements one or more of the components shown in FIG. 1A, such as the user VM 105, CVM 110, hypervisor 130, or the like. The deployment image may contain program code instructions and data for the FSVM 170, which may implement features of the VFS 202 on each host machine 201. When the deployment image becomes available to each host machine, the host machine may boot from the deployment image and begin executing a user VM 105, CVM 110, and FSVM 170. Clusters of one or more host machines 201 having appropriate platforms (e.g., hardware configurations) and licenses (e.g., operating system and application licenses) may use a hypervisor-agnostic deployment image. Each host machine 201 may boot from a deployment image by, for example, loading and executing the program code instructions in the deployment image. As a result, the FSVM 170 and related components shown in FIG. 2A execute on each host machine 201 and provide at least a portion of the VFS 202. A set of one or more such deployment images may be pre-created and accessed as needed, e.g., when a deployment command is issued or when a host machine begins to boot and load the deployment image.

In particular embodiments, there may be separate boot and data disks, which may be included in a single deployment image or may be in separate deployment images. Program code instructions such as the operating system (OS) code and FSVM code may be stored on the boot vdisk. The fileserver persistent data and configuration may be stored on the data vdisk. The FSVM 170 on each host machine 201 may be at least partially configured at runtime, e.g., with data that is specific to each particular instance of an FSVM on each corresponding host machine 201. User data, such as user filesystems, may be stored separately from the deployment image(s), and may be accessed by each FSVM 170 when the FSVM 170 is ready to provide its portion of the VFS (e.g., when the FSVM 170 has finished booting).

As introduced above, an administrative user interface may provide a deployment command that an administrator can invoke to create a VFS 202. The user interface may request and receive deployment parameters from the administrator, such as the number of FSVMs to be included in the VFS 202. In particular embodiments, the deployment request may be received by the deployment system. The deployment request may include the deployment parameters provided by the administrator, such as a name for the VFS 202, how many FSVMs 170 to include in the VFS 202, network details, such as network addresses for internal and external networks, and name service details, such as an ACTIVE DIRECTORY name, user name, and credentials. Other deployment parameters may be determined automatically, e.g., from the cluster, without being requested from the user.

Such automatically-determined parameters may include network time protocol information and other configuration details.

In particular embodiments, the deployment image may be provided to each host machine 201 via the network from a source such as a deployment server. The deployment image may be provided to each host machine 201 by a snapshot operation that creates a snapshot of the deployment image for each host machine 201. The snapshot operation may provide the data contained in the deployment image to other host machines 202 using a copy-on-write technique in which the host machines 202 are provided with read access to the image without copying the image. Subsequently, if any of the host machines 202 were to write to the image (which is not ordinarily permitted for deployment images), then the written data may be stored in the form of changes (e.g., deltas) from the image. Snapshot operations are described in U.S. Pat. No. 9,009,106, which is hereby incorporated by reference in its entirety. As a result of the snapshot operation, the deployment image appears, at least to the user VMs (UVMs) 105 on the host machines 201, to be locally accessible from the local storage 122 of the host machine 201. The snapshot operation may make the snapshot of the deployment image accessible to each host machine without any detectable delay.

The deployment image may be used to create a parent snapshot that includes the contents of the deployment image. Instead of copying the entire deployment image to each host machine, metadata may be sent or copied to each host machine 201 via the network to create a child snapshot on the host machine 201. Contents of the parent snapshot may be copied to the local storage of the host machines 202 as needed, which may occur after the snapshot has been created. For data that is not copied from the parent snapshot to a child snapshot, data requests from the host machines 202 may be redirected to access the contents of the parent snapshot via network communication.

In particular embodiments, the snapshot operation and copying of the parent snapshot to the local storage of the host machines 202 may be implemented by the CVMs 110*a-c*. The snapshot operation may be performed N times on the parent snapshot, where N is the number of FSVMs 170 to be deployed, and N FSVMs 170 may be created. The FSVMs 170 may form a cluster, which may provide a VFS 202 to other host machines 201. Use of the pre-created fileserver image and the snapshot operation, which may be performed in less than one second in particular embodiments, can reduce the deployment time to be essentially as fast as booting the host machines 201. Thus the deployment process may appear, at least to the system administrator, to be nearly instantaneous.

In particular embodiments, the deployment system may attempt to place the FSVMs 170 on host machines 201 that are at different physical locations, so that two or more host machines are unlikely to fail or become unreachable because of an event such as an electrical power or network connectivity interruption. The physical configuration of each CVM 110 on each host machine may be stored in a configuration database and used to determine where to place the FSVMs. For example, if there are 10 different CVM 110 nodes, and a four-node file server is being deployed, four different CVMs 110 on four different host machines at different physical locations may be chosen. If an insufficient number of host machines are at different physical locations, then two or more FSVMs 170 may be located on host machines at the same physical location, e.g., in the same room, building, or city.

In particular embodiments, when the deployment image has been made available to a host machine 201 the deployment system may create a user VM 105 on the host machine 201 and attach the deployment image (e.g., attach the boot and data vdisks) to the user VM 105. The deployment system may then power-on the user VM 105. The user VM 105 may then load the operating system from the deployment image (e.g., from the boot vdisk). One or more IP addresses for the host machine 201 to use may be passed to the user VM 105. A CVM 110 and an FSVM 170 may be started on the host machine 201. The CVMs 110 and FSVMs 170 may be monitored. When the CVMs 110 and FSVMs 170 are operational, a cluster may be created. Bootstrap information may be sent to CVMs 110 on other host machines in the cluster. ACTIVE DIRECTORY credentials may be sent to an ACTIVE DIRECTORY service so that the FSVMs 170 can join an ACTIVE DIRECTORY domain. Domain Name Service (DNS) entries for the FSVMs are populated in the ACTIVE DIRECTORY service or other DNS server. Once those configuration steps are complete, the host machines 202 in the cluster may provide the VFS 202.

Figure 8:
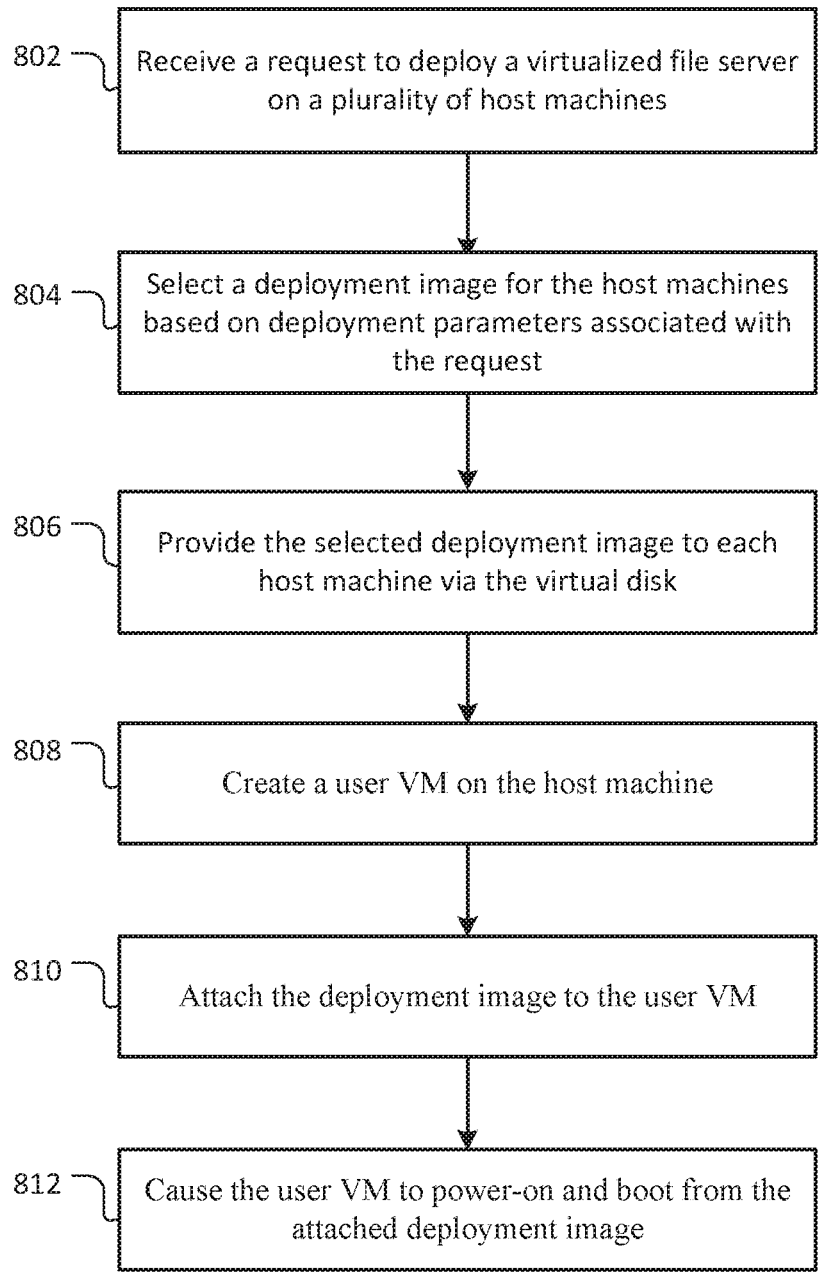
FIG. 8 illustrates an example method for deploying a virtualized file server.

FIG. 8 illustrates an example method 800 for deploying a virtualized file server. The method 800 may be performed primarily by, for example, a deployment server. The method 800 begins at step 802 by receiving a request to deploy a virtualized file server on a plurality of host machines. The request may be associated with one or more deployment parameters. Step 804 may select a deployment image for the host machines based on the deployment parameters. Step 806 may provide the selected deployment image to each host machine via the virtual disk, wherein the virtual machine controller located on the host machine stores at least a portion of the deployment image on a storage device associated with the host machine. Step 808 may create a user VM on the host machine. Step 810 may attach the deployment image to the user VM. Step 812 may cause the user VM to power-on and boot from the attached deployment image.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for deploying a virtualized file server including the particular steps of the method of FIG. 8, this disclosure contemplates any suitable method for deploying a virtualized file server including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

In particular embodiments, computer program code that implements a VFS 202 may be upgraded from an existing version to a newer version by preparing a newer boot disk image containing the newer version of the computer program code and creating a snapshot of the newer boot disk image for each FSVM 170 of the VFS 202. That is, for a VFS 202 that includes N FSVMs 170, N snapshots may be created of the boot disk. To upgrade the VFS 202 to the newer version, the new boot disk may be swapped with the existing boot disk for each FSVM 170. For example, on each host machine 201, the existing boot disk of each FSVM 170 on the host machine may be detached from the virtual machine (VM) in which the FSVM 170 executes, and the new boot disk may be attached to that VM. The FSVM 170 may then be re-booted, e.g., by rebooting the VM. After rebooting the FSVM 170, it is running with the newer code from the new boot disk image, and continues serving data using the newer version of the computer program code.

Figure 9:
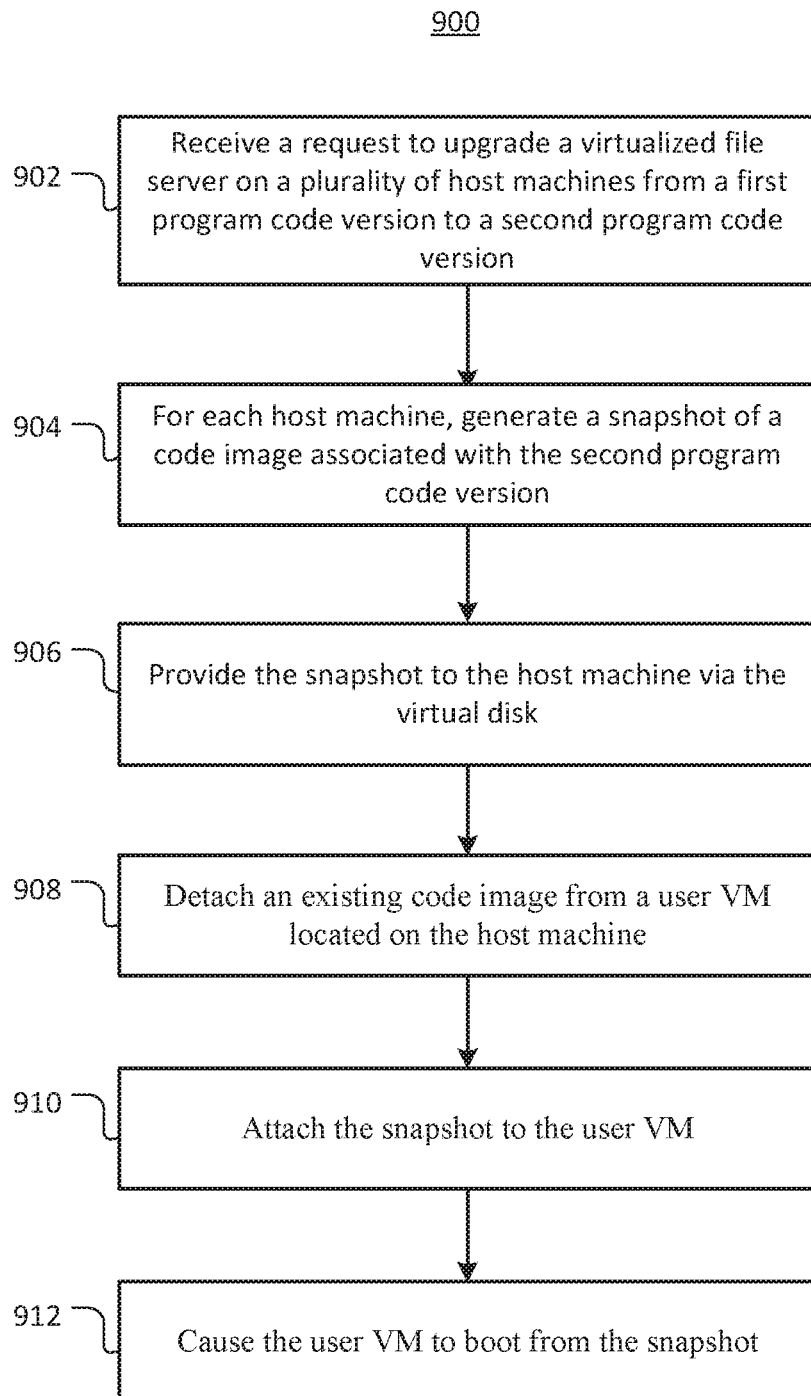
FIG. 9 illustrates an example method for upgrading a virtualized file server.

FIG. 9 illustrates an example method 900 for upgrading a virtualized file server. The method 900 may be performed primarily by, for example, a deployment server. The method 900 begins at step 902 by receiving a request to upgrade a virtualized file server on a set of host machines from a first program code version to a second program code version. Step 904 may, for each host machine, generate a snapshot of a code image associated with the second program code version. Step 906 may provide the snapshot to the host machine via the virtual disk. The snapshot may be provided as a boot disk generated based on the snapshot. Step 908 may detach an existing code image from a user VM located on the host machine. Step 910 may attach the snapshot to the user VM. Step 912 may cause the user VM to boot from the snapshot.

In particular embodiments, computer program code that implements a VFS 202 may be upgraded from an existing version to a newer version by preparing and creating a snapshot of a newer boot disk containing the newer version of the computer program code, instructing each FSVM 170a of the VFS 202 to acquire an upgrade token that may be acquired by only one FSVM 170a at a time, and, when an FSVM 170a acquires the token, swapping the old boot disk with the newer boot disk on the FSVM 170a, rebooting the FSVM 170a as described above, and relinquishing the upgrade token. That is, when the first FSVM 170a comes back up and is running, the upgrade token is passed to the next FSVM 170b, which may perform the swap and reboot, and pass the upgrade token to the next FSVM 170c. These operations are repeated until the last FSVM 170, e.g., FSVM 170c in this example, is upgraded. During the time that each FSVM 170b is being rebooted, one of the peer FSVMs 170, e.g., FSVM 170a may take over the storage and IP address of the FSVM 170b, so that the client system does not detect any interruption in the file service provided by the VFS 202.

Figure 10:
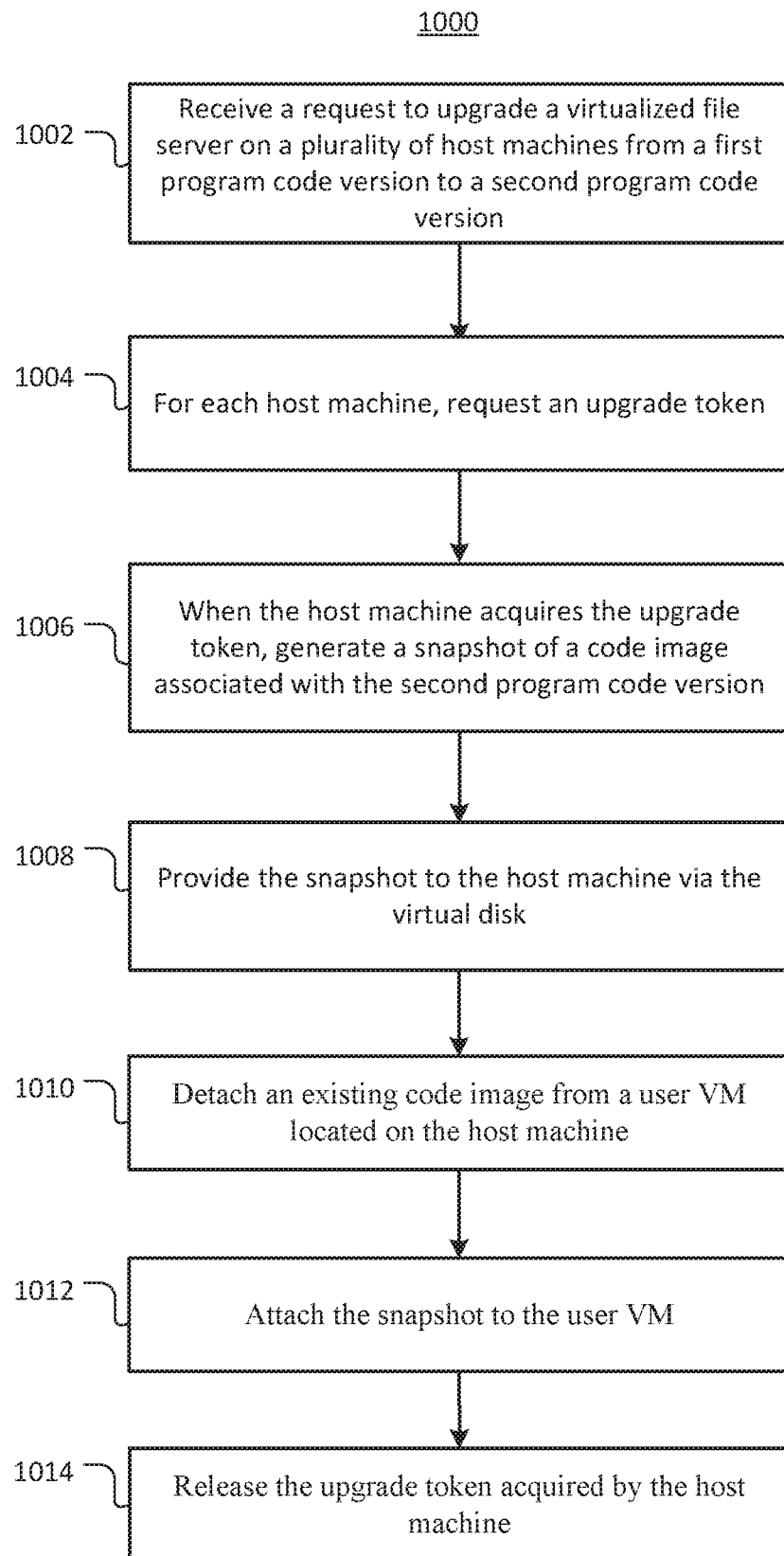
FIG. 10 illustrates an example method for performing a rolling upgrade of a virtualized file server.

FIG. 10 illustrates an example method 1000 for performing a rolling upgrade of a virtualized file server. The method 1000 may be performed primarily by, for example, a deployment server. The method 1000 begins at step 1002 by receiving a request to upgrade a virtualized file server on a plurality of host machines from a first program code version to a second program code version. Step 1004 may, for each host machine, request an upgrade token. Step 1006 may, when the host machine acquires the upgrade token, generate a snapshot of a code image associated with the second program code version. Step 1008 may provide the snapshot to the host machine via the virtual disk. The snapshot may be provided as a boot disk generated based on the snapshot. Step 1010 may detach an existing code image from a user VM located on the host machine. Step 1012 may attach the snapshot to the user VM. The user VM may boot from the snapshot. Step 1014 may release the upgrade token acquired by the host machine.

Figure 12:
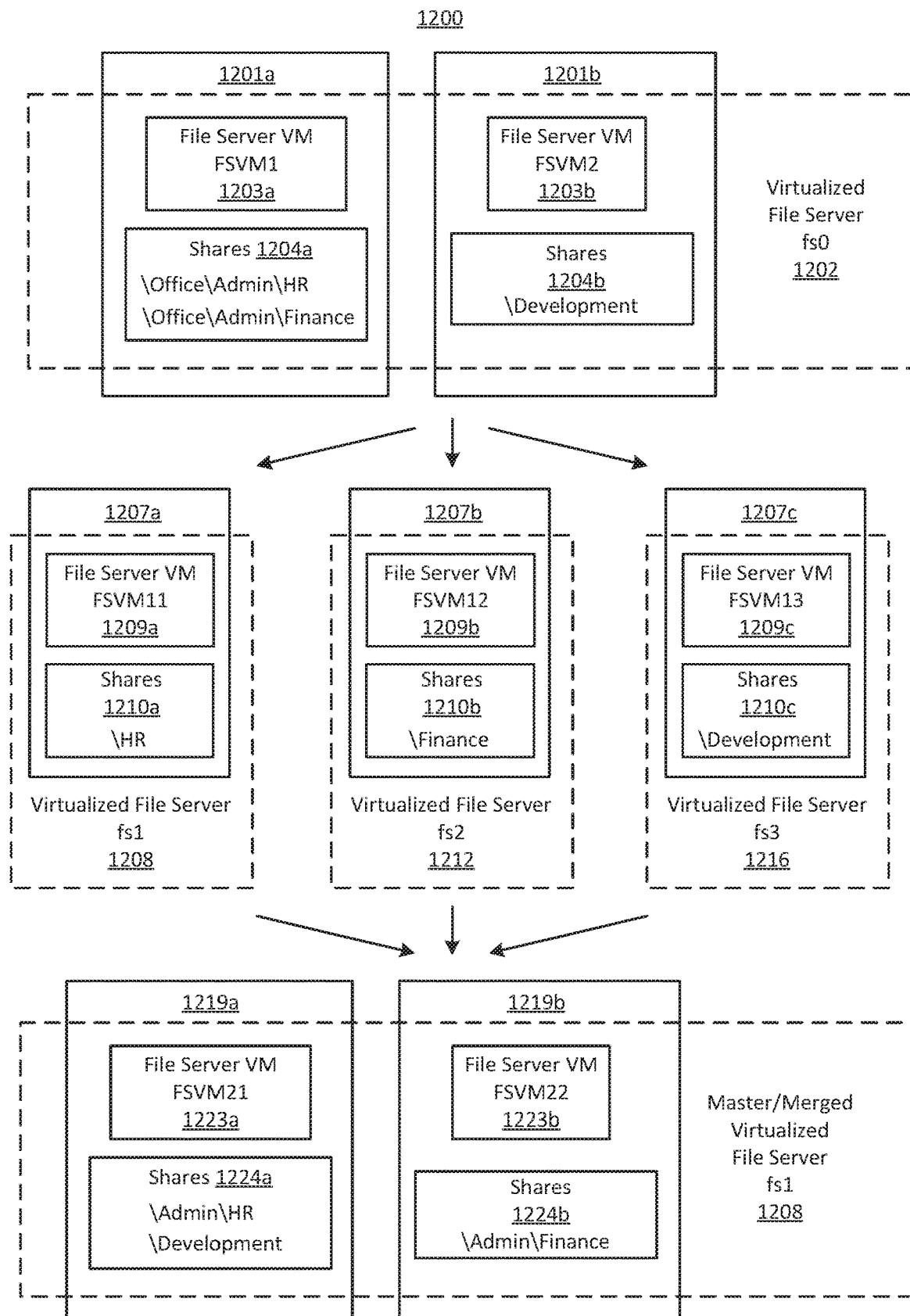
FIG. 12 illustrates example virtualized file server operations.

FIG. 12 illustrates example virtualized file server operations 1200, including data migration operations. In particular embodiments, data migration may involve transferring existing files, which may be organized in hierarchies of directories accessible via network shares 1204, or the like, from an existing virtual file server (VFS) 1202 to a new VFS 1208 via a network 140. Since the existing and new VFSs may be unavailable while the migration is in progress, the migration should be completed quickly to minimize system downtime. However, data migration may consume a substantial amount of time, particularly for large amounts of data. The performance of a data migration system may be restricted by the speed of network communication between existing infrastructure (e.g., host machines 1201 of the existing VFS 1202) and the new system (e.g., host machines 1207 of the new VFS 1208). Data migration may be performed when, for example, an existing VFS 1202 is to be replaced by a new VFS 1208, or existing host machines 1201 are to be replaced by new host machines 1207. By using the data migration techniques disclosed herein, migration speed can be increased by a multiplier of the number of file server host machines 1201.

In previous approaches, data may be migrated from an existing, e.g., source, File Server Virtual Machine (FSVM) 1203a in an existing, e.g., source, VFS 1202 using a utility to copy data from one source to one target location. Migration speed is limited by the connection speed. In particular embodiments, using the smart data ingestion approach described herein, directories in an existing VFS 1202 are processed to acquire the new, e.g., destination, FSVM 1209a in a new, e.g., destination, VFS 1208. Note that the terms "existing" and "new" are used herein for explanatory purposes to distinguish between different entities, such as virtual file servers or FSVMs and do not necessarily relate to age of the entities being referred to. In particular embodiments, the new VFS 1208 has a set of new FSVMs 1209 that may correspond to the existing FSVMs 1203 of the existing VFS 1202. Although one FSVM 1209a is shown in the new VFS 1208 in FIG. 12, the new VFS 1208 may contain multiple FSVMs. The new FSVMs 1209 may be created as part of the splitting operation or may be existing FSVMs that were previously created. For example, the new VFS 1202 may have the same number of FSVMs 1209 as the existing VFS 1202, and each FSVM 1209 in the new VFS 1208 may correspond to one of the existing FSVMs 1203 in the existing VFS 1202. In other examples, the existing and new VFSs may have different numbers of FSVMs, but a mapping may still exist from existing FSVMs 1203 to new FSVMs 1209, and the mapping may be used to identify the new FSVM 1209 to which each data object is to be migrated. That is, the mapping that establishes a correspondence between existing FSVMs 1203 and new FSVMs 1209 need not be one-to-one.

In particular embodiments, when data migration begins, each existing FSVM 1203 of the existing VFS 1202 may start migration of shares 1204 assigned to the existing FSVMs 1203. The example shares 1204a assigned to FSVM 1203a include an \Office\Admin\HR share and an \Office\Admin\Finance share. The shares 1204b assigned to FSVM 1203b include a \Development share. Each share 1204 may correspond to a directory that stores storage items such as files and other directories. In particular embodiments, migration may be performed to make data from one or more existing FSVMs 1203 in the existing VFS 1202 available to corresponding "new" FSVMs 1209 in the new VFS 1208. The new FSVM 1209a may be located on a corresponding host machine 1207a in the new VFS 1208. The mapping of new FSVMs 1209 to available host machines 1207 may be performed by a load-balancing component, system admiration interface based on a system administrator's input, or other suitable component. The host machine 1207a in the new VFS 1208 that corresponds to the existing host machine 1201a may be identified using a mapping from the host machines 1201 of the existing VFS

1202 to the host machines 1207 of the new VFS 1208. The mapping may be, e.g., a lookup table or a naming or addressing convention. That is, the corresponding host machines 1207 in the new VFS 1208 may have host names or addresses derived from the host names or addresses of the machines in the existing VFS 1202. Thus, a host machine 1201*a* named "host1-vfs1" in the existing VFS 1202 may correspond to a host machine 1207*a* named "host1-vfs2" in the new VFS 1208.

As another example, corresponding hosts 1201*a*, 1207*a* in different VFSs 1202, 1208 may have IP addresses in different subnets, e.g., a host with the address 128.1.1.1 in an existing VFS 1202 subnet 129.1.1.X may correspond to a host with the address 128.1.2.1 in a new VFS 1208 subnet 128.1.2.X, where X has the same value for corresponding host machines 1201*a* and 1207*a*. In another example, a sharding algorithm may have been used to determine the FSVMs 1203 or host machines 1201 that correspond to each share 1204 (or other storage item, e.g., directory or file) for the existing VFS 1202. The same sharding algorithm may be used to determine the FSVMs 1209 or host machines 1207 that correspond to each share 1210 for the new VFS 1208.

Because of the distributed nature of the VFS 1202, data migration may be performed in parallel to speed up the migration process. In particular embodiments, multiple data objects, e.g., Shares 1204, may be migrated in parallel (e.g., concurrently with each other), thus speeding up data migration. Data migration may be sped up by a multiple of the FSVM count. For example, if there are four FSVMs in the existing VFS and four FSVMs in the new VFS, then the data migration may be sped up by a factor of four because four transfers may proceed in parallel, e.g., if a dedicated processor is available to execute the operations for each of the eight FSVMs. Transfers between each pair of FSVMs (e.g., the existing FSVM and the corresponding new FSVM) may be performed in parallel with transfers between other pairs of FSVMs (and there are four pairs of FSVMs in this example). In another example, individual storage items, such as files and directories in shares 1204, may have associated file names and paths (e.g., directory paths) in the existing VFS 1202, and may be transferred to the new FSVMs and stored with the same file names and same paths on the new FSVMs. Alternatively, the paths on the new FSVMs may be based on but different from the paths on the existing FSVMs. For example, a file on the existing FSVM 1203*a* named Report.doc in the directory \Office\HR of a share 1204*a* may be transferred to the new FSVM 1209*a* and stored in the directory \HR of a share 1210*a* on the new FSVM 1209*a* or in a different directory on the new FSVM 1209*a*, e.g., \HumanResources. The file name may remain the same on the new FSVM 1209*a*, e.g., Report.doc.

As introduced above, the term "storage item" may be used herein to refer to a share 1204, a file, or a directory. Alternatively, a storage item may be a different unit of data, such as a disk block. The placement of data, e.g., the mapping of files, directories, blocks, or other storage items, to the locations at which the data are to be placed, e.g., FSVMs, for file I/O, may be determined by a sharding algorithm. The sharding algorithm may generate a sharding map 360*a* by, for example, computing a hash value based on the data to be placed and generating an FSVM identifier or address based on the hash value (e.g., by computing the hash value modulo the number of FSVMs in the VFS 1202). As another example, the sharding algorithm may generate a sharding map 360*a* based on the capacity of the FSVMs (or the capacity of the host machines on which the FSVMs execute), e.g., based on the amount of disk space available, the number and processing speed of CPUs of host machines 1201, 1207, the amount of memory, or other measures of capacity. The sharding algorithm may determine an amount of capacity needed or preferred for each storage item, e.g., the size of the directory or file represented by the storage item, or a value based on a historical maximum size of the directory or file, or the like. The sharding algorithm may then determine a corresponding FSVM for each storage item by, for example, allocating storage items to FSVMs that have sufficient available capacity for the storage items, then reducing the available capacity by the size (or maximum size, or other measure) of the storage item. A brute-force resource allocation technique may be used, e.g., by allocating storage items to FSVMs in various combinations until a satisfactory allocation in which the storage items fit within the storage capacity of the FSVMs is found.

In particular embodiments, the sharding algorithm may determine a location for each storage item in the existing VFS 1202. The location may be, e.g., a particular FSVM 1203, which may correspond to a particular host system 1201. Each storage item may be, e.g., a directory or file in the existing VFS 1202. A list of the determined locations, e.g., FSVMs 1203, may be stored by the existing VFS 1202, e.g., when the locations are determined. When migration is performed, the list of determined locations may be retrieved from the existing VFS 1202 or may be generated using the sharding algorithm based on the existing VFS 1202. The list of determined locations may be represented as a sharding map 360*a* generated by the sharding algorithm.

An example sharding map that includes locations of two storage items, File-1 and File-2, in an existing VFS 1202 named fs0, is shown in Table 2 below. The location of existing File-1 is FSVM1 1203*a*, and the location of existing File-2 is FSVM2 1203*b*. Although two files are shown in Table 2, any number of files and/or directories and their corresponding locations may be included in the sharding map.

TABLE 2

| Existing VFS fs0 | |
| --- | --- |
| Storage item | Location |
| File-1 | FSVM1 |
| File-2 | FSVM2 |

In particular embodiments, once an existing storage item's location is known, the storage item may be transferred from its location in the existing VFS 1202 to the corresponding location in the new VFS 1208 without waiting for other storage items to be transferred. The corresponding location in the new VFS 1208 may be determined by, for example, using a lookup table that specifies the locations of storage items in the new VFS 1208. As another example, the corresponding location in the new VFS 1208 may be determined by transforming the name, address, or identifier of the location in the existing VFS 1202 as described above. The transformation may be done by, e.g., by changing the virtual file server name fs0 to fs1 in names of host machines, or changing the subnet value in IP addresses of host machines, e.g., from 1 to 2.

In particular embodiments, a list of the determined locations may be stored by the existing VFS 1202, e.g., when the locations are determined. When migration is performed, the list of determined locations may be retrieved from the existing VFS 1202 or may be generated using the sharding algorithm based on the existing VFS 1202. Alternatively, the locations of the storage items in the new VFS 1208 may be determined using the same sharding algorithm that was used to determine the locations of the corresponding storage items in the existing VFS 1202. For example, a sharding map 360 that includes the locations of the example storage items File-1 and File-2 in the new VFS 1208 (named fs1) are shown in Table 3 below.

TABLE 3

New VFS fs1

| Storage item | Location |
|---|---|
| File-1 | FSVM11 |
| File-2 | FSVM11 |

In the example introduced above, the location of new File-1 is fs1's FSVM11 1209a (which corresponds to fs0's FSVM1 1203a), and the location of new File-2 is also fs1's FSVM11 (which corresponds to fs0's FSVM2 1203b).

In particular embodiments, transfers of two or more storage items may proceed in parallel. The existing VFS 1202 may initiate and perform up to N of the transfers in parallel, wherein N is a configurable limit based on the processing and storage capacities of the host machines on which the FSVMs 1203 of the VFS 1202 execute. For example, multiple host machines may access their corresponding local storage devices in parallel. A transfer of File-1 from FSVM1 1203a on host machine 1201a to FSVM11 on host machine 1207a may be performed in parallel with a transfer of File-2 from FSVM2 on host machine 1201b to FSVM11 on host machine 1207a. The data (e.g., blocks) of File-1 may be read from host machine 1201a's local storage, sent to host machine 1207a via the network, and written to host machine 1207a's local storage while, in parallel, the data of File-2 is read from host machine 1201b's local storage, sent to host machine 1207a via the network, and written to host machine 1207a's local storage.

Figure 11:
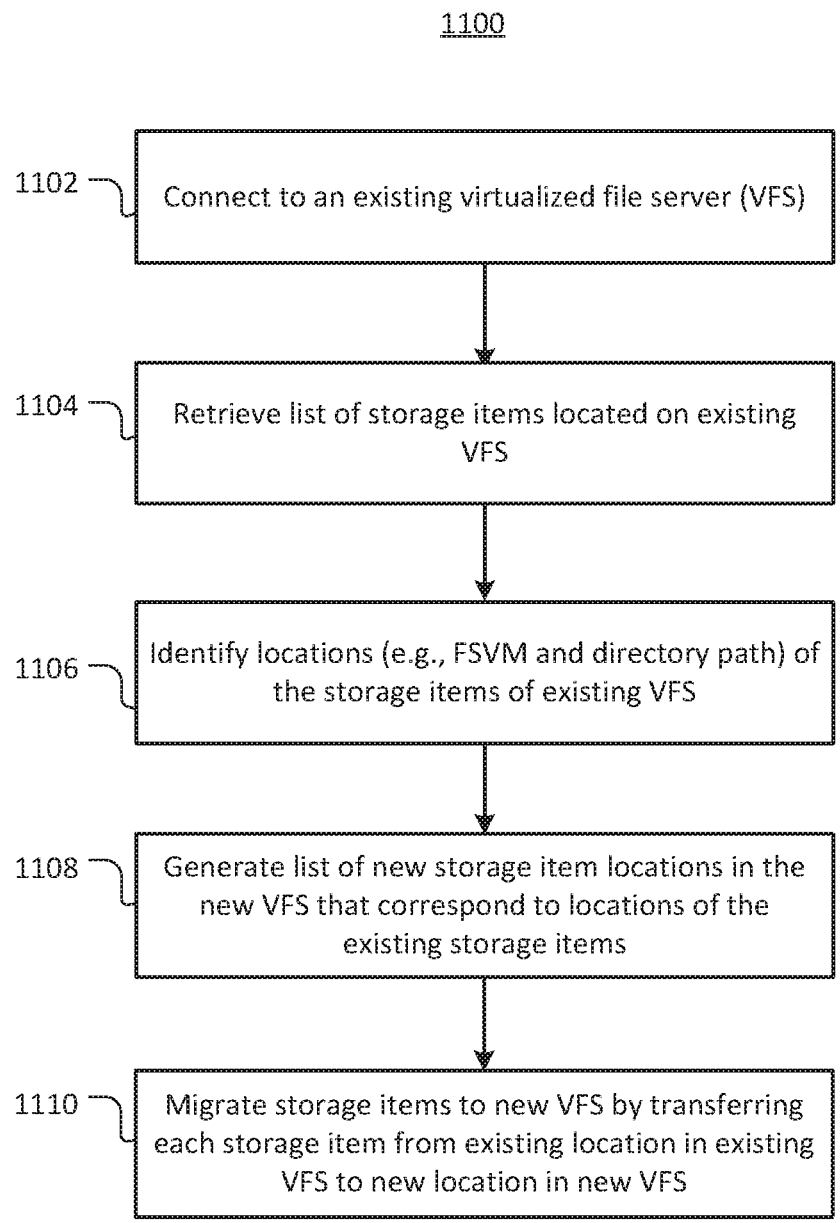
FIG. 11 illustrates an example method for ingesting data into a virtualized file server.

FIG. 11 illustrates an example method 1100 for ingesting data into a virtualized file server 1208. The method 1100 may be performed primarily by, for example, one of the host machines 201. The method 1100 begins at step 1102 by connecting to an existing virtualized file server (VFS) 1202. Step 1104 may retrieve a list of existing storage items 1204, e.g., shares, directories, and/or files, that are located on the existing VFS 1202, and their sizes. The list may be retrieved recursively to identify nested directories. Step 1106 may identify the locations on the existing VFS 1202 of the existing storage items. The locations may be, e.g., the addresses or identifiers of the FSVMs 1203 on which the storage items are located, and may also include path names of the files and directories that are stored in nested directories. The locations may be retrieved from a sharding map 360a associated with the existing VFS 1202. Step 1108 may generate a list of locations at which the storage items 1204 are to be stored in a new VFS 1208. The list of locations may be based on the existing locations (e.g., identities of FSVMs 1203 and path names) of the existing storage items 1204. For example, the locations of the existing storage items identified at step 1106 may be fed to the sharding algorithm to determine the particular FSVM 1209 of the new VFS 1208 on which each file and/or directory is to be stored. The sharding algorithm may generate a sharding map 360 for the new VFS 1208 based on the identified locations. Alternatively, the location at which each new file and/or directory is to be stored on the new VFS 1208 may be determined according to a naming or addressing convention, or other mapping, and the determined locations may be stored in a sharding map 360a. That is, the sharding map 360a need not be generated directly by a sharding algorithm.

At step 1110, the data, e.g., the storage items, may be migrated to the new VFS 1202 by transferring each existing storage item from its location (e.g., existing FSVM 1203 and path) in the existing VFS 1202 to its location in the new VFS 1208. The transfer may be implemented by sending the storage item and associated metadata, such as the storage item's name and permissions, from the existing FSVM 1203 to the new FSVM 1209 at which the new storage item is to be located. Each new file or directory may be created on the new FSVM 1209 in the new VFS 1208 using the same file name or directory name that was used in the existing VFS 202, or using a different file name or directory name if specified. The transfers of files between different pairs of FSVMs may be performed in parallel. For example, the transfers may be requested in parallel (without waiting for a transfer to complete prior to starting another transfer), and the FSVMs 1203 or other components may determine which transfers can be performed independently of each other, and execute the independent transfers in parallel. After the transfers are complete, the data, e.g., the storage items, are ready to be served by the new VFS 1208.

FIG. 12 illustrates example virtualized file server (VFS) operations 1200, including VFS splitting and merging operations. In particular embodiments, an existing virtualized file server (VFS) 1202 may be split into multiple new virtualized file servers (VFSs) 1208, 1212, 1216. As an example, an enterprise or organization may have an existing VFS 1202 that serves storage items such as shares, directories, or files to clients in several departments of the organization. The organization may decide to split the existing VFS 1202 into multiple new VFSs 1208, 1212, 1216, e.g., to move the file-serving workload of particular departments to host machines managed by or otherwise associated with those departments. As an organization grows, the number of users of the existing VFS 1202 may increase, thereby increasing the workload of the VFS 1202. By splitting the VFS 1202 into multiple new VFSs, the workload may be distributed across the new VFSs. Assigning the new VFSs to departments in an organization may simplify administration and management of the file servers. Conversely, multiple VFSs 1208, 1212, 1216 may be merged together to form a single merged VFS 1208. For example, when an organization that manages multiple VFSs for different departments decides to consolidate the VFSs into one VFS 202, a merging operation may be performed to merge the multiple VFSs together Previously, when an organization decided to split a file server, a system administrator deployed new file servers and migrated the data from the old file server to the newly deployed file servers. Conversely, when an organization decided to merge multiple file servers, the system administrator deployed a new file server and migrated stored data from the multiple file servers to the newly deployed file server. Such existing techniques involve deployment and migration processes that may use substantial amounts of time, storage, and network resources for operations such as copying data between storage devices or between servers across a network. Thus substantial file server downtime may occur as a result of delays caused by the existing and new file servers being unavailable while split or merge operations are in progress.

In particular embodiments, virtualized file servers may be split or merged while incurring substantially less downtime than in existing types of file servers. For example, splitting or merging VFSs may be performed efficiently by using a snapshot operation to provide the data located at each existing File Server Virtual Machine (FSVM) of the existing VFS to one or more new FSVMs of one of the new VFS without copying the data. The new FSVMs 1209 may be FSVMs that have previously been created or that are newly created, e.g., as part of the splitting process, for use in the new VFSs 1208, 1212, 1216. In particular embodiments, each new VFS created from an existing VFS 1202 may include one or more new or pre-existing FSVMs 1209 that are configured based on configurations of corresponding existing FSVMs 1203 of the existing VFS 202. The new VFSs 1208, 1212, 1216 do not ordinarily include any of the existing FSVMs 1203 from the existing VFS 1202. In particular embodiments, the existing VFS 1202 may continue to operate after the splitting operation, e.g., by retaining one or more of its FSVMs 1203 and continuing to serve one or more shares 1204. Although three new VFSs 1208, 1212, 1216 are shown in the example of FIG. 12, an existing VFS 1202 may be split into any suitable number of new VFSs.

In particular embodiments, when the splitting operation is performed, the FSVMs 1209 to be included in each new VFS 1208, 1212, 1216 may be selected by a system administrator, by a user, or by an automatic process. For example, a system administrator may specify how many new VFSs are to be created, and how many FSVMs 1209 are to be included in each of the new VFSs. Thus, each FSVM 1209 may be incorporated into one of the new VFSs according to an FSVM-to-VFS mapping. Further, the storage items 1210 served by each new VFS 1208, 1212, 1216 may be the storage items 1204 that were being served by the FSVMs 1203 of the existing VFS 1202. Optionally, the system administrator may select particular storage items to be served by the new VFSs 1208, 1212, 1216. The host machines on which a new VFS is located may be specified, e.g., by a system administrator or by a load-balancing system. The host machines on which the new VFS is located may be physically located at or near the physical location of the host machines used by the existing VFS 202, or may be at other physical locations, e.g., at or near the physical location of a department to which a new VFS is assigned.

In particular embodiments, a VFS splitting operation may be performed to split an existing VFS 1202 into multiple new VFSs 1208, 1212, 1216 by, for each new VFS to be constructed, selecting one or more existing FSVMs 1203 to be removed from the existing VFS 1202, and, for each existing FSVM, identifying one or more existing or (newly-created) available, e.g., lightly-loaded, FSVM to be included in the new VFS, re-assigning resources from the existing FSVM to one or more other available FSVMs 1209, and re-directing subsequent client requests for the existing FSVM 1203 to the available FSVMs 1209. The existing available FSVMs 1209 may be previously-created FSVMs 1209 that are lightly loaded, or may be created, e.g., if there are no existing available FSVMs. If an FSVM 1209 is created, it may be created on a lightly loaded host machine 1207. The splitting operation may further include removing the existing FSVM 1203 from the existing VFS 1202, moving storage items that were not re-assigned, e.g., shares 1204, files, folders, or the like, being accessed by each existing client of the existing FSVM 1203 from the existing FSVM 1203 to the available FSVM 1209, and, for those moved storage items, re-directing or re-connecting clients of the existing VFS 1202 to the available FSVM 1209. The re-assigned resources may include compute resources (e.g., those used by the FSVM), storage resources (e.g., disk space allocated to the FSVM), and metadata resources (e.g., ACTIVE DIRECTORY credentials). Resources may be assigned from the existing FSVMs 1203 to the available FSVMs 1209 automatically, e.g., by assigning each resource from the existing FSVM 1203 to a corresponding available FSVM 1209, or by assigning resources to available FSVMs 1209 according to a mapping provided by a system administrator or generated by a load-balancing system.

In particular embodiments, splitting a VFS may be performed efficiently when the existing VFS 1202 and the new VFSs 1208, 1212, 1216 use existing FSVMs 1203 and available FSVMs 1209 that are in the same cluster, in which case data need not be copied between the existing and available FSVMs. Otherwise, if one or more of the existing FSVMs 1203 are not in the same cluster as one or more of the available FSVMs 1209, then data may be copied between those FSVMs 1203 and FSVMs 1209 that are in different clusters. The data may be copied from storage associated with the existing FSVMs 1203 to storage associated with the available FSVMs 1209. Thus, for example, shares may be moved between VFSs with zero data copying or migration by re-assigning the data to available FSVMs 1209 in the new VFS if the existing FSVMs 1203 and available FSVMs 1209 are in the same cluster. Users may perceive little or no down time of shares 1204 re-assigned from the existing VFS to the new VFS. The data that may be copied can include storage items such as files or folders associated with the existing FSVMs 1203, e.g., files or folders stored on shares served by the existing FSVMs. For example, the existing VFS 1202 may serve one or more network-shared filesystems, e.g., SMB shares, NFS exports, or the like. The network shared filesystems or shares served by the existing VFS 1202 may be re-assigned from the existing VFS 1202 to the new VFS 1208 without copying data on the filesystems if the existing FSVM 1203 hosting the filesystem is in the same cluster as the available FSVM 1209 in the new VFS 1208 that is to host the filesystem.

In particular embodiments, an available FSVM 1209 may be a backup FSVM that provides a high-availability backup for an existing FSVM 1203. Resources of the existing FSVM 1203, such as storage resources, may be available on the backup FSVM, e.g., because the resources on the backup FSVM, such as data on the storage device, are kept up-to-date with the existing FSVM 1203. Resources of the existing FSVM 1203 may be re-assigned to the corresponding backup FSVM by performing a failover from the existing FSVM 1203 to the backup FSVM. The backup FSVM 1203 may then become the available FSVM 1209 in the new VFS 1208. Since the backup FSVM maintains an up-to-date copy of the data hosted by the existing FSVM 1203, the backup FSVM may be used in the new VFS 1208 with resources of the existing FSVM 1203 without copying the resources, e.g., data that represents the resources, from the existing FSVM 1203 to the backup FSVM as part of the splitting operation.

In particular embodiments, network file access requests directed to an existing FSVM 1203 may be re-directed to the available FSVM 1209 that replaces the existing FSVM 1203. For example, the IP address of an existing FSVM may be moved to the corresponding available FSVM, e.g., assigned to the available FSVM to maintain client connections such as SMB connections. When an FSVM 1203 is removed from the existing VFS 1202, the system may wait until the backup FSVM that corresponds to the removed FSVM 1203 has become a primary FSVM, and is ready to perform file serving operations as an available FSVM 1209, before re-directing requests from clients to the backup FSVM and before removing the next existing FSVM 1203 in the sequence.

In particular embodiments, clients accessing storage items served by the existing VFS 1202 may continue performing access operations, e.g., reads and writes, on storage items that were being served by the removed FSVM 1203 prior to its removal. The clients of the existing VFS 1202 may continue to access storage items if the storage items are moved to an available FSVM 1209 in the new VFS 1208 if, for example, the clients are re-directed to the available FSVM 1209 by moving the existing FSVM's IP address to the available FSVM or by DFS redirections. Alternatively, e.g., if a client has an existing connection to an existing FSVM 1203 that cannot be re-directed, e.g., the client is accessing shares using a communication connection that cannot be redirected, then the client may be requested to close the existing FSVM connection, e.g., close the shares and re-map the shares to the client machine. Thus the existing VFS 1202 may be split without affecting access to the stored data, at least until a later time at which existing client connections to the storage items are closed, e.g., in response to a request from a system administrator.

As an example, there may be an existing VFS 1202, named fs0, which is hosted by nine FSVMs 1203 named FSVM1-FSVM9. These FSVMs 1203 may be located on (e.g., executing on) two existing host machines 1201a,b in a cluster. Thus, fs0 has nine existing FSVMs as follows:

fs0=[FSVM1, FSVM2, FSVM3, FSVM4, FSVM5, FSVM6, FSVM7, FSVM8, FSVM9]

Three shares 1204, named HR, Finance, and Development, are provided by fs0 in this example. The HR and Finance shares are served by FSVM1 1203a, and the Development share is served by FSVM2 1203b. These example shares are shown in Table 4.

TABLE 4

| Share Path | VFS | FSVM |
|---|---|---|
| \\fs0\Office\Admin\HR | fs0 | FSVM1 |
| \\fs0\Office\Admin\Finance | fs0 | FSVM1 |
| \\fs0\Development | fs0 | FSVM2 |

A system administrator may request that the resources of the nine FSVMs 1203 initially allocated to the fs0 VFS 1202 be divided among three new virtualized file servers 1208, 1212, and 1216, named fs1, fs2, and fs3, respectively. That is, the nine FSVMs 1203 are removed from fs0, but are not added to the new VFSs 1208, 1212, 1216. Instead, the resources of the nine FSVMs 1203, such as shares 1204, disk storage, credentials, and so on, are provided to available FSVMs 1209 that are not part of fs0, and the available FSVMs 1209 are used by the new VFSs 1208, 1212, 1216. The particular available FSVMs 1209 that are assigned to the new VFSs 1208, 1212, 1216 may be specified by the system administrator or may be selected automatically (e.g., divided as evenly as possible among the new VFSs 1208, 1212, 1216). The host machines 1207 to be used for the new VFSs may be identified implicitly as the host machines on which the selected FSVMs are located. Alternatively, the administrator may specify host machines 1207 on which the new VFSs are to be located, and available FSVMs 1209 on the specified host machines 1207 may be used for the new VFSs. If there are too few available FSVMs 1209, then additional FSVMs 1209 may be created, e.g., on specified host machines 1207 or on suitable available host machines 1207 if none are specified. Further, the administrator may specify a mapping between the existing FSVMs 1203 and the new VFSs 1208, 1212, 1216. For example, each of the three new VFSs may be assigned three available FSVMs 1209, which may subsequently be associated with corresponding existing FSVMs 1203. The resources of FSVM1-FSVM9 may then be assigned to available FSVMs FSVM11-19, respectively. FSVM11-19 may be assigned to the new VFSs according to a mapping specified by the administrator, or may be distributed automatically, e.g., as evenly as possible across the new VFSs. In this example, FSVM11-FSVM13 are assigned to fs1, FSVM14-FSVM16 are assigned to fs2, and FSVM17-FSVM19 are assigned to fs3. This mapping of available FSVMs 1209 to new VFSs 1208, 1212, 1216 is shown below.

fs1=[FSVM11, FSVM12, FSVM13]
fs2=[FSVM14, FSVM15, FSVM16]
fs3=[FSVM17, FSVM18, FSVM19]

The virtualized file server splitting operation may split the existing VFS 1202 (named fs0) into the new VFSs 1208, 1212, 1216 (named fs1, fs2, fs3, respectively) without causing interruptions in service to clients of the existing VFS 1202.

In the example described above, the new VFSs 1208, 1212, 1216 are created by splitting the existing VFS 1202. There are three available host machines 1207a-c, and the nine available FSVMs 1209, named FSVM11-FSVM19, are located on the three available host machines 1207a-c. The existing FSVMs 1203, named FSVM1-FSVM9, are ordinarily not included in any of the new VFSs 1208, 1212, 1216. Instead, available FSVMs 1209 are used in the new VFSs and configured based on the configurations of the existing FSVMs 1203. Each of the storage items, e.g., shares 1204, associated with each existing FSVM 1203, such as the HR, Finance, and Department shares, may be provided to a corresponding one of the available FSVMs as shares 1210. The stored data referenced by the shares 1204a, including \Office\Admin\HR on FSVM1 (e.g., the files and folders in the HR directory) may be made accessible to FSVMs 1209 in the new VFSs without copying if, e.g., FSVM1 is in the same cluster as FSVM11 (to which the \HR share is moved and appears as share 1210a) and FSVM12 (to which the finance share is moved and appears as share 1210b). Alternatively, if FSVM1 is not in the same cluster as FSVM11 and FSVM12, then data referenced by the shares 1203a may be made accessible to FSVM11 and FSVM12 by being copied from storage, e.g., storage pool 160, associated with FSVM1 to storage associated with FSVM11 and FSVM12, e.g., a storage pool in a different cluster, such as local storage 122 of the host machines 1207 that are in a different cluster than the host machines 1201.

In particular embodiments, according to an example mapping from available FSVMs 1209 to available host machines 1207, which may be provided by an administrator or automatically generated, three of the available FSVMs 1209 may be located on each of the available host machines 1207. Although the example VFS 1202 is split into three new VFSs 1208, 1212, 1216 located on three different host machines 1207a, 1207b, 1207c in this example, a VFS 1202 may be split into any desired number of new VFSs located on any desired number of host machines 1207. Further, although a one-to-one mapping of existing FSVMs 1203 to available FSVMs 1209 is described in examples herein, any mapping of existing FSVMs 1203 to available FSVMs 1209 may be used, e.g., three existing FSVMs 1203 in an existing VFS 1202 serving a total of 100 shares may be mapped to four new VFSs, each having 2 host machines 1207 with 1

FSVM 1209 located on each host machine. The 100 shares may be divided into 25 shares for each of the four new VFSs, and the 25 shares of each new VFS may be divided into, e.g., 10 shares on the first host machine and 15 shares on the second host machine of the new VFS. Each available FSVM 1209 may use storage of the storage pool 160, e.g., local storage 122 provided by the host machine 1207 on which the FSVM 170 is located, cloud storage 126, or networked storage 128.

In particular embodiments, an existing VFS 1202 may initially belong to or be used by one or more departments or other entities in an organization or enterprise, and may be serving a substantial number (e.g., hundreds) of shares accessed by client systems. The existing VFS 1202 may be used to store data for several administrative departments in a corporation, for example. A system administrator may decide to split the VFS 1202 into multiple VFSs, each of which is to be assigned to one of the departments. For example, the existing VFS 1202 (named fs0) may be split into three new virtualized file servers: a VFS 1208 (named fs1) for the HR department, a VFS 1212 (named fs2) for the Finance department, and a VFS 1216 (named fs3) for the Development department. As a result of the example splitting operation, the example shares shown on the fs0 virtualized file server in TABLE 1 above (HR, Finance, and Development) may be moved to the three new virtualized file servers as shown in Table 5.

TABLE 5

| Share Path | VFS | FSVM |
|---|---|---|
| \\fs1\HR | fs1 | FSVM11 |
| \\fs2\Finance | fs2 | FSVM12 |
| \\fs3\Development | fs3 | FSVM13 |

The HR share has been moved to the VFS 1208 named fs1 on FSVM11, the Finance share has been moved to the VFS 1212 named fs2 on FSVM12, and the Development share has been moved to the VFS 1216 named fs3 on FSVM13.

In particular embodiments, each of the existing FSVMs 1203 (named FSVM1-FSVM9) may be removed from the existing VFS 1202, and the resources of each existing FSVM 1203 may be moved to an available FSVM 1209 that is not included in the existing VFS 1202. The existing FSVMs 1203 may be removed sequentially, e.g., one-by-one, in a sequence having any appropriate order. For example, the existing FSVMs 1203 may be removed in the order in which they are selected by the administrator, or in order of their numeric identifiers (e.g., FSVM1 may be removed first, followed by FSVM2, and so on).

To split the existing VFS 1202 (named fs0) into the three new VFSs 1208, 1212, and 1216 (named fs1, fs2, and fs3, respectively), FSVM1-FSVM3 may be removed from fs0 and added to the new fs1. Available FSVMs 1209, named FSVM11, FSVM12, and FSVM13, may be used or created on the host machines 1207. Each of FSVM11, FSVM12, and FSVM13 may be located on a respective one of the host machines 1207a, 1207b, and 1207a. Alternatively FSVM11, FSVM12, FSVM13 may be located on a single host machine 1207a, on two host machines 1207a, 1207b, or on any other suitable number of host machines. Similarly, FSVM4-FSVM6 may be removed from fs0 and added to the new fs2 as FSVM14, FSVM15, and FSVM16 on host machine 1207b, and FSVM7-FSVM9 may be removed from fs0 and added to the new fs3 as FSVM17, FSVM18, and FSVM19 on host machine 1207c.

In particular embodiments, compute units (e.g., an FSVM), networking (e.g., IP addresses) and storage associated with the FSVM may be moved from an existing host machine 1201 to a new host machine 1207. Moving an existing FSVM 1203 may involve creating a new FSVM 1209 on an available host machine 1207 based on the existing FSVM 1203, e.g., based on the configuration of the existing FSVM 1203. Creating the new FSVM 1209 may involve moving the IP address of the existing host machine 1201 to the available host machine 1207, and relinquishing storage resources allocated to the existing FSVM 1203 by the existing host machine so that the resources may be used by one or more available FSVMs 1209 on the available host machine 1207. Storage items used by the existing FSVM 1203 may be stored on storage devices that can include one or more of the cloud storage 126, the networked storage 128, or the local storage 122. The available FSVM 1209 may access these storage resources. Storage items may be moved to another storage device, if appropriate, while the existing FSVM 1203 continues to access the storage items at their existing locations, even after the new FSVM 1209 has been created on the available host machine 1207. The existing FSVMs 1203 may continue to access the storage items at their initial locations until the such access is disabled, e.g., by a user closing the shares 1204 that are accessing the storage items, which the user may do in response to a request from a system administrator, or by the system administrator invoking a command to close those shares. When the existing FSVM 1203 can no longer access the storage items, e.g., because the shares 1204 have been closed or the storage items have otherwise become inaccessible, the storage items may be accessed via the new FSVM 1209 at their new locations, e.g., as shares 1210. If the storage items are stored on local storage 122 of the existing host machine, then moving the storage items to the local storage 122 of the new host machine may result in improved performance of the FSVM 1209 on the new host machine 1207. In particular embodiments, ACTIVE DIRECTORY credentials, e.g., for use by DFS, may be moved from the existing host machine 1201 to the new host machine 1207 for access by the available FSVM 1209.

Figure 13:
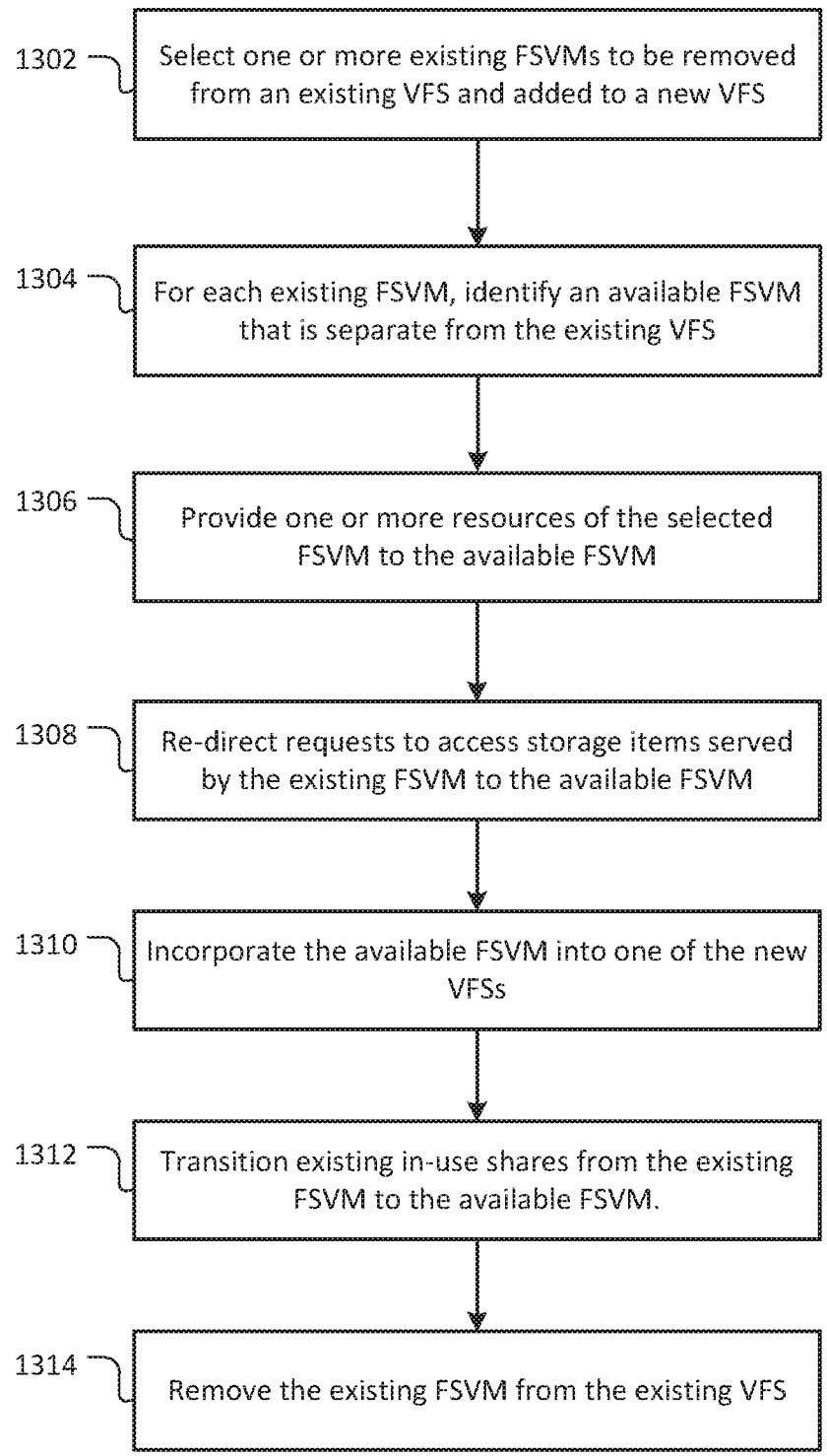
FIG. 13 illustrates an example method for splitting an existing virtualized file server into two or more new virtualized file servers.

FIG. 13 illustrates an example method 1300 for splitting an existing virtualized file server (VFS) 1202 into two or more new virtualized file servers (VFSs) 1208, 1212, 1216. The method 1300 may be performed primarily by, for example, a deployment server, a host machine 1207 of a virtualized file server, or other component associated with a virtualized file server 1202. The method 1300 may be used to split an existing VFS 1202 in response to a system administrator's request, for example. The method 1300 begins at step 1302 by selecting one or more existing FSVMs 1203 to be removed from the existing VFS 1202. Each selected existing FSVM 1203 is to be added to one of the new VFSs. For each of the existing FSVMs 1203, step 1304 may identify an available FSVM 109, such as a lightly-loaded FSVM 1209, which is separate from the existing VFS 1202. The available FSVM 1209 may be, e.g., an FSVM located on a host machine 1207 that has an average or current CPU utilization rate below a threshold and/or is serving less than a threshold number of shares 1210, and is not one of the existing FSVMs 1203. The CPU utilization rate may be the percentage of time or CPU cycles during which the CPU is executing application instructions or is not idle, for example. The threshold CPU utilization may be, e.g., 5%, 10%, 20%, or the like. The threshold number of shares may be, e.g., 1, 5, 10, 25, 50, 100, or the like. As another example, the available FSVM 1209 may be a backup FSVM of the existing FSVM 1203. The backup FSVM may have access to resources of the existing FSVM 1203, and may be capable of accessing the resources independently of the existing FSVM 1203.

Step 1306 may provide one or more resources of the selected FSVM 1203 to the available FSVM 1209. For example, the selected FSVM's storage resources may be located on one or more of the local storage 122, cloud storage 126, and networked storage 128. The storage resources may be provided to the available FSVM 1209 by, for example, changing allocation information so that the storage resources are associated with the available FSVM 1209. The resources may include storage resources, e.g., storage capacity such as that provided by the storage pool 160. Providing the resources may include providing data stored on the storage resources to the available FSVM 1209. The data may be provided without being copied, e.g., by providing access via the network between the existing FSVM 1203 and the available FSVM 1209 if the existing and available FSVMs are located in the same cluster, or re-assigning the storage on which the data is stored to the available FSVM 1209. The data may be provided without being copied at the time the data is provided, e.g., because the data has previously been copied to the available FSVM 1209 by high-availability/fault-tolerance features such as those described elsewhere herein. The data may include one or more storage items associated or served by with the existing FSVM 1203, and the storage items may be shares 1203, files, or folders. As another example, the resources may include security credentials, such as ACTIVE DIRECTORY credentials that permit an FSVM 1209 to join an ACTIVE DIRECTORY domain and participate in DFS referrals.

Step 1308 may re-direct requests to access storage items that are served by the existing FSVM 1203 to the available FSVM 1209, so that the available FSVM 1209 may process and respond to the requests. Step 1308 may move the IP address of the existing FSVM 1203 to the available FSVM 1209 so that client connections, such as SMB client connections, are retained, e.g., remain open and usable. If the existing FSVM 1203 and available FSVM 1209 are on different host machines 1201, 1207, the IP address of the existing FSVM 1203 on its host machine 1201 may be moved to the available FSVM 1209 on its host machine 1207. As part of step 1306, the FSVMs 1209 of the new VFS may join a domain (e.g., an ACTIVE DIRECTORY domain) associated with the new VFS, and start serving new shares 1210 (e.g., requests to map shares and access those mapped shares). Existing in-use (e.g., open or recently accessed) shares 1204 may still be served by the existing VFS 1202.

Step 1310 may incorporate the available FSVM 1209 into one of the new VFSs 1208, 1212, 1216. As an example, each new VFS may be created by providing the available FSVMs 1209 to the new VFS when it is created. As another example, the available FSVMs 1209 may be added to the new VFS as they are created, and when all the FSVMs 1209 for the new VFS have been added, the new VFS may be activated. The particular new VFS into which the available FSVM 1209 is incorporated may be determined by an FSVM-to-VFS mapping, which may be provided by a system administrator or generated automatically using appropriate load-balancing techniques.

Step 1312 may transition existing in-use shares 1204 (if any) from existing FSVMs 1203 to available FSVMs 1209 to which the shares are assigned. This storage transition may be triggered when step 1312 is executed, or at other times, e.g., when a system administrator requests to move the existing in-use (e.g., open or recently accessed) shares from the existing VFS 1202 to the new VFS. When all existing in-use shares served by the existing VFS 1202 have been moved to at least one of the new VFSs, the existing VFS 1202, including any remaining existing FSVMs 1203 of the existing VFS, may be shut down.

Step 1314 may remove the existing FSVMs 1203 from the existing VFS 1202. The existing FSVMs 1203 may be removed from the existing VFS 1202 one by one. For example, step 1314 may wait for each individual removal operation for an existing FSVM 1203 to complete before initiating removal of the next existing FSVM 1203. Step 1314 may also release any remaining resources held by the existing FSVM 1203 and provide those resources to the corresponding available FSVM 1209. The method 1300 may be repeated to split other FSVMs 1203 from the existing VFS 1202 and re-created in new VFSs 1209. If each new VFS 1208, 1212, 1216 has not yet been constructed, the method 1300 may construct each new VFS 1208, 1212, 1216 after the FSVMs 1209 for the new VFS have been added to the new VFS. In particular embodiments, a VFS merge operation may be performed to merge two or more VFSs 1208, 1212, 1216 together, e.g., upon a system administrator's request. The merge operation may form a merged VFS 1208 (e.g., as shown in FIG. 12, on host machines 1219a and 1219b). To merge multiple VFSs, an election may be triggered between the multiple VFSs. The election may be based on characteristics of the VFSs to be merged, such as virtual IP addresses or preference policies associated with the VFSs to be merged, for example. A VFS 1208 that wins the election is treated as a master VFS. For example, if VFS 1208 wins the election, then VFS 1208 becomes the master VFS 1208. The other VFSs 1212, 1216 to be merged, which are referred to herein as slave VFSs, may join the master VFS's ACTIVE DIRECTORY domain. Available FSVMs 1223, e.g., lightly-loaded FSVMs, may be added to the master VFS 1208, and shares 1210b,c located at the FSVMs 1209b,c of the slave VFSs 1212, 1216 may be provided to the available FSVMs. The resources of the existing FSVMs 1209, such as the shares 1210, may be provided to one or more of the available FSVMs 1223 identified according to a mapping of resources that are located at existing FSVMs to available FSVMs. For example, the mapping of resources may specify that the \HR share 1210a located at FSVM 1209a and the \Development share 1210c located at FSVM 1209c are to be provided to and located at the available FSVM 1223a, and the \Finance share 1210b located at FSVM 1209b is to be provided to and located at the available FSVM 1223b. Thus, the shares 1210b,c from the slave VFSs 1212, 1216 may be made accessible as shares 1224a,b on the master VFS 1208. A snapshot operation may be used to provide the data located at the FSVMs 1209b,c of the slave VFSs 1212, 1216, such as the data accessible via the shares 1210b,c, to the available FSVMs 1223 that are incorporated into the master VFS 1208. Since the snapshot operation does not copy the data, the VFS merge operation may be performed without affecting the data stored by the VFSs 1208, 1212, 1216, and with zero to minimal down time.

Figure 14:
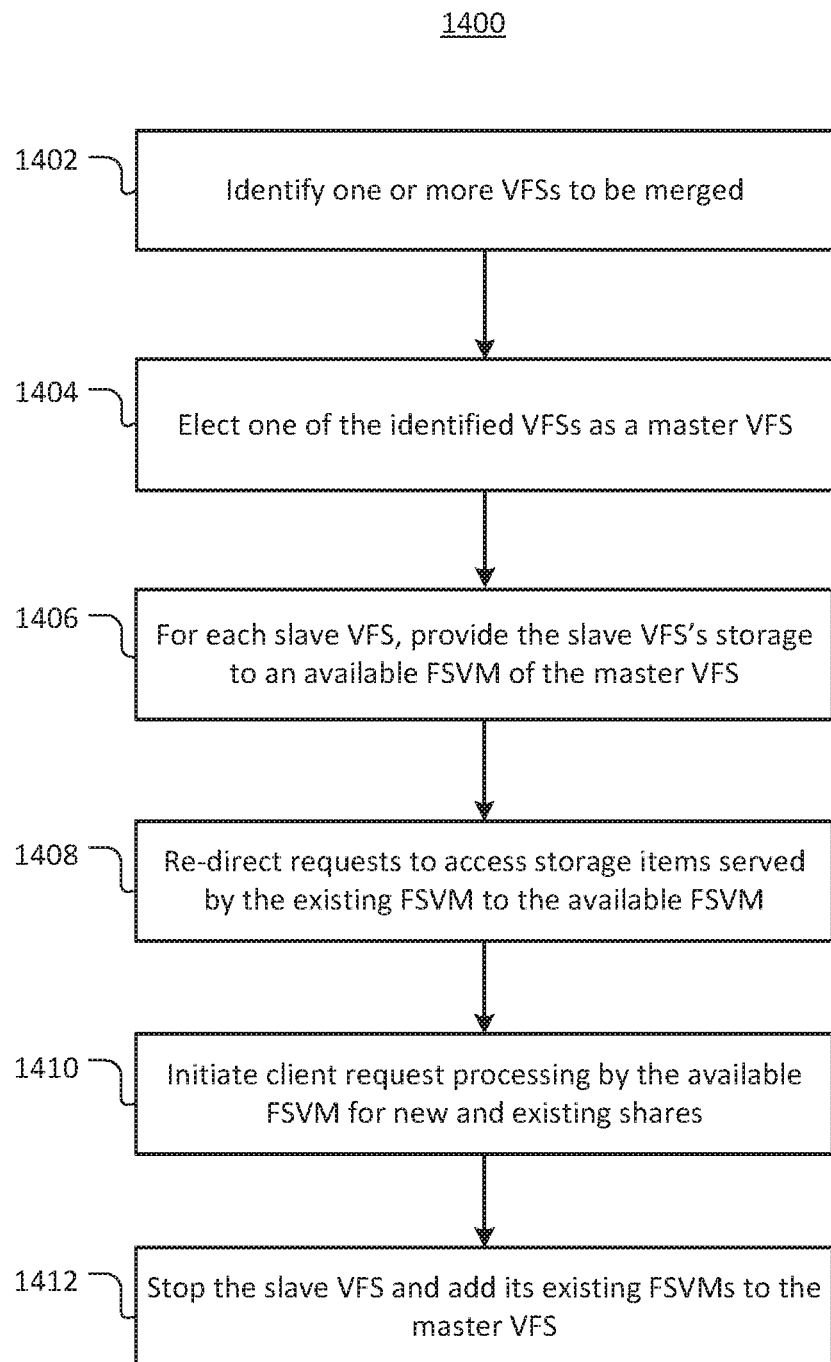
FIG. 14 illustrates an example method for merging one or more existing virtualized file servers to form a single virtualized file server.

FIG. 14 illustrates an example method 1400 for merging one or more existing virtualized file servers (VFSs) to form a merged virtualized file server 1208. The method 1400 may be performed primarily by, for example, a deployment server, a host machine 1207 of a virtualized file server, or other component associated with a virtualized file server. The method 1400 may be used to merge existing VFSs 1208, 1212, 1216 in response to, for example, a system administrator's request. The method 1400 begins at step 1402 by identifying one or more VFSs 1208, 1212, 1216 to be merged. Step 1404 may initiate a leader election to elect one of the identified VFSs 1208, 1212, 1216 as a master VFS. In this example, the VFS 1208 (named fs1) wins the election and becomes the master VFS 1208, although any one of the VFSs 1208, 1212, 1216 may win the election and become the master VFS in other examples. The other identified VFSs 1212, 1216 may then be merged into the master VFS 1208. In one example, the master VFS 1208 may be the VFS that has the highest IP address value. The election may be performed, for example, by causing a distributed lock to be requested for each existing VFS 1208, 1212, 1216, where each VFS is represented by a queue entry having an associated IP address value, and the queue entries are sorted in order of decreasing IP address value. As an example, the first VFS 1208 for which the lock is acquired may be the VFS having the highest IP address at the time of the election and may be selected as the winner of the election.

In particular embodiments, once the master VFS 1208 has been elected, clients may connect to it. The identified VFSs 1212, 1216 other than the master are referred to as slave VFSs. Step 1406 may, for each slave VFS, provide the slave VFS's storage to an available FSVM 1223 of the master VFS 1208. The available FSVM 1223 may be, e.g., a lightly-loaded FSVM, which may be in the master VFS 1208 prior to step 1406, or may be added to the master VFS at step 1406. The resources of the existing FSVMs may be provided to the available FSVMs according to a mapping of resources that are located at existing FSVMs to available FSVMs. A snapshot operation may be used to provide the data located at each FSVM 1209*b,c* in the slave VFSs 1212, 1216 to the available FSVMs 1223 without copying. Step 1408 may re-direct requests to access storage items, such as shares 1210*b,c*, served by the existing FSVMs 1209*b,c* of the existing VFSs 1212, 1216 to the merged VFS 1208's available FSVMs 1223*a,b*, on which the data may become available to clients as shares 1224*a,b*. For example, the \HR share 1210*a* from VFS 1208 and the \Development share 1210*c* from VFS 1216 may be made available on FSVM 1223*a* (as shares \Admin\HR and \Development 1224*a*). Further, the \Finance share 1210*b* located at FSVM 1209*b* of VFS 1212 may be made available on FSVM 1223*b* (as the share \Admin\Finance 1224*b*) of the merged VFS 1208. Step 1408 may also move the IP address of each existing FSVM 1209 of the slave VFS to refer to the available FSVM 1223. At step 1410, the available FSVM 1223 may start serving clients (e.g., SMB clients) for new and existing shares 1224 associated with the available FSVM 1223. Step 1412 may stop the slave VFS 1212, add its existing FSVM(s) 1209*b* one by one to the new master VFS 1208, and release the resources of the slave VFS 1212 to the new master VFS 1208.

In particular embodiments, when an existing VFS 1202 is split into two or more new VFSs 1208,1212,1216, each share 1203 hosted by the existing VFS 1202 may be re-assigned to be located at, e.g., served by, one of the new VFSs. Thus a share 1210*a* served by one of the new VFSs is not served by the other new VFSs 1212, 1216. The shares may be, e.g., SMB shares, NFS exported directories, or the like. There may be restrictions on accessing the new VFSs 1208, 1212, 1216 that prevent some users or client devices from accessing the shares 1210*a* that are located on the other new VFSs 1212, 1216. Consequently, some shares 1210*a* may be inaccessible to some users or clients. The access restrictions may be, for example, network communication restrictions. That is, access to a share 1210*b* (named \Finance) on an FSVM 1209*b* of a VFS 1212 (named fs2) may not be possible from a particular client because the client device and the FSVM 1209*b* are on different networks and there is no communication link between the two networks. However, clients that do not have access to VFS 1212 may need to access the \Finance share 1210*b*. The clients may have been able to access the \Finance share prior to the VFS 1202 being split into the new VFSs 1208, 1212, 1216, but access restrictions such as network communication restrictions or other restrictions may prevent the clients from accessing the \Finance share located on the VFS 1212.

In particular embodiments, the VFS 1212 may provide access to shares 1210*a, c* that are located on other VFSs 1208, 1216 to clients that are otherwise unable to access the shares 1210*a, c*. The VFS 1212 may provide this access by forwarding or proxying file access requests for those shares 1210*a, c* on other VFSs 1208, 1216 to the FSVMs 1209*a*, 1209*c* on which the shares are located. Although examples described herein uses shares as the storage items being accessed, any suitable type of storage item may be used instead of or in addition to shares. Other types of storage items that may be used include files, folders (also referred to as directories), and other types of data objects. The techniques disclosed herein may be applied to any type of storage item. A storage item contained in another storage item, such as a file or directory contained in another storage item such as a share or a directory, may also be accessible by clients or users to whom the other storage item is accessible. For example, accessibility of a first storage item may apply recursively to other storage items contained in or associated with the first storage item. There need not be a separate sharding map entry for each storage item that is contained in or otherwise associated with a storage item that has a "shareable=true" entry in the sharding map, or the like. Each contained storage item may be accessible in the same way as the containing or otherwise associated storage item that has an entry in the sharding map indicating the associated storage item is shareable.

In particular embodiments, a first VFS may forward or proxy requests to access files located at a second VFSs to the second VFS. The file access requests may be, e.g., network file service operations received by an FSVM of the first VFS via a network to open, read, write, or otherwise access files located at the second VFS. The FSVM or other component of the first VFS may forward the requests to the second VFS by sending them via a network to an FSVM or other component of the second VFS. The second VFS may process the requests and send responses to the first VFS, which may forward or proxy the responses to the client device(s) that send the corresponding requests. The processing and communication may be performed by FSVMs or other components of the VFSs. Alternatively, the second VFS may process the requests and send responses directly to the client device(s) if possible, though lack of network connectivity between the second VFS and the client device(s), or other access restrictions, may prevent such direct responses.

An administrative command may be provided to tag a share 1210*a* as a "shareable share" that may be shared across multiple virtualized file servers 1208, 1212, 1216. The share 1210*a* is named \HR in this example. The administrative command cause a VFS 1208 to set an attribute of the share 1210*a* in a sharding map 360 (shown in FIG. 3C) to indicate that the share 1210*a* is a shareable share. That sharding map 360 may be accessible to multiple virtualized file servers 1208, 1212, 1216. As an example, the virtualized file server 1208 may, in response to an administrative command to tag a share as a "shareable share," set an attribute named "shareable" of the \HR share in the sharding map 360 to "true." Shares that are not tagged as "shareable shares" may have no "shareable" attribute, or may have a "shareable" attribute with the value "false."

An access control list may be used to specify which users or groups are permitted to access the tagged share. The access control list may be associated with or stored with the entry for the share in the sharding map 360. The ability to selectively choose certain shares that may be shared across other VFSs 202 may provide a tight security boundary at the VFS level, along with collaborative access via two different VFSs.

As an example, if a share named Share1 located on a VFS fs1 has been tagged as a shareable share, e.g., in a sharding map, access requests for Share1 that are received by a FSVM of a VFS fs2 may be resolved by looking up the location of Share1 in a sharding table 360 or the like, and forwarded or proxied to the location of Share1, e.g., fs1, thereby allowing Share1 to be readable/writable from multiple different VFSs such as fs1 and fs2. Clients may access Share1 on both fs1 (e.g., as \\fs1 \Share1) and fs2 (e.g., as \\fs2\Share1). In this way, clients that have permission to access fs2 but not fs1 may access Share1 as \\fs2\Share1.

As an example, an existing file server fs0 may be split into two new files servers fs1 and fs2. The existing file server fs0 originally hosted a share named Share1. After the server fs0 is split, Share1 is located on fs1, and fs0 no longer exists. Clients that have access to fs1, such as a user U1 of a client device C1, may access Share1 on fs1, e.g., as \\fs1 \Share1 (optionally subject to other access restrictions, such as share-level or file-level permissions). However, clients that do not have access to fs1, such as a user U2 on a client device C2, may be unable to access Share1, e.g., because there is no network connectivity between client device C2 and an FSVM of fs1.

Figure 15:
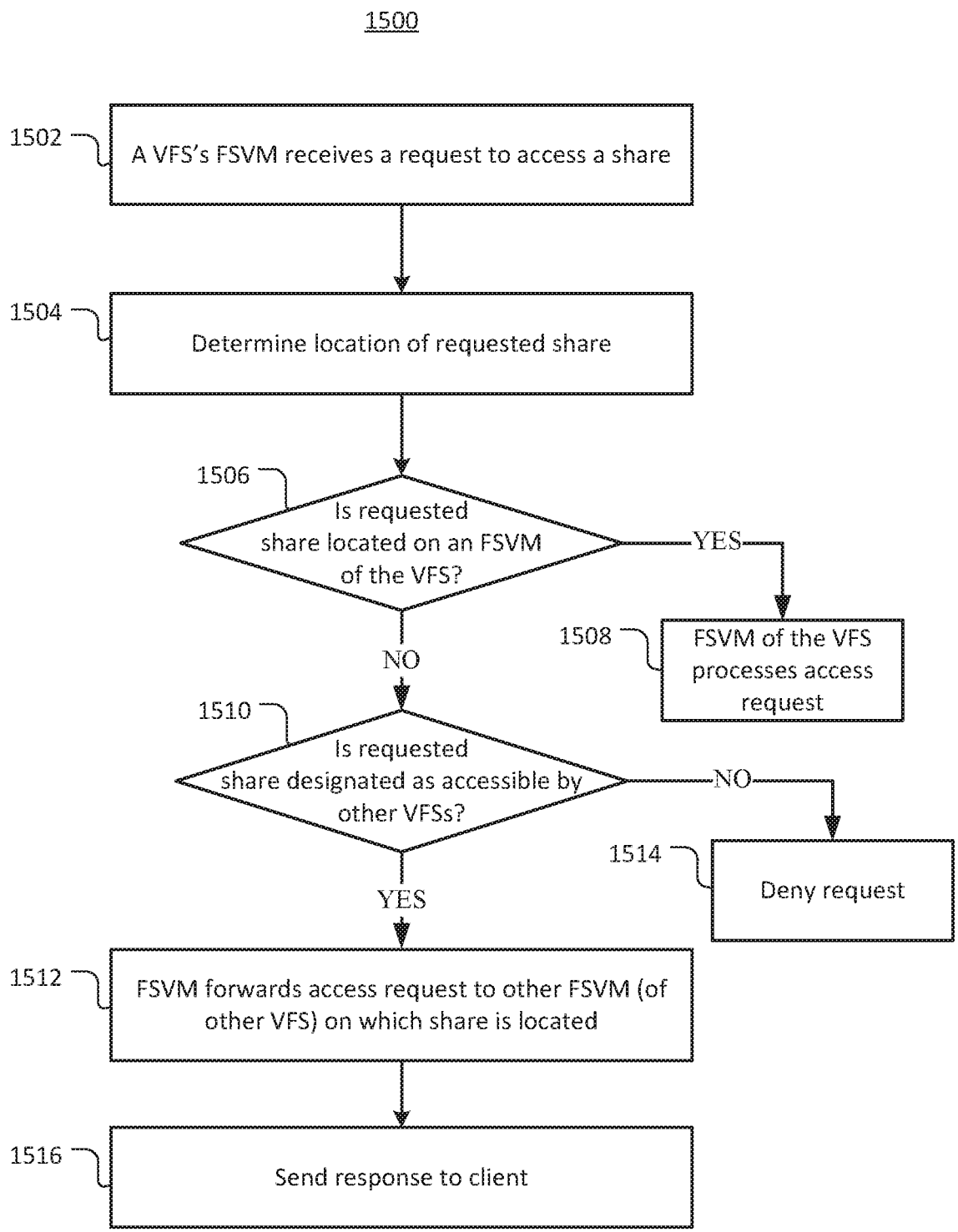
FIG. 15 illustrates an example method for accessing shared filesystems on multiple virtualized file servers.

FIG. 15 illustrates an example method 1500 for accessing shared filesystems on multiple virtualized file servers. The method 1500 may be performed primarily by, for example, one or more FSVMs of one or more VFSs 1208, 1212, 1216. The method 1500 begins at step 1502 when an FSVM 1209b receives a request to access a share or other type of storage item. The request may be received from a client system via the network 140. The FSVM 1209b is included in a VFS 1212 (fs2). The share access request may identify a storage item, such as a share 1210a, file, or directory, and may include parameters that specify an operation to be performed on the storage item, such as reading or writing data. The storage item may be a \HR share 1210a, for example.

Step 1504 may determine the location of the requested storage item. For example, step 1504 may query a sharding map 360 to determine the location (e.g., FSVM) of the share 1210a. In this example, the \HR share 1210a is located on the FSVM 1209a, so the sharding map 360 has an entry for the share 1210a, and the entry associates the share 1210a with the FSVM 1209a, e.g., (FSVM11, fs1). Further, the share 1210a has been tagged as shareable, so the sharding map's entry for the share 1210 also has a "shareable" attribute with the value "true."

At step 1506, the FSVM 1209b may determine whether the share 1210a is located on an FSVM of the VFS that received the access request, e.g., VFS 1212 (fs2) in this example. If so, the FSVM 1209b that received the request, or another FSVM of the VFS 1212 (fs2) may process the access request at step 1508, e.g., by performing the requested file server access operation and sending a result to the client that sent the access request. Otherwise, if at step 1506 the FSVM 1209b determines that the share 1210a is not located on an FSVM of the VFS 1212 that received the request, as is the case in this example, then at step 1510 the FSVM 1209b may check whether the entry for the share 1210a in the sharding map 360 indicates that the share is designated as being accessible by other VFSs, e.g., has a "shareable" attribute with the value "true." If the entry indicates that the share is accessible by other VFSs, then at step 1512 the FSVM 1209b may forward the file access request to the FSVM 1209a at which the share 1210a is located. The FSVM 1209a may process the request and send a response directly to the client that sent the request. Alternatively, instead of sending a response directly to the client, the FSVM 1209a that processes the request may send the response via the FSVM 1209b that received the request, e.g., the FSVM 1209a may send the request to the FSVM 1209b, which may in turn, at step 1516, send the response to the client that sent the request.

If step 1510 determines that the share is not designated as accessible by other VFSs, e.g., has a "shareable" attribute with the value "false," then at step 1514 the FSVM 1209b that received the request may send a reply to the client with an error indicating that the requested storage item is not accessible.

In particular embodiments, a virtualized file system (VFS) disaster recovery system may create backups of data that is stored in a VFS. A data backup may be a copy of a VFS's stored data, e.g., copies of all the files, folders, and metadata stored by the VFS. The data backup may be, for example, a file-level backup in the form of a set of files and their paths, optionally stored in an archive file, or block-level backup in the form of a set of disk blocks and associated data structures. If data loss occurs, e.g., because of a disaster, hardware failure, or other type of failure, then the VFS may recover from the failure by restoring the VFS data from the data backup, e.g., by creating a new VFS and copying the data from the backup to the new VFS. The disaster recovery system may also replicate delta changes in the storage layer so that a data backup may be supplemented over time with more recent data by storing changes to the backup in an incremental manner. The changes may be stored separately from the data backup, so that the data backup need not be modified when the changes are stored. When recovering from a failure, the VFS may restore the most recent data backup and apply delta changes that are more recent that the data backup to the restored data.

Replicating delta changes ordinary involves storing relatively small amounts of data compared to backing up all the data stored in the VFS, and is ordinarily faster than creating a backup copy of the data. However, over time, the storage space used by the delta changes may become substantial. Additional backups may be made by copying the data. The delta changes from prior to the latest backup may then be deleted, since the newer backup is more recent that the delta changes. A data backup and delta changes are referred to herein as a replicated configuration.

The backup and delta changes may be stored at a remote site, which may be at a different geographic location than the VFS. The disaster recovery system may recover the data stored in the VFS 202 from a backup stored at the remote site. The data may be recovered by reconstructing the VFS 202 from a replicated configuration, e.g., from the previously-generated data backup and delta changes.

In a production environment, the data stored on a VFS 202 may be securely protected and restored at a remote location without loss of the data and metadata and with a defined service level. The service level may specify that the data is to be recovered within a defined time period, e.g., within a supported Recovery Point Objective. A Recovery Point Objective may be, for example, the maximum amount of time for which the VFS may be unavailable without irretrievably losing data.

A custom replication policy may be configured for the VFS 202, and the ability may be provided to map the VFS 202's configuration between sites to provide disaster recovery of virtual file services across geographical locations. Particular embodiments may provide the ability to protect individual shares or share groups by protecting the volume group(s) used for file-services storage, e.g., by adding them to a protection domain (PD). A protection domain (PD) may specify a backup schedule, e.g., every day, every hour, weekly, monthly, or the like. A protection domain may also specify a number of snapshots to be retained, e.g., 2, 5, 10, or the like. The VMs in the protection domain may be backed up by creating a snapshot and replicated to a remote location (e.g., remote-site-1) by replicating deltas after creating the snapshot. A protection domain may include one or more consistency groups (CGs). A consistency group may be understood as a subset of VMs (or applications) in a protection domain. All VMs within a consistency group for that protection domain are snapshotted in a crash-consistent manner. A snapshot creates one snapshot for all VMs in a consistency group.

Users may apply the replication and backup policies on the protection domain to configure the Recovery Point Objective, recovery sites (alternate cluster or cloud), and replication constraints such as bandwidth and schedule. Particular shares may be mapped to particular remote sites by the protection domain or by the replication and backup policies.

Particular embodiments may take lightweight snapshots and transfer the delta of the snapshots for the given volume groups to remote sites. Along with file-services share data, particular embodiments may also transfer the VFS configuration, e.g. file-server size, compute-unit configuration, and metadata, e.g., share ACLs, quotas, and so on. Snapshots may copy metadata or an index at the time they are taken. The metadata or index may include a block map that maps blocks of the snapshot to blocks stored on a virtual disk. Because of the relatively small quantity of data copied by snapshots, they can be nearly instantaneous, have relatively little performance impact, and use relatively small quantities of storage space. Snapshots may be implemented using redirect-on-write, in which updates to existing data are redirected to a new location. Thus, none of the existing data in snapshots needs to be copied or moved.

Particular embodiments may also provide a simplified user interface to configure mapping of network, DNS-servers, active-directory, and so on between remote sites. The user interface may provide one-click restore of VFS file-services on remote sites. In particular embodiments, the VFS backup system described herein provides a granular level of protection (share or group of shares) to configure different Recovery Point Objectives per share or per group of shares. System administrators or users may specify custom replication policies to utilize network resources effectively for replication. The VFS backup system also provides distribution of share replication across multiple remote sites and multiple recovery points on multiple remote sites for multi-site failures. The granularity of the storage items may be specified by the backup and replication policies. For example, the granularity may be share-level to indicate that shares are to be backed up as separate units with consistency preserved inside each share, or group-of-share-level to indicate that defined groups of shares are to be backed up as units with consistency preserved inside each group.

Figure 16:
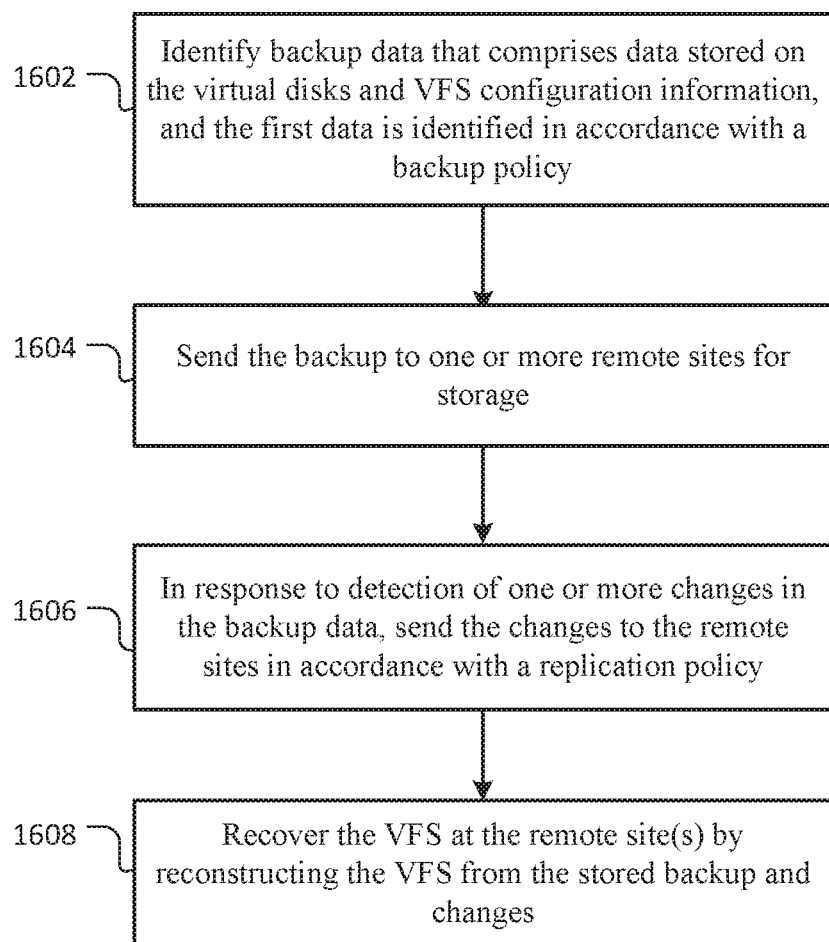
FIG. 16 illustrates an example method for recovering data after failure of a virtualized file server.

FIG. 16 illustrates an example method 1600 for recovering data after failure of a virtualized file server. The method 1600 may be performed primarily by, for example, a deployment server. The method 1600 begins at step 1602 by identifying backup data that comprises data stored on the virtual disks and VFS configuration information, and the first data is identified in accordance with a backup policy. The backup data may be identified based on a protection domain associated with the backup policy. The data stored on the VFS may include one or more storage items. The storage items comprise one or more shares, groups of shares, files, or directories. The VFS configuration information may specify configurations of one or more File Server Virtual Machines (FSVMs) of the VFS.

Step 1604 may send the backup to one or more remote sites for storage. Internal consistency of the storage items may be preserved in the stored backup data, and granularity of the storage items is specified by the backup policy. The granularity may be share-level or group-of-share-level. The data may be stored on a plurality of blocks of virtual disks of the VFS, and may be sent as a snapshot comprising one or more of the blocks to the remote sites.

Step 1606 may, in response to detection of one or more changes in the backup data, send the changes to the remote sites in accordance with a replication policy. The changes in the backup data may include one or more additions to, updates of, or deletions from the backup data. The changes may be sent according to a replication protocol. The backup and changes may be sent via a network in accordance with a Recovery Point Objective (RPO), and the RPO may be specified by the backup and replication policies. The remote sites may be identified based on the backup policy, the replication policy, or the protection domain. The host machines may be are in a first cluster, and the remote sites may be in a second cluster separate from the first cluster. The backup data may be identified and sent in accordance with backup constraints specified by the backup policy. The backup constraints may include a snapshot schedule and a bandwidth specification. The changes may be identified and sent is in accordance with replication constraints specified by the replication policy. The replication constraints may include a replication schedule and a bandwidth specification. Step 1608 may recover the VFS at the remote site(s) by reconstructing the VFS from the stored backup and changes. Internal consistency of the storage items may be preserved in the restored backup data located on the remote site(s).

Figure 6:
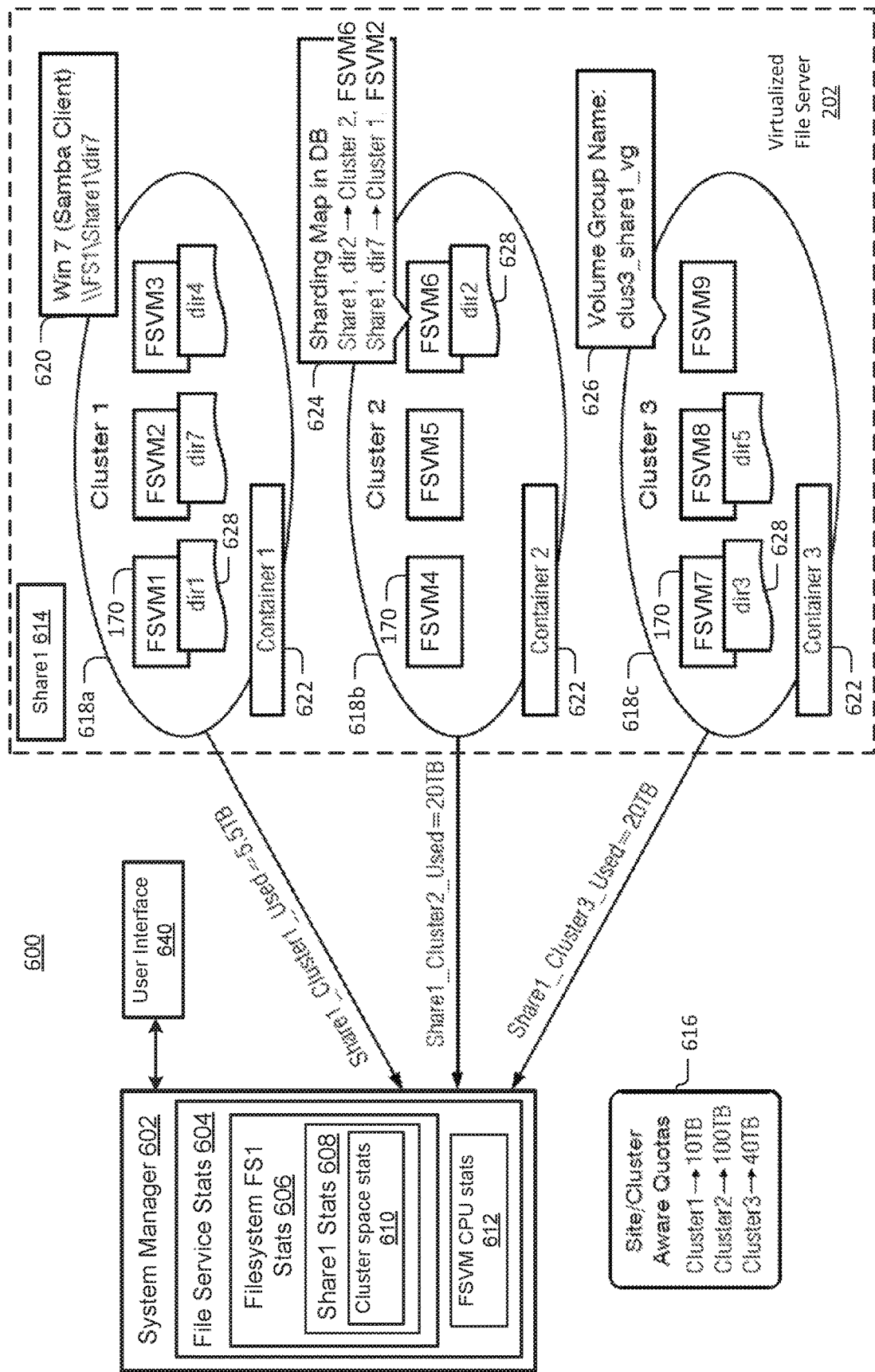
FIG. 6 illustrates an example of how a file server may be deployed across multiple clusters according to particular embodiments.

FIG. 6 illustrates an example virtualized file server (VFS) environment 600 in which a VFS 202 named "FS1" is deployed across multiple clusters 618 according to particular embodiments. Different clusters 618 may be at different geographic locations, e.g., in different buildings, cities, or countries. Particular embodiments may facilitate deploying and managing a VFS 202 having networking, compute-unit, and storage resources distributed across multiple clusters from a system management portal or interface such as a system manager 602. The system manager 602 may be, e.g., computer program code that can execute on one or more of the host systems 201. FIG. 6 also illustrates fault-tolerant inter-cluster sharding of a share "Share1" 614 across compute units 170 and clusters 618. FIG. 6 further illustrates and cluster/site/location-aware quotas within the share 614.

Particular embodiments may create a VFS 202 and distribute compute units, which may be FSVMs 170, to one or more clusters 618. For example, a portal user interface 640 of the system manager 602 may be used by a system administrator or user to create the VFS 202. While creating the VFS 202, the system administrator or user may be presented with a list of clusters, from which the administered or user may select one or more clusters. The compute units (e.g., FSVMs 170), networking (IP addresses), and storage (containers 622) may be distributed to the selected clusters. In the example of FIG. 6, the user has chosen three clusters, Cluster 1, Cluster 2, and Cluster 3 from the list. In this example, three FSVMs 170 are created on each cluster and included in the VFS 202, for a total of 9 FSVMs 170 across the three clusters 618a-c. Each cluster hosts a separate container 622, which may provide storage services to the FSVMs 170, e.g., using volume groups (such as volume group 626) that contain disk devices. Each container 622 may store a portion of the file server data. The containers 622 are labeled Container 1, Container 2, and Container 3 in this example. The containers 622 may be hidden from the administrator or user.

Particular embodiments may create one or more shares 614 and distribute the data stored within the shares 614 across the clusters 618. The data stored within the shares may be distributed to multiple storage units, e.g., containers 622, and multiple compute units, e.g., FSVMs 170, which may be distributed across multiple clusters 618. The portal user interface 640 may be used to create the "Share1" share 614 within the VFS 202. A storage pool of multiple virtual disks (vDisks) is constructed on the FSVMs 170 on the clusters 618. Each storage pool on each FSVM 170 may be responsible for a subset of the data stored in the share 614. The share 614 may be sharded at the top-level directories across FSVMs 170 residing in different clusters. For example, different top-level directories may be stored on different clusters, but each sub-directory of another directory is stored on the same cluster as its parent directory.

Figure 17:
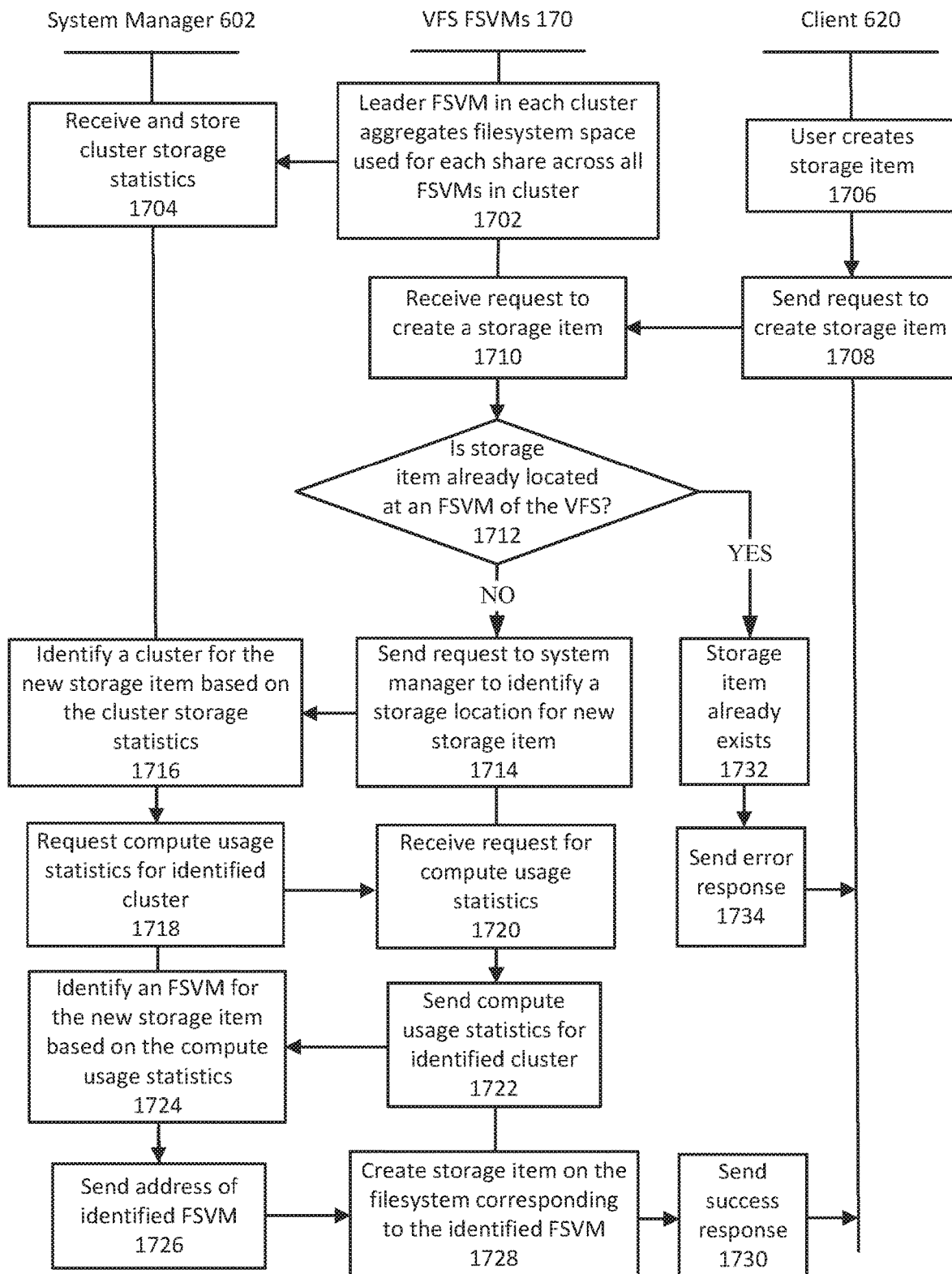
FIG. 17 illustrates an example interaction diagram for serving file access requests in a virtualized file server geographically distributed across clusters.

FIG. 17 illustrates an example interaction diagram for serving file access requests in a virtualized file server 202 geographically-distributed across clusters 618. A system manager 602 identifies the cluster 618 and FSVM 170 on which data is to be located when a storage item such as a file or directory is created by a client 620, and directs the VFS 202 to that FSVM 170. The address of the FSVM 170 at which the storage item is located may then be recorded in the sharding map 624. In particular embodiments, when an existing storage item is read or written by a client, the location of the existing storage item may be found in the sharding map 624.

In a VFS 202, the processing units (FSVMs 170) and data storage units (containers 622) may be sharded, e.g., partitioned, across clusters 618a-c, and may further be sharded across host machines 201 within each cluster 618. Initially, as shown in Table 6 below, several existing directories, e.g., dir1, dir2, dir3, dir4, and dir5, have been created on Share1 614 of the FS1 VFS 202. The directories may contain files and other directories (not shown). FSVM1, FSVM2, and FSVM3 170 are located on Cluster1 618a, FSVM4, FSVM5, and FSVM6 170 are located on Cluster2 618b, and FSVM7, FSVM8, and FSVM9 170 are located on Cluster3 618c. Of the directories 628 located on Share1 614, dir1 is located on FSVM1, dir4 is located on FSVM3, dir2 is located on FSVM6, dir3 is located on FSVM7, and dir5 is located on FSVM8. Each FSVM 170 within each cluster 614 hosts a storage pool created from a subset of the storage provided by the cluster's container 622. A sharding map 624 is stored in a database and initially contains five entries that specify the locations (e.g., cluster and FSVM) of Share1's dir1-dir5, as shown in Table 6.

TABLE 6

| Share | Storage item | Cluster | FSVM |
|---|---|---|---|
| Share1 | dir1 | Cluster1 | FSVM1 |
| Share1 | dir2 | Cluster2 | FSVM6 |
| Share1 | dir3 | Cluster3 | FSVM7 |
| Share1 | dir4 | Cluster1 | FSVM3 |
| Share1 | dir5 | Cluster3 | FSVM8 |

At Step 1702, an automatically-invoked process, e.g., a background process, may periodically run on a leader FSVM 170 in each cluster 618 to calculate the total amount of filesystem space used for each share 614 across the FSVMs 170 in the cluster 618. Other usage statistics may be collected similarly, e.g., the total amount of filesystem space available on each cluster 618. Step 1702 may send cluster storage statistics such as the total amount of filesystem space used for each share to the system manager 602 via the network 140.

At step 1704, the system manager 602 may receive the cluster storage statistics 604 for each FSVM 170 on each cluster 618 from the leader FSVMs 170. The system manager 602 may store the statistics as file service statistics 604, which may be, e.g., a data structure in which statistics for one or more VFSs 202 are collected and tracked. The file service statistics 604 may include filesystem FS1 statistics 606, which may include one or more share statistics records 608 for shares 614 served by the FS1 filesystem. Share1 statistics 608 contain statistics for Share1 614. The Share1 statistics 606 include cluster space statistics 610, indicating the amount of storage space used on each cluster 618, which may be collected as described below. The file service statistics 604 may also include optional FSVM CPU statistics 612, indicating the load average (or other measure of CPU usage) of each FSVM 170. The FSVM CPU statistics 612 may be collected for a particular cluster when the cluster has been identified, as described below. In other embodiments, the FSVM CPU statistics 612 may be collected and stored similarly to the cluster space statistics 610. The system manager 602 may store the file service statistics 604 in an entity database, e.g., APACHE CASSANDRA or the like. The system manager 602 may be, e.g., NUTANIX PRISM CENTRAL, which is a multi-cluster system manager responsible for managing multiple clusters to provide a single, centralized management interface, including a user interface 640.

Arrows are shown in FIG. 6 to illustrate the sending of usage statistics to the system manager 602. For example, Cluster1 618a may send a message to the system manager 602 indicating that 5.5 terabytes (TB) of space is used for Share1 on Cluster1. Cluster2 618b may send a message to the system manager 602 indicating that 20 TB of space is used for Share1 on Cluster2. Cluster3 618c may send a message to the system manager 602 indicating that 20 TB of space is used for Share1 on Cluster3. The system manager 602 may record the spaced used (or other appropriate storage usage statistics) for each cluster as cluster space statistics 610.

At step 1706, a user of a client 620, e.g., a WINDOWS SAMBA client, submits a request to create a new top-level directory named "dir7" on Share1 614. The new directory's full path is \\FS1\Share1 \dir7. As a result, a SMB request message to create the directory is transmitted at step 1708.

At step 1710, one of the FSVMs 170 may receive the SMB request message to create a storage item, e.g., a directory or file, such as the request to create the dir7 directory that was sent at step 1708. A SAMBA interaction layer of the VFS 202 may send and receive SMB messages via the network 140.

At step 1712, the VFS 202 may query a database, such as the sharding map 624, to determine whether the storage item, which is the directory dir7 in this example, is located at any of the existing FSVMs 170. If the sharding map 624 indicates that storage item is not located at any of the existing FSVMs 170, as is the case in this example, then at step 1714 the VFS 202 may send a request, e.g., a Remote Procedure Call (RPC) or a message, to the system manager 602 to identify a storage location of the storage item. The location of the storage item as specified in the sharding map 624 may include a cluster identifier and an FSVM identifier, which may be numbers, names, or a combination thereof. Cluster1, for example, may be identified by the number 1, and FSVM1 may be identified by the name FSVM1 or by a fully-qualified domain name (FQDN), such as fsvm1.domain.com. In this example, the storage item dir7 is not located at any of the FSVMs 170, so the request is sent at step 1714. Otherwise, if the sharding map 624 indicates that the storage item is already located at an FSVM 170, then the step 1732 may determine that the storage item already exists, and step 1734 may send an error response to the client 620.

At step 1716, the system manager 602 may identify a cluster 618 on which the storage item is to be located in response to receiving the request to identify a storage location for the new storage item. The cluster 618 may be identified based on the resource usage statistics 604. For example, the system manager may retrieve the per-cluster storage usage statistics for each share received at step 1704, and choose the cluster that has the least used space. In the example of FIG. 6, Cluster1 is chosen, since its 5.5 TB of used space is less than Cluster2's used space (20 TB) and Cluster3's user space (20 TB). The system manager 602 may also provide an option to choose the cluster that has the greatest amount of free fileserver container space. Other criteria, such as the access latency and bandwidth of the cluster's storage devices, the types of the storage devices (e.g., magnetic disk drive or solid-state drive), the frequency at which the storage devices are accessed, and so on, may also be used to choose the cluster on which the storage item is to be located.

At step 1718, the system manager 602 may send a request for compute usage statistics of the cluster identified at step 1716 to one or more FSVMs 170 of the identified cluster, such as the leader FSVM from which statistics were received (for the identified cluster) at step 1704, or to multiple FSVMs of the identified cluster. The request may be for the average CPU utilization for the past 24 hours for each FSVM in the cluster. The FSVM CPU utilization statistics may be collected at step 1718 from the appropriate cluster when needed and need not be stored in a database, but alternatively may be stored (e.g., cached) in the database for later use without being requested at step 1718 if so desired. In addition to or as alternatives to CPU utilization, other statistics that may be collected include the historical CPU load average measured over defined time periods, and other measures of FSVM utilization, such as the average percent of processing capacity used by an FSVM during a time period. In other embodiments, the FSVM CPU statistics 612 may be collected similarly to the cluster space statistics 610, e.g., by the background process described above.

At step 1720, an FSVM 170 of the identified cluster, e.g., a leader FSVM, may receive the request for compute usage statistics. At step 1722, the leader FSVM may send a response containing the requested statistics for FSVMs 170 of the cluster to the system manager 602. Each FSVM 170 in the cluster may send its compute usage statistics to the leader, and the leader may forward the statistics to the system manager 602. Alternatively, each FSVM in the cluster may send the requested compute usage statistics to the system manager 602.

At step 1724, the system manager 602 may receive the compute usage statistics for the identified cluster and, based on the compute usage statistics, identify an FSVM 170 on which the storage item is to be located. The received compute usage statistics may be stored in memory or in a database as FSVM CPU utilization statistics 612. The identified FSVM 170 may be the least-loaded FSVM 170 located on the cluster 618 that was identified at step 1716. The least-loaded FSVM 170 may be, for example, the FSVM having the lowest CPU utilization, or if multiple CPU utilization metrics are received, the FSVM having the lowest average of the CPU utilization metrics. The identified cluster is Cluster1 618a in this example, and the least-loaded FSVM 170 on Cluster1 618a is FSVM2. In particular embodiments, the FSVM 170 on which the storage item (e.g., dir7) is to be located may be identified based on the average CPU utilization for the past T hours for virtual machines within the cluster identified at step 1710. The time period T may be, e.g., 1, 6, 12, or 24 hours, or other appropriate time period. The virtual machines that are included in the CPU utilization measurements may be one or more of the FSVMs 170, User VMs 105, and CVMs 110. Other processes, or all processes on the same host machine 201 as the FSVM 170, may also be included in the CPU utilization that is evaluated when identifying the FSVM 170. Other factors may be used in the identification of the FSVM, e.g., network latency and bandwidth of communication between FSVMs 170 on the identified cluster, the number, type, and speed of CPUs available for use by the FSVM 170, and so on.

At step 1726, the system manager 602 may send a message specifying the identified cluster and FSVM to an FSVM 170 of the VFS 202. The message may include a tuple <Cluster 1, FSVM2 FQDN>, where FSVM2 FQDN is the fully-qualified domain name of FSVM2 (e.g., fsvm2.domain.com). Alternatively, the non-qualified FSVM name, such as FSVM2 without a domain, may be used instead of the fully-qualified domain name.

At step 1728, the VFS 202 may receive the address of the identified FSVM and create the storage item on the filesystem corresponding to the identified FSVM 170 in the identified cluster. In this example, dir7 is to be located on FSVM2, so the VFS 202 creates a new directory named dir7 on the filesystem corresponding to FSVM2. The VFS 202 may record the mapping (<Share1, dir7>, Cluster 1, FSVM2) in a database such as the sharding map 624 shown in Table 6, and may return a PATH_NOT_COVERED message to the client 620. Through DFS referral, the SAMBA client 620 may request the path for the directory dir7. The FSVM 170 that receives the SAMBA path request may look up dir7 in the sharding map 624, and may find and return FSVM2's IP address to the client 620. The client 620 may then access dir7 on the FSVM2 filesystem by sending SAMBA requests to and receiving responses from FSVM2. At step 1730, the FSVM 170 may send a response indicating that the storage object was successfully created to the client 620.

In particular embodiments, the filesystem on an FSVM 170 may be composed of vDisks. Since vDisks are distributed across the cluster 618a, this arrangement provides uniform sharding of storage within the cluster 618a. This sharding strategy causes the containers 622 and FSVMs 170 of each cluster 618 to be used, and achieves uniform sharding of storage units and compute units across the clusters 618.

Particular embodiments may provide cluster-aware sharding and cluster-aware share-level quotas 616. At the time of share creation, a system administrator or user may be presented with an option to co-locate the data for the share within certain clusters. This option may be useful if the administrator or user wishes to have a set of shares distributed within a certain geographical boundary, and a different set of shares distributed across a different geographical boundary, in which case the above sharding process may still be used. At step 1708 above, only those clusters that were selected while creating the share may be made available to be considered for sharding. This technique provides cluster-aware sharding.

In particular embodiments, quotas 616 may be set on a file server service 202. The quotas 616 may specify a limit on the amount of data storage to be used for each share within each cluster. As an example, the quotas 616 may specify that the storage limit for each share is 10 TB for Cluster1, 100 TB for Cluster2, and 40 TB for Cluster3. Since the system manager 602 stores a per-share, per-cluster storage usage in the share data 608, it can detect when a cluster-level share quota is reached or exceeded. Depending on the quota policy, the user may be alerted when this cluster-level quota is reached or exceeded, or the system manager 602 may notify the FSVM leader within the cluster 618 whose quota has been reached via RPC. On receiving this notification, the FSVM leader may make all filesystems for that share across FSVMs read-only to respect the storage quota limit.

In particular embodiments, a virtualized file server (VFS) self-healing system may automatically identify data corruption and perform data recovery operations at multiple levels in the storage hierarchy, including the file level, filesystem level, and storage level. The self-healing system may identify and recover from data corruption without manual intervention. The self-healing system may detect data corruption at each of the levels and, in response to detecting data corruption at a particular level, perform a data recovery operation at that level. The term "data corruption" as used herein may refer to incorrect or missing data resulting from a hardware or software failure. The storage hierarchy levels at which the self-healing service may identify and recover from data corruption include the file level, filesystem level, and storage level. Each level has an associated unit of storage and recovery e.g., a unit of stored data that may be identified as being corrupt and recovered.

In particular embodiments, to automatically identify data corruption, the self-healing service may perform consistency checks, such as calculating checksums of data blocks and comparing the calculated checksums to expected checksum values associated with or stored in the data blocks. Data loss may be identified automatically by, for example, checking logs that record data write operations. Data loss and corruption may also be identified by detecting events that may lead to corrupted or lost data, such as storage device disconnections, read or write error, power failures, and so on.

Particular embodiments may identify corrupted or infected data and recover a consistent version of the data from a VFS 202. Data may be infected by a virus or corrupted by a file system or storage system failure, for example. If the appropriate recovery level is not detected and data is recovered at the wrong place, then a valid version of data may be lost. System administrators need not worry about detecting and recovering a consistent version of data when the system administrator detects the corruption and infected data and manually recovers the data from a file system or from storage system. A distributed self-healing mechanism of the VFS 202 may frequently take snapshots of file system and storage pools, and may monitor the user data at file system and storage system levels.

As introduced above, the storage hierarchy levels at which the self-healing service may identify and recover from data corruption include the file level, filesystem level, and storage level. Each level has an associated unit of storage and recovery e.g., a unit of stored data that may be identified as being corrupt and recovered. The file level's unit of storage and recovery may be a file or directory. Note that the term "directory" is used herein to refer to either a folder or a directory, and the terms "folder" and "directory" are used interchangeably herein. Files and directories may be associated with metadata, such as names, paths, types, sizes, and access restrictions. For example, corruption of data stored in a file or metadata associated with the file may be detected, and the corrupt file may be recovered. Data or metadata associated with the file and stored at a later point in time than the most recent recoverable version of the file (e.g., the most recent backup or snapshot) may be lost. Filesystem or anti-virus or other internal modules can detect file or directory-level infection or corruption. The anti-virus module may be, e.g., a virus or malware detector. In particular embodiments, the self-healing system may monitor these events and, upon detecting one or more such events, recover the particular data associated with the event from the previous file system snapshot by overwriting the infected/corrupted files/folders.

The filesystem level's unit of storage and recovery may be a filesystem. A filesystem may be a set of one or more files and directories, and associated metadata. For example, when corruption of filesystem data or metadata is detected, the entire filesystem may be recovered. Data or metadata associated with the filesystem and stored at a later point in time than the most recent recoverable version of the filesystem (e.g., the most recent backup or snapshot of the filesystem) may be lost. Thus multiple files that are not included in the most recent recoverable version may be lost when the filesystem is recovered. In particular embodiments, the self-healing system may monitor the checksum(s) of the filesystem, and upon detecting any discrepancy on the filesystem, e.g., upon calculating a checksum that does not match an expected checksum associated with the filesystem, recover the file system from the filesystem's latest snapshot.

The storage level's unit of storage and recovery may be a storage unit, such as a volume group, storage pool, or storage device (e.g., a hard drive or solid-state drive), which may contain one or more filesystems. The filesystems, which may include files and directories, may be restored if data corruption is detected at the filesystem level. Thus, data or metadata stored in one or more filesystems and more recent than the most recent recoverable version of the storage unit may be lost when the filesystem is recovered. In particular embodiments, the self-healing system may monitor storage-pool corruption and alerts generated by a cluster and detect corresponding data losses and corruption. Upon detecting such data corruption or data loss, the self-healing system may recover the storage unit (e.g., storage pool) associated with the data loss or corruption from the latest snapshot.

In particular embodiments, since VFS compute and storage units may be distributed across multiple FSVMs 170 on multiple host machines 201, the self-healing system may efficiently monitor the corruption and data loss in a parallel and distributed fashion on all the FSVMs or host machines 201 of the VFS and detect and recover the lost data on the corresponding FSVM or host machine 201 on which the data is located without affecting the overall file server 202. The self-healing system may be implemented as a daemon process or other type of background process that runs on each host machine 201.

In particular embodiments, backups of one or more of the storage hierarchy levels may be made. If a filesystem is corrupt, the backup of that filesystem may be restored to recover the filesystem. When a failure (e.g., data corruption) is detected, the self-healing system may alert the system administrator or user and recover from a backup (e.g., from a snapshot of the storage hierarchy level at which the failure is detected). The filesystem provided by a VFS may be implemented using multiple separate filesystems associated with FSVMs 170. Each FSVM may be associated with a filesystem and storage (e.g., a volume group). Each FSVM may recover the data on its associated filesystem and storage. A leader FSVM may orchestrate recovery of the FSVMs. For example, if the entire filesystem is corrupt, the master may recover a backup of the previous filesystem by instructing all FSVMs on which at least a portion of the filesystem is located to recover. A directory containing multiple files may be distributed across multiple filesystems, so recovery a directory may involve orchestrating multiple FSVMs.

Figure 18:
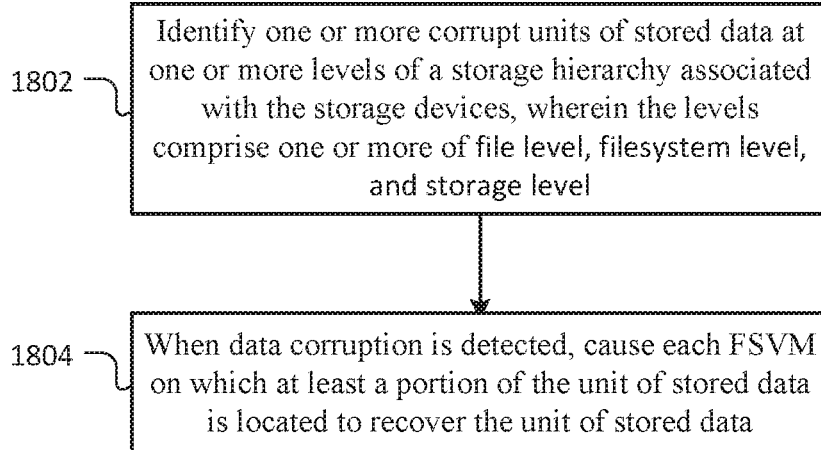
FIG. 18 illustrates an example method for detecting and recovering from data corruption in a virtualized file server.

FIG. 18 illustrates an example method 1800 for detecting and recovering from data corruption in a virtualized file server. The method 1800 may be performed primarily by, for example, one or more host machines 201 of a VFS 202. The method 1800 begins at step 1802 by identifying one or more corrupt units of stored data at one or more levels of a storage hierarchy associated with the storage devices, wherein the levels comprise one or more of file level, filesystem level, and storage level. At step 1804, when data corruption is detected, the method 1800 may cause each FSVM 170 on which at least a portion of the unit of stored data is located to recover the unit of stored data. To identify one or more corrupt units of stored data, the self-healing system is configured to monitor the corruption and data loss on all FSVMs of the VFS. The method may, for example, send instructions to a leader FSVM of the VFS to monitor the corruption and data loss on all FSVMs. When corruption is detected, the method may send instructions to the leader FSVM to instruct each FSVM on which at least a portion of the corrupt data is located to recover the corresponding portion of the corrupt data.

Particular embodiments may back up data stored in a cluster to an object store, which may be in a public or private cloud (e.g., AMAZON WEB SERVICES), or to a low-cost storage medium within the same cluster. Particular embodiments may then retrieve the backed-up data as needed to restore files for the file server. Particular embodiments may provide a method to backup data stored on a virtualized file server (VFS) 202 to a low-cost storage medium hosted on the same physical infrastructure, e.g., on the host machines 201, as the VFS 202. This physical infrastructure may include a virtualized server providing an object store interface (such as AMAZON S3) and using low-cost storage media such as Shingled Magnetic Recording (SMR) drives. This particular virtual machine (VM) may act as a backup server for other VMs running on the same infrastructure.

Particular embodiments of the backup server may be hosted on the same infrastructure as the compute and storage. Particular embodiments of the backup server may be used for low-cost storage media, such as SMR drives attached to the same infrastructure. Particular embodiments of the backup server may provide generic object-store interfaces such as AMAZON S3 or the like. Particular embodiments of the backup server may provide the same level of availability as the other highly-available services (such as FSVMs) that run on the cluster.

Figure 19:
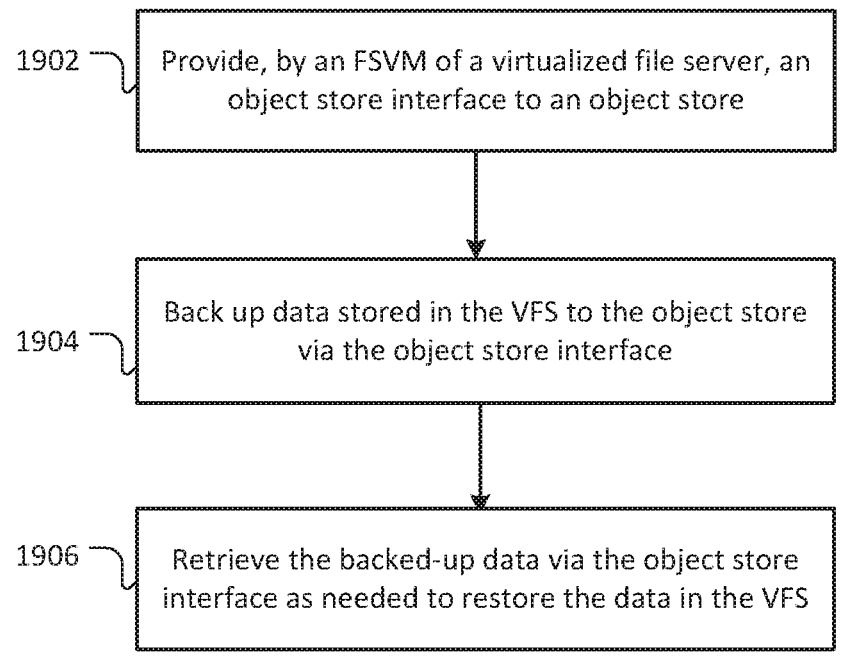
FIG. 19 illustrates an example method for backing up data stored on a virtualized file server to cloud-based storage.

FIG. 19 illustrates an example method 1900 for backing up data stored on a virtualized file server to cloud-based storage. The method 1900 may be performed primarily by, for example, a backup server. The method 1900 begins at step 1902 by providing, by an FSVM 170 of the VFS 202, an object store interface to an object store. At step 1904, the method may back up cold (e.g., infrequently accessed) data stored in a VFS located on a cluster of host machines to an object store. The data may be, e.g., storage items such as files or directories. The object store may be in a public cloud (e.g., AMAZON WEB SERVICES), or may be a low-cost storage medium within the same cluster. At step 1906, the method may retrieve the backed-up data, e.g., volume groups, as needed via the object store interface to restore the previously backed-up data for the VFS.

In particular embodiments, the FSVM 170 of the VFS 202 may provide the object store interface (such as that associated with AMAZON S3) to low-cost storage media, such as Shingled Magnetic Recording (SMR) drives. This FSVM 170 may act as a backup server for other VMs, e.g., FSVMs, running on the same infrastructure. In this way, the VFS 202 may store data on and retrieve data from the low-cost storage media.

Particular embodiments of the backup server may be hosted on the same infrastructure as the compute and storage, e.g., the same host machines as the VFS. Particular embodiments of the backup server may be used for low-cost storage media, such as SMR drives attached to the infrastructure. For example, the low-cost storage media may be attached to one or more FSVMs 170 of the VFS 202 without using an object store interface such as AMAZON S3. Particular embodiments of the backup server may provide generic object-store interfaces such as AMAZON S3 or the like. Particular embodiments of the backup server may provide the same level of availability as the other highly available services (such as the VFS and the FSVMs that provide VFS services) that run on the cluster.

Particular embodiments may include a cloud service as a storage tier of a virtualized file server. Storage may have multiple tiers, e.g., a hot-data tier for frequently-accessed data, a cooler-data tier for occasionally-accessed data, and a cold-data tier for very-infrequently-accessed data. Each tier may have an associated access time, and more-frequently-accessed data may be stored on tiers having faster access times than less-frequently-accessed data. Each file or folder may be associated with a tier. In particular embodiments, any attribute of a storage object may be associated with a tier. Other policies are possible, e.g., by quality of service, or a particular user's files may be associated with a tier. The hot-data tier may be associated with a high-speed storage device, such as a static memory drive. The cooler-data tier may be associated with a medium-speed storage device, such as a hard disk drive. The cold-data tier may be associated with a low-speed storage device, such as an optical drive, which may be located at a different physical site than the VFS's host machines 201.

In particular embodiments, the access frequency associated with data stored in a VFS may be determined based on usage statistics. Occasionally-accessed data may be moved to a slower storage tier, such as offsite backup or optical backup. Particular embodiments may then retrieve the backed-up volume groups as needed to restore files for the file server.

Figure 20:
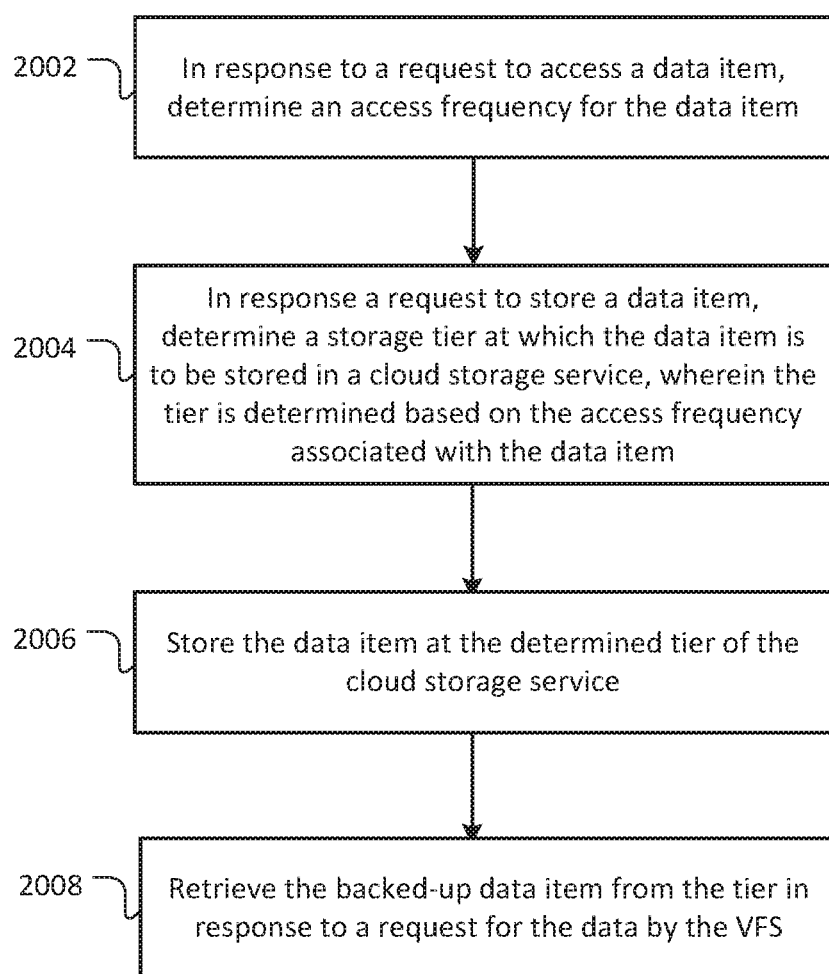
FIG. 20 illustrates an example method for storing virtualized file server data in tiers of cloud storage having different access characteristics.

FIG. 20 illustrates an example method 2000 for storing virtualized file server data in tiers of cloud storage having different access characteristics. The method 2000 may be performed primarily by, for example, a backup server. The method 2000 begins at step 2002 by, in response to a request to access a data item, determining an access frequency for the data item. The access frequency may be determined by an FSVM 170 on which the data item is located by, for example, measuring the time between consecutive accesses (e.g., reads or writes) of the data item. The frequency may be a frequency measured in the past, may be determined based on one or more past frequencies (e.g., as an average of past frequencies), or may be determined based on an expected future access frequency associated with the data item or the type of the data item. For example, data that is known to be infrequently accessed, such as a backup of accounting records than are expected to be accessed at most once a year, may be associated with a low frequency. The low frequency may be represented as a particular value, e.g., 3, where medium is represented by 2 and high is represented by 1. Alternatively, the low frequency may be a particular frequency value, e.g., 1 access per week or 1 access per month.

At step 2004, the method may, in response a request to store a data item, determine a storage tier at which the data item is to be stored in a cloud storage service. The tier may be determined based on the access frequency associated with the data. In particular embodiments, the tier associated with a data item may be a first tier for data accessed at a first frequency and a second tier for data accessed at a second frequency less than the first frequency. Each tier may be associated with a frequency of data access, which may be related to the storage access time of the tier. Each data item may be associated with a tier, and the tier may be determined based on frequency of access of the data item. The first frequency may be, e.g., less than one hour or less than one day. The second frequency may be, e.g., greater than one hour and less than one day, or greater than one day and less than one week. A third tier may be with a third frequency that is less than the second frequency. The third frequency may be, e.g., greater than one week, or greater than one month, or never (e.g., a frequency of zero). The access frequency may be based on usage statistics.

At step 2006, the method may store the data item in the determined tier of the cloud storage service. The data item may be, e.g., a file or directory. The storage service may be a public cloud (e.g., AMAZON WEB SERVICES), or may be a low-cost storage medium within the same cluster.

At step 2008, the method may retrieve the backed-up data item from the tier as needed, e.g., in response to a request for the data by the VFS. The tier associated with particular data may be stored by the VFS in the sharding table or other database. For example, a data item such as a file associated with a cold tier may be stored on the cold tier, and an indication that the data is stored on the cold-tier may be stored in the sharding table. The stored tier indication may be used in subsequent calculations to determine the tier. Access frequencies may also be stored in the sharding table or other database with each data item and used in subsequent calculations of the tier. As an example, when a storage item is accessed, if access frequencies of a storage item are found to have decreased since the storage item was last accessed, then the tier may be reduced to the next lower tier (e.g., down to the cold-data tier if the current tier is cooler-data).

Similarly, if the access frequency has been found to be similar, e.g., within 5% or within 10% or similar value, then the tier may remain unchanged. If the access frequency have been found to have increased since the storage item was last access, then the tier associated with the data item may be increased to the next higher tier (e.g., up to the hot-data tier if the current tier is cooler-data).

In particular embodiments, a virtualized server 202 may include a block-awareness system to maintain availability of VFS services in case of failure of a block by deploying FSVMs 170 on different blocks. A block 201 may be, for example, a rackable unit, which may include one or more host machines 201. In one example, a block may be a 2U (two unit height) chassis, which may include 1, 2, or four host machines 201. In particular embodiments, if there are three or more blocks 201a-c for the same FSVM 170, e.g., the FSVM 170 is located on one block and backup FSVMs ready to take over for the FSVM 170 are located on two other blocks, then the FSVM 170 may be block-fault-tolerant. If one FSVM 170a on a block fails and a backup FSVM 170b on a different block takes over for the FSVM 170a, then data loss does not ordinarily occur. In particular embodiments, data located at, e.g., stored on, two or three different blocks may remain available if one of the blocks fails. That is, when a block on which an FSVM 170a is located fails, if a backup of the FSVM 170a is on a different block, then the failure can be tolerated.

In particular embodiments, when FSVMs are created, three different blocks may be chosen for each FSVM 170, and the FSVMs 170 may store data in a block-aware manner. Thus, for example, an FSVM 170 located on a host machine 201 in a first block may have a first backup FSVM 170 located on a second block and a second backup FSVM 170 located on a third block. For example, when a first block fails (e.g., due to power loss affecting the block), the hypervisor 130 on a second block may attempt to migrate the VMs from the first block to the second block. If the second block does not have sufficient resources (e.g., storage) available, the VM migration may fail. In particular embodiments, if there are not enough resources on the available running host machines in the second block for the VM migration to succeed, then the VFS HA features may be triggered, and online FSVM(s) 170, such as FSVMs in the second block, may take ownership of the volume-group of offline FSVM(s), e.g., as illustrated in FIGS. 3F-3H.

In particular embodiments, the user VMs 105 may be prioritized over FSVMs 170 for migration to remaining hosts during block failure. That is, migration of user VMs 105 to remaining host machines may be prioritized over migration of a failed FSVM 170a to the remaining host machines. For example, the user VMs 105 may be migrated without disconnecting clients or applications, e.g., using live migration or the like. The FSVMs 170 do not necessarily need to be migrated in this way, since the VFS can recover from FSVM failures by re-assigning the storage resources from a failed FSVM 170a to a remaining FSVM 170b. Thus the user VMs 105 may be migrated with higher priority than the FSVMs 170 to minimize potential delay or downtime during which the user VMs 105 may could be unresponsive if they were to wait for migration of the FSVM 170a. The remaining FSVM 170b may take over with little delay, so that the VFS services may continue to be available while the failed FSVM 170 is unavailable. Thus, file access operations may continue in the user VMs 105 without noticeable delay.

In particular embodiments, if multiple host machines fail simultaneously, the recovery process may re-assign the resources (e.g., storage resources) of the failed host machines to other available host machines.

Figure 21:
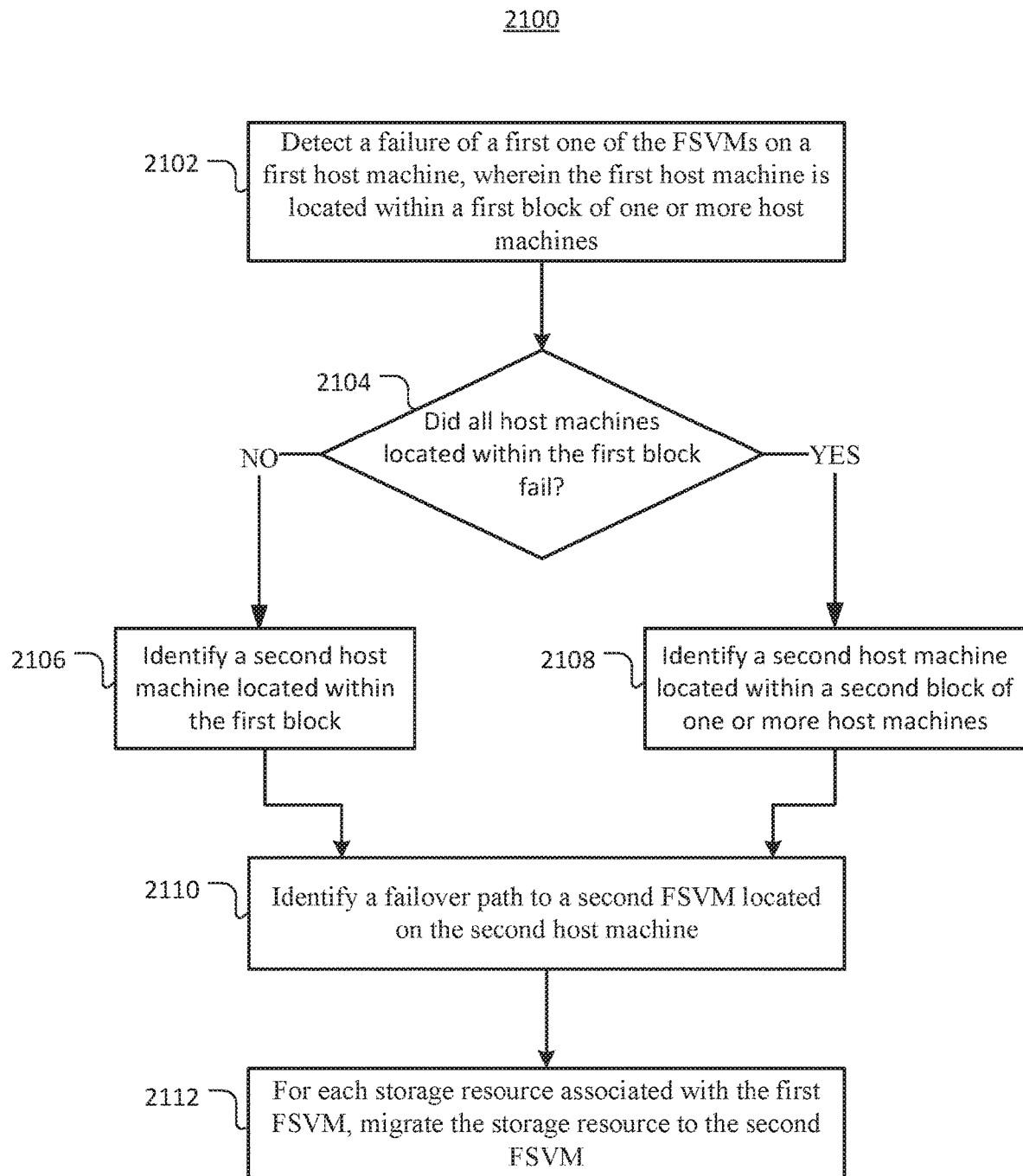
FIG. 21 illustrates an example method for recovering from block failures in a virtualized file server.

FIG. 21 illustrates an example method 2100 for recovering from block failures in a virtualized file server. The method 2100 may be performed primarily by, for example, one or more host machines 201 of the VFS. The method 2100 begins at step 2102 by detecting a failure of one of the FSVMs located on a first host machine. The first host machine is located within a first block of one or more host machines. Step 2104 may determine whether all host machines located within the first block failed. If so, step 2106 may identify a second host machine located within the first block. If not all host machines located within the first block failed, step 2108 may identify a second host machine located within a second block of one or more host machines. Step 2110 may identify a failover path to a second FSVM located on the second host machine. At Step 2112 may, for each storage resource associated with the first FSVM, migrate the storage resource to the second FSVM. Failover steps are described in further detail with reference to FIGS. 3F-3H.

In particular embodiments, the identified failover path may be one of a plurality of failover paths defined for use when a FSVM fails within the cluster. The identified failover path may be selected by a failover configuration. The failover configuration may select the identified failover path as a previous primary path, a preferred path, or a path selected based on a round-robin ordering. The failover configuration may select the failover path having the least number of outstanding or pending requests as compared to other failover paths. The failover configuration may select the failover path based on determining whether the first host machine failed, or determining whether all host machines located within the first block failed. The second FSVM may take over an IP address associated with the first FSVM to cause the second FSVM to receive and process storage requests sent to the first FSVM. To detect the failure, a leader FSVM, which may be one of the FSVMs, may be configured to detect a timeout of communications with the first FSVM or a lack of response from the first FSVM to a periodic status check message.

Particular embodiments may recover from multi-node file service failures in a virtualized file server (VFS) 201 with minimal down time. Traditional file server deployments protected against single host machine failures by having a standby host machine. Detection of service failures is not spontaneous and issues can occur with keeping backup host machines synchronized. Further, if the new active host machine is also down, there may be no way to recover the service. These issues not only cause service interruption but may also create complications if there are multiple host machine failures.

In particular embodiments, failures of multiple host machines 201 and FSVMs 170 may be detected and recovered from without interrupting service to clients. Simultaneous failure of up to half of the host machines 201 may be tolerated. A distributed cluster health service may be used to detect failures. The cluster health service or the like, e.g., FSVMs 170 monitoring each other, may detect communication timeouts, I/O alerts, or other events that potentially indicate a host machine 201 has failed. When a service failure is detected, the other active host machines 201 may take over the failed host machine's services (both storage and network). Each host machine 201 in a cluster may act as a potential backup host machine, so multiple simultaneous host machine failures may be tolerated as long as no more than half of the host machines 201 in the cluster fail. So, even if the new active host machine is down, other host machines in the cluster can take over the new active host machine's storage resources and provide continuous availability. Thus, clients of the VFS 202 do not ordinarily perceive any downtime or service interruptions when multiple host machines in the cluster are down.

As an example, when an FSVM 170 named FSVM-1 that owns two volume groups named 1A and 2A fails, another FSVM-2 may become the owner of the two volume groups 1A and 2A and provide file services for storage items that are stored on those two volume groups. Suppose another FSVM, e.g., FSVM-4, fails prior to FSVM-1's recovery, so there are multiple failed nodes at the same time. FSVM-4 has two volume groups 1B and 2B. When FSVM-4 goes down, another free FSVM, e.g., FSVM-5, may take over for volume groups 1C and 2C and provide file services for storage items that are stored on those two volume groups. In particular embodiments, another free FSVM is available as long as less than half of the FSVMs in the cluster have failed.

In particular embodiments, for each of the failed FSVMs, the health monitoring service may select the live FSVM to which its corresponding IP address is assigned based on affinity. Affinity may pertain to an affinity of requests served by the failed FSVM with: a configuration of the live FSVM, a protocol to which the requests conform, resources assigned to the host machine on which the live FSVM is running; or security restrictions applying to storage resources previously served by the failed FSVM.

In particular embodiments, for each of the failed FSVMs, the health monitoring service may select the live FSVM to which its corresponding IP address is assigned based on a plurality of failover paths defined for use when a FSVM fails within the cluster. The failover paths may be defined as part of an overarching failover configuration.

In particular embodiments, for each of the failed FSVMs, the health monitoring service may select the live FSVM to which its corresponding IP address is assigned based on a previous primary failover path, a preferred failover path, or a failover path selected based on a round-robin ordering, or any other appropriate ordering/ranking algorithm.

In particular embodiments, for each of the failed FSVMs, the health monitoring service may select the live FSVM to which its corresponding IP address is assigned based on determining which of the live FSVMs has few outstanding or pending requests as compared to FSVMs associated with other failover paths.

In particular embodiments, for each of the failed FSVMs, the health monitoring service may select the live FSVM to which its corresponding IP address is assigned based on whether a host machine on which the selected live FSVM is running has low resource usage statistics as compared with other failover paths.

Figure 22:
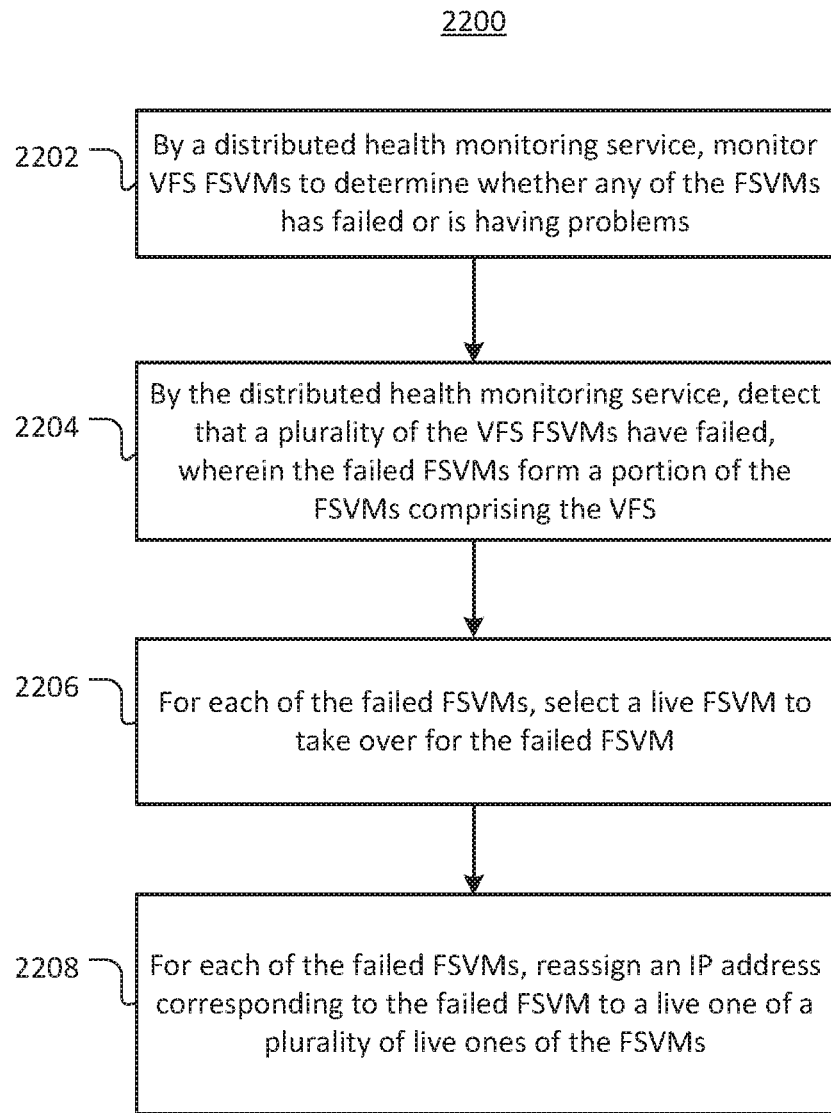
FIG. 22 illustrates an example method for recovering from multi-node file service failures in a virtualized file server.

FIG. 22 illustrates an example method 2200 for recovering from multi-node file service failures in a virtualized file server (VFS) 201. The method 2200 may be performed primarily by, for example, a VFS. The method 2100 begins at step 2202, in which a distributed health monitoring service may monitor VFS FSVMs 170, e.g., FSVMs that are included in a VFS, to determine whether any of the FSVMs has failed or is having problems. A failed FSVM may be, for example, an FSVM on a host machine that has crashed or is not operating correctly. As another example, a failed FSVM may be an FSVM that is not operating correctly, e.g., by being unresponsive to communication via the network 140, or by sending incorrect responses, such as responses that do not conform to a communication protocol to which the FSVM is expected to conform. At step 2204, the distributed health monitoring service may detect that a plurality of the VFS FSVMs have failed, and that the failed FSVMs form a portion of the FSVMs comprising the VFS. Step 2206 may, for each of the failed FSVMs, select a live FSVM to take over for the failed FSVM. The live FSVM may be, for example, an FSVM that is operating correctly, e.g., a failure-free FSVM. Step 2208 may, for each of the failed FSVMs, reassign an IP address corresponding to the failed FSVM to a live one of a plurality of live ones of the FSVMs.

In particular embodiments, a VFS 202 may provide individual users with storage system information about the file server that is specific to the user, based on configuration information of VFS 202. For example, VFS 202 may provide a user with information about the portion of a share or directory that they are permitted to use for data storage and retrieval. VFS 202 may also provide the user with information that is customized according to a user role that is assigned to the user, or according to a level of quality of service guaranteed to the user.

In particular embodiments, a VFS 202 may provide usage quotas to limit the amount of file server space that can be used by particular users to store data. As an example, consider a scenario when many users have their home directories on the same share. Existing technologies display the user's drive size as being the same as total share size, thereby giving the user the perception that the total share size is available to write data. However, the user's quota limit may be less than the total share size, in which case the total share size is not an accurate indication of the amount of space available to the user to write data. In scenarios such as a user's home directory being accessed for read/write operations, the user may not be able to determine how much disk quota is assigned to the user or how much actual space is available to the user to write data. When the user's quota limit has been met or exceeded, any further writes to the share requested by the user may fail. Thus, to avoid data loss or other failures that may result from unexpected exhaustion of storage space, particular embodiments provide information about the portion of the share that that user is permitted to use.

Particular embodiments may provide user-specific data to each user, so that when the user accesses their Virtual Desktop Infrastructure (VDI) environment, e.g., in a user VM 105, information about the user's storage usage may be presented. For example, users may view the total size of the share using a command or query for the total size of a disk, or as part of the output of another command, such as a command that causes a list of files to be presented to the user. However, the total size of a disk may be greater than the user's quota limit, as described above. Thus, particular embodiments may provide a value related to the user's quota, such as the quota limit, in response to requests for the size of a disk in place of the size of the disk. Note that the term disk is used herein to refer to any type of mappable or mountable portion of a filesystem, such as a share, disk partition, or directory.

As another example, the user may be presented with their home directory as a mounted drive, and with data specific to their disk portion, such as the quota limit, disk capacity, average rate of utilization of space, frequency of disk accesses, file type, and so on. When a soft quota limit is reached, e.g., an average past disk space utilization quota, the user may be alerted through email or other form of communication that their disk quota is about to be or has been exhausted. In particular embodiments, when a soft quota limit is reached, less-frequently-accessed files, folders, and other items may be archived automatically to the cloud or other storage.

In particular embodiments, to implement the replacement of the disk capacity with the quota limit as described above, a network filesystem request for the amount of free space on a disk, a WINDOWS SMB request, may be intercepted, e.g., by an FSVM 170. A response to the request may be sent based on the properties of the individual user's disk portion, e.g., the user's quota limit, instead of the share's properties.

In particular embodiments, the storage system information requested may comprise a number of all storage items stored in a specified location, such as a SMB share. The response may be customized to report a number of storage items associated with the user as the number of all storage items stored in the specified location. The response may be customized to label the number of storage items associated with the user as the number of all storage items stored in the specified location. The number of storage items associated with the user may include storage items wherein the user is identified as an owner of the storage item or the user belongs to a group of users identified as an owner of the storage item.

Figure 23:
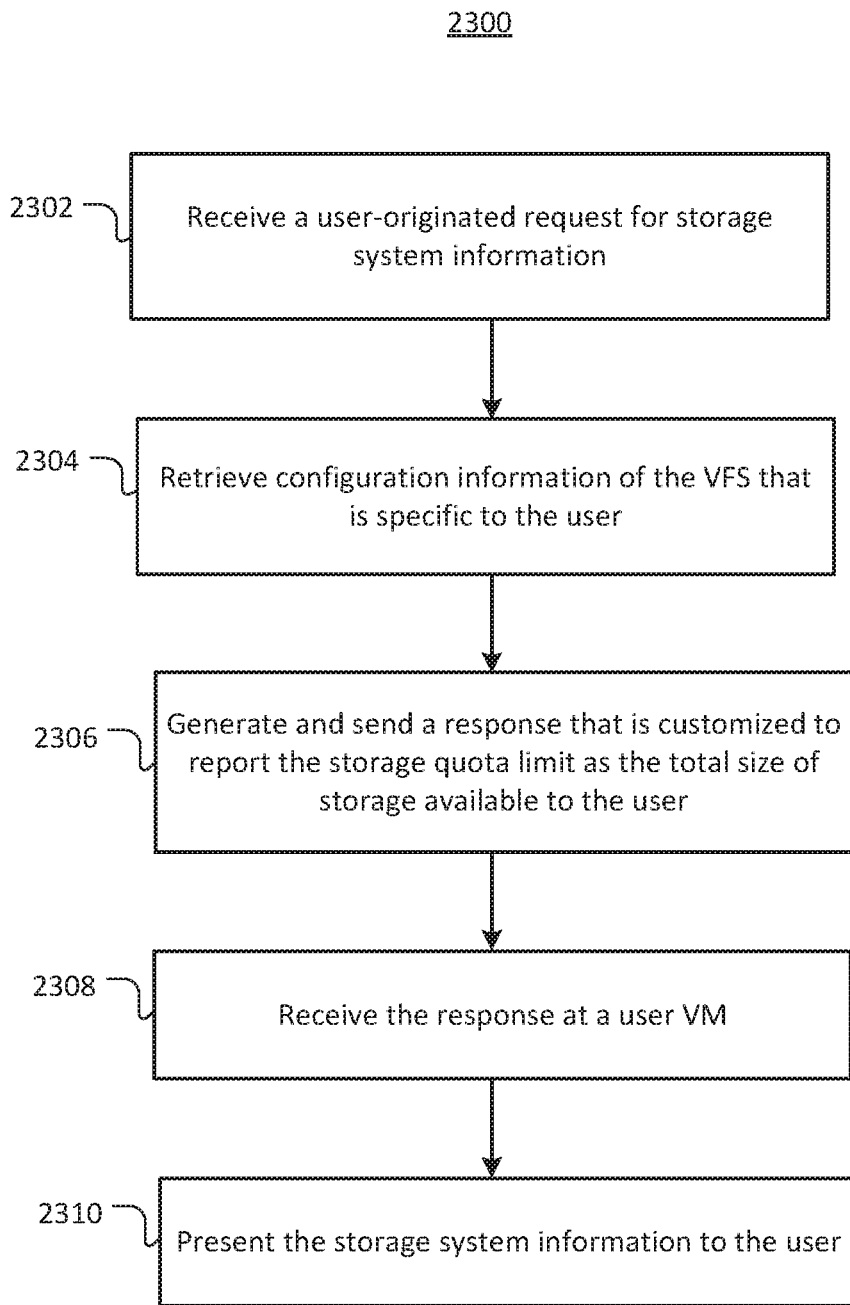
FIG. 23 illustrates an example method for providing storage system information about a virtualized file server.

FIG. 23 illustrates an example method 2300 for providing storage system information about a virtualized file server (VFS). The method 2300 may be performed primarily by, for example, a virtualized file server. The method 2300 begins at step 2302 by receiving a user-originated request from a UVM 105 for storage system information, e.g., information about a disk or other mappable or mountable portion of a filesystem, such as a share, disk partition, or directory. The storage system information requested may include a total size of storage available to the user. The user may have an associated storage quota limit, and the total size of storage available to the user may be limited by the storage quota limit. The request may be received via a network 140 and may be, e.g., an SMB request for metadata associated with a disk. In step 2304, the VFS may retrieve configuration information of the VFS that is specific to the user, such as the total size of the disk. In step 2306, the VFS may generate and send a response via the network, e.g., an SMB response. The response may be customized to report the storage quota limit as the total size of storage available to the user. If the total amount of storage available on the disk is less than the amount permitted by the user's quota limit, then the response may report the total amount of storage available on the disk. As an example, the user's quota limit for the disk may be included in the response in place of the value of the total size of the disk, though the quota limit may be labeled as the total size of the disk in the response. In step 2308, the UVM may receive the response. In step 2310, the UVM may present the storage system information (e.g., the user's storage quota limit) to the user instead of the total size of the disk. The quota limit may be presented as output of a command that the user invoked to get information about the disk, or as output in a window in a graphical user interface that displays information about the disk. The quota limit may be labeled as a total size of the disk in the output.

Particular embodiments may provide high availability of storage services in a VFS. In traditional file server deployments, high-availability is supported by configuring host machines as pairs where the storage resources are interconnected between two host machines. So, if one of the host machines fails, the other host machine in the pair may take over the storage resources along with the IP address. One limitation with this approach is that an even number of host machines is needed in the cluster.

In a VFS 202, minimal to zero disruption is desired in case of a failure. In the VFS 202, each host machine 201a in a cluster may monitor the health of every other host machine 201b,c in the cluster. In particular embodiments, the monitoring may be performed primarily by FSVMs 170 running on the host machines 201, and each host machine 201 (e.g., an FSVM 170 on each host machine 201) may monitor the other host machines 201 (e.g., by monitoring FSVMs 170 on the other host machines 201). If one of the host machines 201 experiences down time because of either a planned shutdown or unplanned host machine failures, another one of the host machines 201 may become a leader (e.g., by acquiring a lock associated with the storage using APACHE ZOOKEEPER or the like), and may begin taking over the storage resources of the failed host machine 201. Note that the host machine 201 that experiences down time may be referred to herein as a failed host machine 201 for simplicity of description, even though the host machine 201 may be down (e.g., unavailable) for reasons other than a hardware or software failure.

In particular embodiments, when one of the host machines 201 fails, each of the non-failed host machines may have an equal chance of becoming the leader. For example, if one of the FSVMs 170a in a VFS 202 fails, then each of the other FSVMs 170b,c in the VFS 202 may have an equal chance of becoming the leader FSVM 170. When a host machine 201 fails, the IP address of the failed host machine fails over to the new host machine (or FSVM 170) that takes over for the failed host machine, so that clients can continue to contact the new host machine (or FSVM) without disruptions. There may be a queue for each type of resource, e.g., a queue for host machines, a queue for vDisks, and so on. Each host machine 201 that is up (e.g., in failure-free operation) may be in the queue for each resource. When a host machine 201 fails or is otherwise down, the first host machine 201 in the queue for each resource held by the failed machine is granted a lock on the resource and becomes a leader for the resource. The leader may then provide the resource while the failed host machine is unavailable. When the failed host machine again becomes available, it may again become the leader for the resources for which it was the leader prior to its failure.

To improve load balancing, the failover storage resources may be distributed to multiple host machines. The failed host machine's resources may then be distributed across different host machines. As an example, 10 storage resources are held by a host machine 201 that fails, and there are ten other host machines 201, each of which has at least one available resource, then one resource on each host machine 201 may be allocated to replace the failed host machine 201. Preference may be given to local storage resources, so that if a host machine is up, the local storage of that host machine is preferred for FSVMs 170 on the host machine 201 over storage of other host machines 201. If multiple host machines 201 fail, e.g., two host machines 201 fail at the same time, and there are two backup host machines available, then the two backup host machines 201 may take over the storage resources of the two failed host machines.

Figure 24:
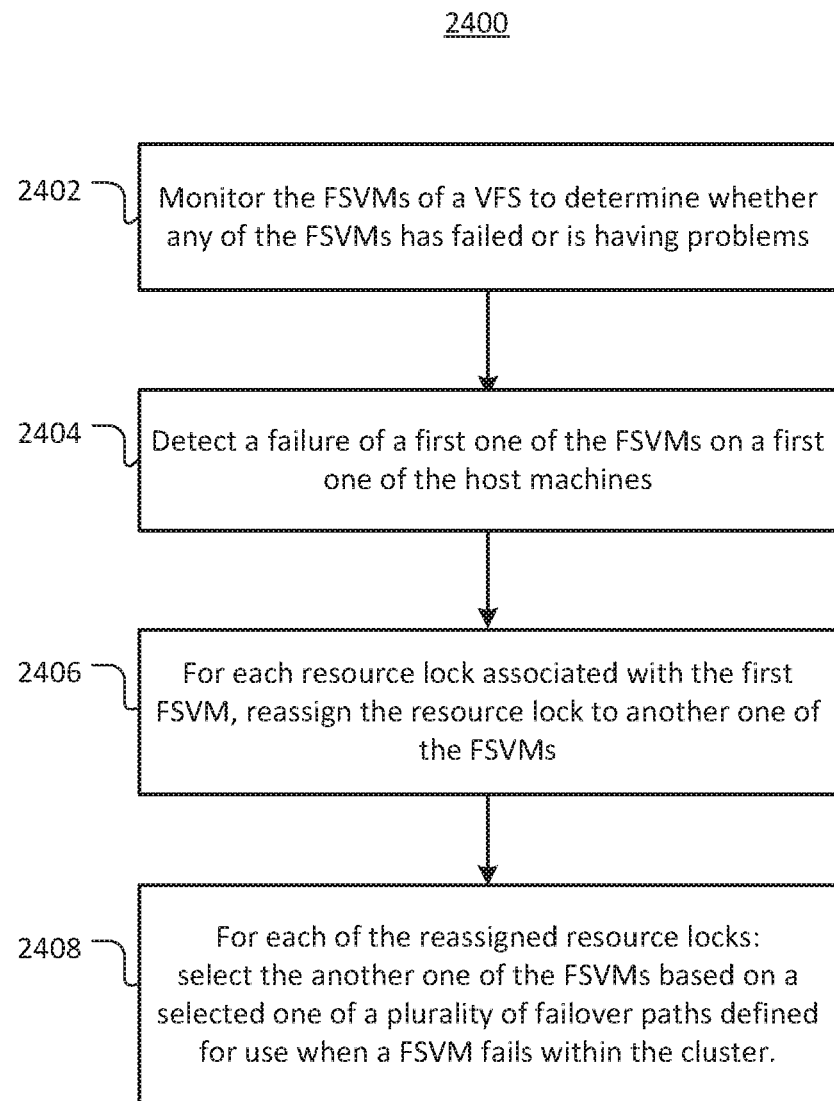
FIG. 24 illustrates an example method for providing high availability of storage services in a VFS.

FIG. 24 illustrates an example method 2400 for providing high availability of storage services in a VFS. The method 2400 may be performed primarily by, for example, a virtualized file server. The method 2400 begins at step 2402 by monitoring the FSVMs of a VFS to determine whether any of the FSVMs has failed or is having problems. In step 2404, the VFS may detect a failure of a first one of the FSVMs on a first one of the host machines. In step 2406, the VFS may, for each resource lock associated with the first FSVM, reassign the resource lock to another one of the FSVMs. In step 2408, the VFS may, for each of the reassigned resource locks, select the another one of the FSVMs based on a selected one of a plurality of failover paths defined for use when a FSVM fails within the cluster.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A virtualized file server, comprising:
a cluster of file server virtual machines (FSVMs) hosted on a computing node cluster, wherein the cluster of FSVMs is configured to form a single namespace of storage items accessible to a client, wherein the single namespace is implemented using storage devices of a storage pool distributed across the computing node cluster, the cluster of FSVMs including:
a first FSVM of the cluster of FSVMs hosted on a first computing node of the computing node cluster, wherein the first computing node configured to host the first FSVM is configured to manage an input/output (I/O) transaction corresponding to an I/O request received from the client in response to the I/O request being directed to a first storage item in the single namespace of the storage items, wherein the first computing node configured to host the first FSVM is further configured to manage a subsequent transaction corresponding to a second I/O request received from the client based on a redirect response in response to the second I/O request being directed to the first storage item of the storage items; and
a second FSVM of the cluster of FSVMs hosted on a second computing node of the computing node cluster, wherein the second computing node configured to host the second FSVM is configured to manage the I/O transaction corresponding to the I/O request received from the client in response to the I/O request being directed to a second storage item in the single namespace of the storage items, wherein, in response to the I/O request being directed to the first storage item of the storage items, the second computing node configured to host the second FSVM is further configured to provide a redirect response to the client that references the first FSVM.

2. The virtualized file server of claim 1, wherein the first computing node configured to host the first FSVM and the second computing node configured to host the second FSVM are each configured to determine whether the I/O request is directed to the first storage item or the second storage item based on a file server name received in the I/O request that identifies one of the first FSVM or the second FSVM.

3. The virtualized file server of claim 2, wherein, in response to receipt of a FSVM lookup request directed to the first storage item from the client, the second computing node configured to host the second FSVM is configured to provide, to the client, a network address associated with the first FSVM based on a storage location of the first storage item.

4. The virtualized file server of claim 1, wherein the first computing node is different than the second computing node of the computing node cluster.

5. The virtualized file server of claim 1, wherein the first computing node of the computing node cluster is a same computing node as the second computing node.

6. The virtualized file server of claim 1, further comprising a first virtual disk configured to maintain the first storage item and a second virtual disk configured to maintain the second storage item.

7. The virtualized file server of claim 1, wherein, in response to receipt of the I/O request, the second computing node configured to host the second FSVM is further configured to provide an indication to the client that the first storage item is not located on the second computing node configured to host the second FSVM when the I/O request is directed to the first storage item.

8. The virtualized file server of claim 1, wherein, in response to receipt of the I/O request identifying the second FSVM, the second computing node configured to host the second FSVM is configured to provide a referral request referencing the I/O request when the I/O request is directed to the first storage item.

9. The virtualized file server of claim 8, wherein, in response to the referral request, the first computing node configured to host the first FSVM is configured to provide a referral request response that identifies the first FSVM based on an association that maps the first storage item to the first FSVM.

10. The virtualized file server of claim 9, wherein the first computing node configured to host the first FSVM is further configured to manage the subsequent I/O transaction corresponding to the second I/O request received from the client in response to the second I/O request being directed to the first storage item, wherein the second I/O request is provided based on the referral request response.

11. At least one non-transitory computer-readable storage medium including instructions that when executed by a computing node in a computing system, causes the computing node to:
in response to receipt of an input/output (I/O) request from a client at a first file server virtual machine (FSVM) of a cluster of FSVMs of a virtualized file server configured to form a single namespace of storage items accessible to the client and implemented using storage devices of a storage pool distributed across the computing system:
when the I/O request is directed to a first storage item in the single namespace of the storage items, provide a redirect response to the client that references a second FSVM of the cluster of FSVMs, wherein the redirect response prompts the client to issue a subsequent I/O request directed to the first storage item to the second FSVM; and
manage an I/O transaction associated with the I/O request when the I/O request is directed to a second storage item in the single namespace of the storage items.

12. The one or more computer-readable non-transitory storage media of claim 11, wherein the instructions further cause the computing node to determine whether the I/O request is directed to the first storage item based on a file server name received in the I/O request that identifies the first FSVM.

13. The one or more computer-readable non-transitory storage media of claim 12, wherein the instructions further cause the computing node to, in response to receipt of a FSVM lookup request directed to the first storage item, provide, to the client, a network address associated with the second FSVM.

14. The one or more computer-readable non-transitory storage media of claim 11, wherein the instructions further cause the computing node to provide the redirect response to the client that references the second FSVM hosted on another computing node of the computing system.

15. The one or more computer-readable non-transitory storage media of claim 11, wherein the instructions further cause the computing node to provide the redirect response to the client that references the second FSVM hosted on the computing node of the computing system.

16. A method, comprising:
receiving of an input/output (I/O) request from a client at a first file server virtual machine (FSVM) of a cluster of FSVMs of a virtualized file server configured to form a single namespace of storage items accessible to the client, wherein the single namespace is implemented using storage devices of a storage pool distributed across a computing node cluster configured to host the cluster of FSVMs;
in response to the I/O request being directed to a first storage item in the single namespace of the storage items, provide a redirect response to the client that references a second FSVM of the cluster of FSVMs, wherein the re-direct response is configured to prompt the client to issue a subsequent I/O request directed to the first storage item to the second FSVM; and
in response to the I/O request being directed to a second storage item in the single namespace of the storage items, manage an I/O transaction associated with the I/O request.

17. The method of claim 16, further comprising hosting the first FSVM and the second FSVM on a same computing node of a computing node cluster configured to host the virtualized file server.

18. The method of claim 16, further comprising, in response to receipt of the I/O request, providing a referral request referencing the I/O request when the I/O request is directed to the first storage item.

19. The method of claim 18, further comprising, in response to the referral request, providing a referral request response that identifies the first FSVM based on an association that maps the first storage item to the first FSVM.

20. The method of claim 19, further comprising maintaining the first storage item on a first virtual disk and maintaining the second storage item on a second virtual disk.

21. The virtualized file server of claim 1, wherein the storage pool distributed across the computing node cluster includes local storage devices of the computing node cluster.

22. The one or more computer-readable non-transitory storage media of claim 11, wherein the storage pool distributed across the computing system includes a local storage device of the computing node and another local storage device of at least one other computing node of the computing system.

23. The method of claim 16, wherein the storage pool is implemented using local storage devices of the computing node cluster configured to host the cluster of FSVMs.

* * * * *